United States Patent
Gutierrez-Sheris

(10) Patent No.: US 11,509,464 B2
(45) Date of Patent: Nov. 22, 2022

(54) SYSTEM AND METHOD USING A FITNESS-GRADIENT BLOCKCHAIN CONSENSUS AND PROVIDING ADVANCED DISTRIBUTED LEDGER CAPABILITIES VIA SPECIALIZED DATA RECORDS

(71) Applicant: Luis Eduardo Gutierrez-Sheris, Glen Rock, NJ (US)

(72) Inventor: Luis Eduardo Gutierrez-Sheris, Glen Rock, NJ (US)

( * ) Notice: Subject to any disclaimer, the term of this patent is extended or adjusted under 35 U.S.C. 154(b) by 352 days.

(21) Appl. No.: 16/902,010

(22) Filed: Jun. 15, 2020

(65) Prior Publication Data

US 2020/0396065 A1    Dec. 17, 2020

Related U.S. Application Data

(60) Provisional application No. 62/861,086, filed on Jun. 13, 2019.

(51) Int. Cl.
*H04L 29/06* (2006.01)
*H04L 9/08* (2006.01)
(Continued)

(52) U.S. Cl.
CPC ............ *H04L 9/088* (2013.01); *H04L 9/3239* (2013.01); *H04L 9/3247* (2013.01); *H04L 12/46* (2013.01);
(Continued)

(58) Field of Classification Search
None
See application file for complete search history.

(56) References Cited

U.S. PATENT DOCUMENTS

| 7,720,754 B1 * | 5/2010 | Gutierrez-Sheris ......................... G06Q 20/105 705/41 |
| 10,762,352 B2 * | 9/2020 | Slipenchuk ............ G06V 20/48 |

(Continued)

FOREIGN PATENT DOCUMENTS

| CN | 108960837 A | 12/2018 |
| WO | 2018/189657 A1 | 10/2018 |
| WO | 2020252479 A1 | 12/2020 |

OTHER PUBLICATIONS

Notification of Transmittal of the International Search Report and the Written Opinion of the International Searching Authority for PCT Application No. PCT/US2020/037795, "System and Method Using a Fitness-Gradient Blockchain Consensus," dated Sep. 10, 2020.

(Continued)

*Primary Examiner* — Jeremy S Duffield
*Assistant Examiner* — Hassan A Hussein
(74) *Attorney, Agent, or Firm* — Hamilton, Brook, Smith & Reynolds, P.C.

(57) ABSTRACT

An improved system implements Fitness Gradient Consensus including hash distance and bucket consensus variations within a digital blockchain by calculating the highest fitness value among competing blocks to resolve conflicts and allocate the rewards associated with building new blocks. The consensus system applies conflict resolution formulas to incentivize block-building nodes to share blocks generated, as it completes construction, to improve chances of a reward, resulting in enhanced speed and security of blockchain.

The hash distance consensus utilizes a hash distance scalar value as part of its fitness metric, and the bucket consensus assigns tokens to buckets and calculates an aggregate value (Continued)

of the assigned tokens. A trust-but-verify variant increases transactional throughput and reduces linearity and computational constraints.

The system also utilizes novel record types, such as token genesis, transfer, transaction, trade order, settlement, proposition, determination, and pattern linkage records to facilitate the automation of financial, commercial and legal processes.

19 Claims, 14 Drawing Sheets

(51) Int. Cl.
　　*H04L 12/46*　　　(2006.01)
　　*H04L 67/104*　　(2022.01)
　　*H04L 9/32*　　　(2006.01)
　　*G06Q 40/04*　　(2012.01)

(52) U.S. Cl.
　　CPC ........... *H04L 67/104* (2013.01); *G06Q 40/04* (2013.01); *H04L 2209/56* (2013.01)

(56) References Cited

U.S. PATENT DOCUMENTS

| | | | | |
|---|---|---|---|---|
| 10,939,405 | B1* | 3/2021 | Haleem | H04B 17/318 |
| 10,949,856 | B1* | 3/2021 | Rangan | H04L 9/3239 |
| 11,341,009 | B1* | 5/2022 | Wu | G06F 16/27 |
| 2002/0029190 | A1* | 3/2002 | Gutierrez-Sheris | G07F 7/025 709/202 |
| 2004/0230610 | A1* | 11/2004 | Gutierrez-Sheris | G06Q 20/04 |
| 2017/0075941 | A1* | 3/2017 | Finlow-Bates | H04L 9/3239 |
| 2018/0109541 | A1* | 4/2018 | Gleichauf | H04L 63/123 |
| 2018/0117447 | A1* | 5/2018 | Tran | G06Q 20/382 |
| 2018/0248981 | A1* | 8/2018 | Salem | H04L 67/306 |
| 2018/0373776 | A1* | 12/2018 | Madisetti | H04L 9/3239 |
| 2019/0043025 | A1* | 2/2019 | Martirosyan | H04L 9/088 |
| 2019/0213462 | A1* | 7/2019 | McDonald | G06Q 10/0833 |
| 2019/0220919 | A1* | 7/2019 | Martinez | G06K 19/0723 |
| 2019/0287027 | A1* | 9/2019 | Franceschini | G06F 16/1805 |
| 2019/0306190 | A1* | 10/2019 | Suraparaju | H04L 9/50 |
| 2019/0319798 | A1* | 10/2019 | Chalkias | H04L 9/3239 |
| 2020/0007513 | A1* | 1/2020 | Gleichauf | G06F 8/65 |
| 2020/0023846 | A1* | 1/2020 | Husain | H04W 4/027 |
| 2020/0051067 | A1* | 2/2020 | Overholser | H04L 9/3236 |
| 2020/0051069 | A1* | 2/2020 | Wilson | G06Q 20/065 |
| 2020/0082390 | A1* | 3/2020 | Mursalov | G06F 16/1824 |
| 2020/0195437 | A1* | 6/2020 | Gallagher | G06Q 30/08 |
| 2020/0233760 | A1* | 7/2020 | Wu | G06F 11/2056 |
| 2020/0311699 | A1* | 10/2020 | Ranjit | G06Q 20/38215 |
| 2020/0388359 | A1* | 12/2020 | Bhandari | H04L 67/306 |
| 2020/0396065 | A1* | 12/2020 | Gutierrez-Sheris | H04L 9/088 |
| 2021/0019746 | A1* | 1/2021 | Adjaz | H04L 63/0861 |
| 2021/0072033 | A1* | 3/2021 | Husain | G06Q 50/30 |
| 2021/0320847 | A1* | 10/2021 | Altshuler | G06Q 10/063 |
| 2021/0399820 | A1* | 12/2021 | Hoptroff | H04W 12/63 |
| 2022/0101326 | A1* | 3/2022 | Kim | H04L 9/50 |
| 2022/0121962 | A1* | 4/2022 | Lv | G06T 19/006 |
| 2022/0231996 | A1* | 7/2022 | Shockley | H04L 9/0833 |

OTHER PUBLICATIONS

Notification Concerning Transmittal of International Preliminary Report on Patentability for PCT Application No. PCT/US2020/037795, "System and Method Using a Fitness-Gradient Blockchain Consensus," dated Dec. 23, 2021.

* cited by examiner

| Block with Bloom Filter | Included Records | Fitness (No. of Records) |
|---|---|---|
| ABCLMXYZ | L→M, X→Y, Y→Z, B→A, B→C | 5 |
| ABCLM | B→A, B→C, A→C, L→M | 4 |
| ACXYZ | A→C, X→Y, Y→Z | 3 |
| LMXYZ | X→Y, Y→Z, L→M | 3 |
| ABC | A→C, B→A, B→C | 3 |

SYSTEM AND METHOD USING A FITNESS-GRADIENT BLOCKCHAIN CONSENSUS AND PROVIDING ADVANCED DISTRIBUTED LEDGER CAPABILITIES VIA SPECIALIZED DATA RECORDS

FIELD OF THE INVENTION

The present invention generally relates to a field of blockchain technology, which is also known as a distributed electronic ledger for storing data that multiple parties may access, modify, update, maintain and verify. More specifically, the present invention pertains to a consensus chain selection method (the Fitness Gradient consensus method) which simplifies or eliminates a wasteful and resource-intensive proof-of-work step in determining which chain or block should be selected from among competing chains and blocks to be used to continue building the blockchain. Additionally, the present invention pertains to certain complex distributed data records which interoperate to provide the distributed electronic ledger with certain specialized capabilities.

BACKGROUND

Distributed electronic ledgers or blockchains may be held or maintained by individual parties, or may contain entries for different parties and be replicated and distributed amongst various participants on a network. Distributed electronic ledgers are utilized for various applications, including exchange and recording of transactions in crypto currencies, such as, for example, transactions involving Bitcoin, Etherium, Ripple (XPR) and other crypto currencies.

In addition, blockchains may also be used for recording and confirming the identity or existence of a person, object or event. The data records confirming such identity or existence may then be utilized for such application as confirming the identity of an account holder, or to confirm the relationship between two account holders, or to confirm the occurrence of an event in the real-world, and then to use that information to direct contract behavior.

Blockchains may also be utilized as a solution for recording, tracking and mediating ownership of an asset or multiple assets, the latter encoded as a token (or multiple tokens) on a blockchain, which may be transferred or otherwise manipulated via distributed electronic ledger elements such as smart contracts and on-chain data records.

In addition, blockchains may also be utilized to facilitate foreign exchange trading and money remittance by serving as a record of transactions represented on-chain by currency-backed asset tokens. For example, currency-backed asset tokens may be created by a trusted institution (ex. a bank) that issues such tokens and trades or contracts with another institution (ex. a different bank) using smart contracts on a blockchain, in order to effect the transfer of asset tokens (and underlying assets) from one third-party entity to another. Such a transfer may be conditioned upon the verification that such requirements as may be set forth in the associated smart contract for that asset token have been met.

DESCRIPTION OF THE INVENTION

In view of the foregoing, it is one object and a feature of the present invention to provide a computing system and method for a distributed electronic ledger or blockchain implementation that utilizes a Fitness Gradient consensus method to determine which of the competing nodes is selected to receive a reward for a particular block or a chain having been added to the blockchain. Another object and a feature of present invention is to implement a Fitness Gradient consensus to determine which node is permitted to build the next block on the distributed electronic ledger or blockchain, or which block or chain is used as a base upon which to continue building the distributed electronic ledger or blockchain, and how to resolve a conflict between any block or chains in case of a conflict among alternative competing blocks or chains.

Another object and a feature of the present invention is the implementation of a Hash Distance consensus variant and/or a Bucket consensus variant of the Fitness Gradient consensus method to determine which of the competing nodes is selected to receive a reward for a block or chain that is added to the blockchain. These and other variants of the Fitness Gradient consensus method of the present invention reduce or eliminate the less efficient Proof-of-Work consensus method by re-conceptualizing the conflict resolution role and process of consensus as a generic problem of evaluating Fitness among competing blocks or chains. In accordance with at least one embodiment, the Hash Distance consensus variant may utilize a hash distance scalar value as part of its Fitness metric when comparing chains for conflict resolution. The Bucket consensus variant may incorporate the act of "freezing" tokens as a complementary method to generate a Fitness metric to use in comparing chains.

Another object and a feature of the present invention is the implementation of a Fitness Gradient consensus or a variant that incorporates the "trust but verify" methodology for determining which of the competing blocks or chains is added to the blockchain or distributed ledger, and which of the competing nodes is selected to receive a reward for the block or chain that is being added to the blockchain or distributed ledger. This strategy significantly increases transactional throughput of the presently known systems by reducing linearity constraints (and other computational constraints that delay overall system processing) and allows the system-processing throughput to approach the theoretical maximum throughput for blockchains and distributed electronic ledger systems in general.

Another object and a feature of present invention is use and implementation of the Bloom filters in order to represent all accounts affected during execution of a block. It also allows the new block to be built without having to execute the prior block in order to determine which accounts may have been updated in the course of that block's execution.

Yet another object and a feature of the present invention is use and implementation of Penalty records, and the use of Bloom filters to optimize parallel processing within the blockchain or distributed electronic ledger network.

Yet another object and a feature of the present invention is implementation of a method to stabilize the supply and price of blockchain tokens using information with regards to the native token fees specified in the data records added to new blocks. In addition, the present invention provides greater native token price and supply stability by using the on-chain data relating to the trades between native and user-defined token pairs as inflation or deflation indicators.

Still another object of the present invention is to implement a system and a method for implementation and maintenance of a network-connected distributed ledger computer system that includes (1) an interconnected network of a plurality of computers, each including a processor executing computer instructions stored in an electronic memory of each computer for implementing and maintaining a distributed electronic ledger system implemented as a backward-linked blockchain of multiple interconnected blockchain blocks; (2) a first node on said network of computers, wherein the processor of the first node executes peer-to-peer software to create a first competing block or a block chain segment to be added to the blockchain; (3) a second node on said network of computers, wherein the processor of the second node executes peer-to-peer software to create a second competing block or a block chain segment to be added to the blockchain; (4) the network computers (nodes) executing computer instructions that apply a Fitness Gradient consensus to calculate and apply a highest fitness value calculation among the competing first and second blocks or blockchain segments; (5) the nodes executing computer software in accordance with at least one embodiment for determining which of the first or second nodes is permitted to add a next block or a block chain segment on the blockchain and which of the first or second nodes is allowed to share a reward for the added block or the block chain segment; and (6) adding the next block or block chain segment onto the blockchain after the determination.

Another object and a feature of the present invention is use of different record types, including token genesis records, transfer records, trade order records, settlement records, proposition records, determination records, and pattern linkage records. These different records, and the Fitness Gradient consensus methodology and its variants are useful in (1) implementing real-world event-driven smart contract execution systems that utilize blockchains and blockchain-based systems; (2) identity confirmation processing using blockchains and blockchain-based systems; (3) asset title and tracking blockchains and blockchain-based systems; (4) currency-based asset tokens, foreign exchange trading and remittances processes utilizing blockchains and blockchain-based systems; and (5) implementing an automated system for the issuance, sale, transfer and trading of tokens that may be characterized as securities, and which are regulated as securities in accordance with multiple security regulations, rules and restrictions governing securities transactions.

Yet another object and a feature of the present invention is utilization of different record types, including without limitation token genesis records, transfer records, trade order records, settlement records, proposition records, determination records and/or pattern linkage records to implement derived and base tokens, and controlling the supply and value of tokens, as well as transfer and trading of tokens.

Another object and a feature of the present invention is utilization of different record types, including without limitation token genesis records, transfer records, trade order records, settlement records, proposition records, determination records and/or pattern linkage records to facilitate the exchange of different token types (ex. native tokens and different user tokens) and also implementation of other trading orders (ex. market orders, limit orders and stop-loss orders).

These and other objects, advantages, aspects and features of the present invention are as described below and/or appreciated and well understood by those of ordinary skill in the art.

BRIEF DESCRIPTION OF THE DRAWINGS

The above and other features and aspects of the present invention will become more apparent upon reading the following detailed description in conjunction with the accompanying drawings, in which.

Figure 1:
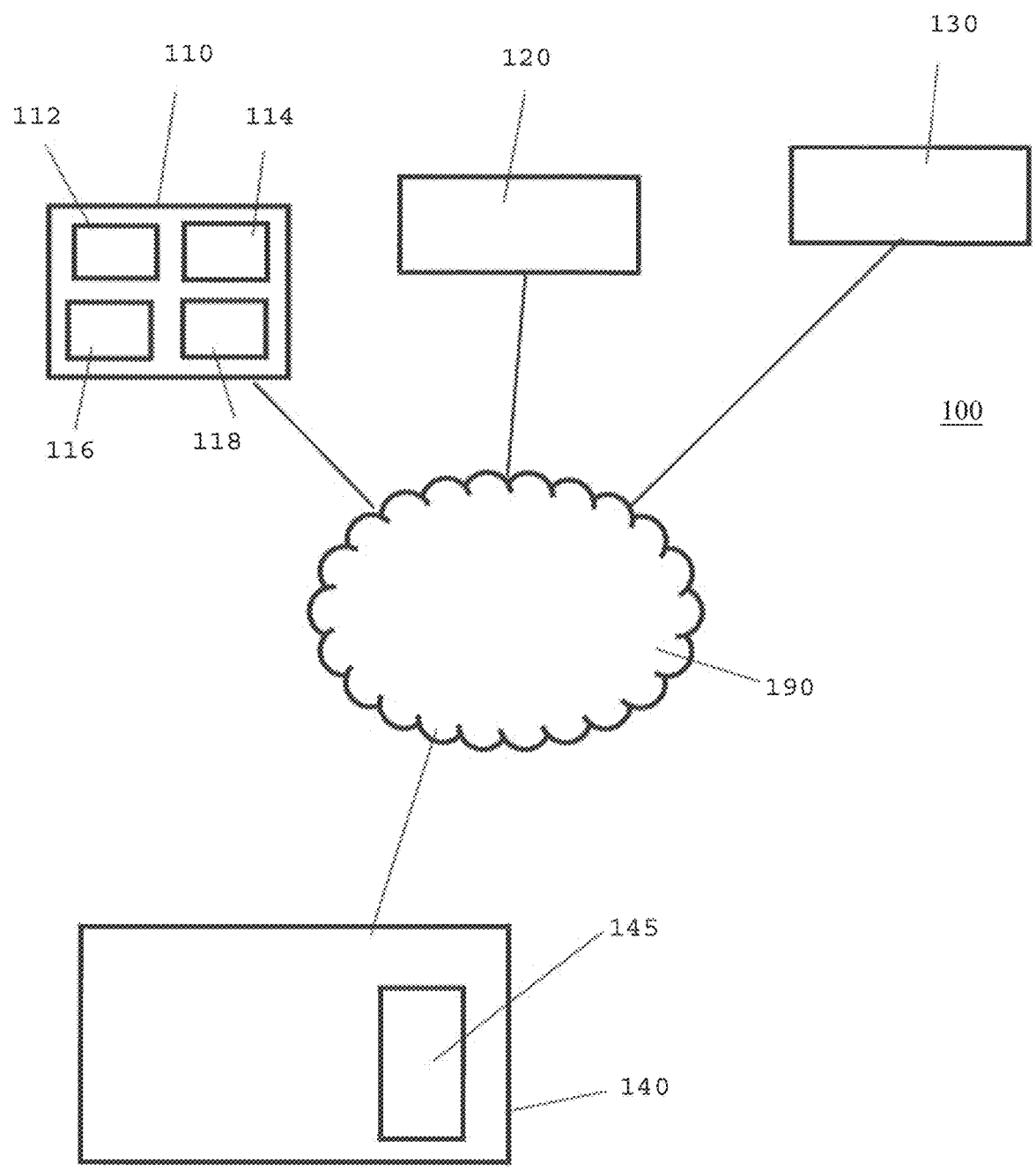
FIG. 1 illustrates the general structure and organization of various components of a blockchain on a distributed network in accordance with at least one embodiment of the present invention.

The present invention is now described with reference to the drawings, wherein the like reference numerals are used to refer to the like elements. In the following description, the following terms are useful for the understanding of the use and operation of a system or a component of a system that includes at least one embodiment of the present invention.

Blockchain Structure and Organization

A blockchain data structure is an append-only, immutable data structure comprising an ordered set of individual "Blocks," with each block representing an ordered set of individual data records. A "Distributed Electronic Ledger" is a database, duplicated across multiple devices, the state of which at any given moment is determined by applying discrete data transformations in a certain, well-defined order. By design, a blockchain data structure is typically used to host a distributed electronic ledger, such that the individual data transformations of the distributed electronic ledger correspond to the data records referenced by the blocks of the blockchain data structure. Within the context of this application, the term "Blockchain" is used inclusively to refer to various types of data structure upon which a distributed electronic ledger may be implemented (including linear blockchain data structures, n-dimensional mesh data structures, and directed acyclic graphs) as well as to the distributed electronic ledger itself that is implemented upon such a data structure.

A "Blockchain System" is a system of computational devices connected to each other via a distributed data interchange network, within which, in combination with any associated software, a blockchain and distributed ledger may be implemented.

FIG. 1 illustrates the overall structure of a blockchain system utilized on a distributed data interchange network. A blockchain system 100 typically includes a blockchain processing device 110, a wallet device 120, a blockchain data browsing device 130, and a vendor device 140, all of which are connected to the Internet 190 (or a distributed network). The blockchain system may include multiple blockchain processing devices 110, multiple wallet devices 120, multiple blockchain data browsing devices 130, and multiple vendor devices 140, each connected to the Internet 190 (or a distributed network). In addition to separate blockchain processing devices 110, separate wallet devices 120, separate blockchain data browsing devices 130, and separate vendor devices 140, a blockchain system may contain combination devices 150 (not shown) that combine features and functionality of all or some portion of these devices, or that simultaneously perform the function of all or some portion of these devices, and which are also connected to the Internet 190 (or a distributed network).

The blockchain processing device 110 may be a computer such as a mobile phone, smartphone, tablet, laptop, desktop computer, server computer, purpose-built computation device, or other type of computation device, with one or more computer processors 112, computer memory 114 for storing computer instructions, a database 116 for processing blockchain information (including records and/or transactions), and a communication module 118 for connecting to the Internet 190 and/or the distributed network. The blockchain processing device may also optionally include a display 155 (not shown), and may consist of multiple computers or a network of computers (either directly connected or distributed), all of the same type or of different types. The wallet device 120, the blockchain data browsing device 130, the vendor device 140, and the combination device 150 typically have the same components as the blockchain processing device 110.

The blockchain processing device 110 functions as a "Block-Building Node", which is also referred to as a "miner" in proof-of-work blockchains. Block-Building Nodes are responsible for assembling new blocks that reflect the inclusion of new records or transactions in the blockchain, and for linking those blocks to the blockchain. Block-Building Nodes are also responsible for algorithmically confirming whether the blocks that have been linked to the blockchain are valid, and whether records or transactions are validly included in the blockchain. Block-Building Nodes are also responsible for propagating blocks and data records within the network. In at least one embodiment of the present invention, each Block-Building Node is associated with an account or address on the blockchain, to which account or address block mining rewards may be assigned. Such an account or address can also be used by a Block Building Node to securely identify itself and its activities within the network and on the chain through the use of cryptographic signatures.

The wallet device 120 functions as a "Wallet" that acts to securely store cryptographic keys, which keys are used to cryptographically sign new data records that are proposed for inclusion in the blockchain. Cryptographic signatures ensure that Block Building Nodes will only include data records that are appropriately authorized. In addition to storing cryptographic keys and other secure data, Wallets are able to generate and cryptographically sign new data records and transmit them to one or more Block-Building Nodes, typically via the Internet 190 or other network.

The blockchain data browsing device 130 functions to provide users with a means to read, view or otherwise access data associated with the blockchain, on a read-only basis.

The vendor device 140 may include one or more computers or other computer processing devices that facilitate the activity of Blockchain Vendors. The term "Blockchain Vendor", in the context of the present application, refers to any person or entity that offers, issues, sells or distributes any token to one or more users, or that provides services that are in some manner verified, confirmed, provided or conveyed via a blockchain—for example, identity verification services. A vendor device runs software that enables Blockchain Vendors to provide such services.

The term "Node" in the present application refers to a computer such as a mobile phone, smartphone, tablet, laptop, desktop computer, server computer, a purpose-built computation device or other computation device that runs blockchain peer-to-peer software and communicates with other similar computers operating on a connected distributed data interchange network like the Internet.

The term "Node Network" refers to a collection of computers running the same blockchain peer-to-peer software, working to build a single, shared blockchain, and connected to each other via a connected distributed data interchange network like the Internet.

Data records accepted for inclusion in a blockchain are stored or referenced in the blocks of a distributed ledger or Blockchain. Individual blocks may contain record and/or transaction data. Alternately, blocks may reference such data via a cryptographic hash or digest summarizing the data, which hash or digest may be generated by a separate data structure that contains the records and transactions, for example a Merkle tree. For cryptocurrency blockchains, cryptocurrency ownership is linked to unique addresses or account numbers included as data within these records and transactions. In such cryptocurrency blockchains, the cryptocurrency balance associated with a particular address or account number may be derived from the entire history of records and transactions preserved by the distributed ledger or Blockchain, beginning at its origin.

Figure 2:
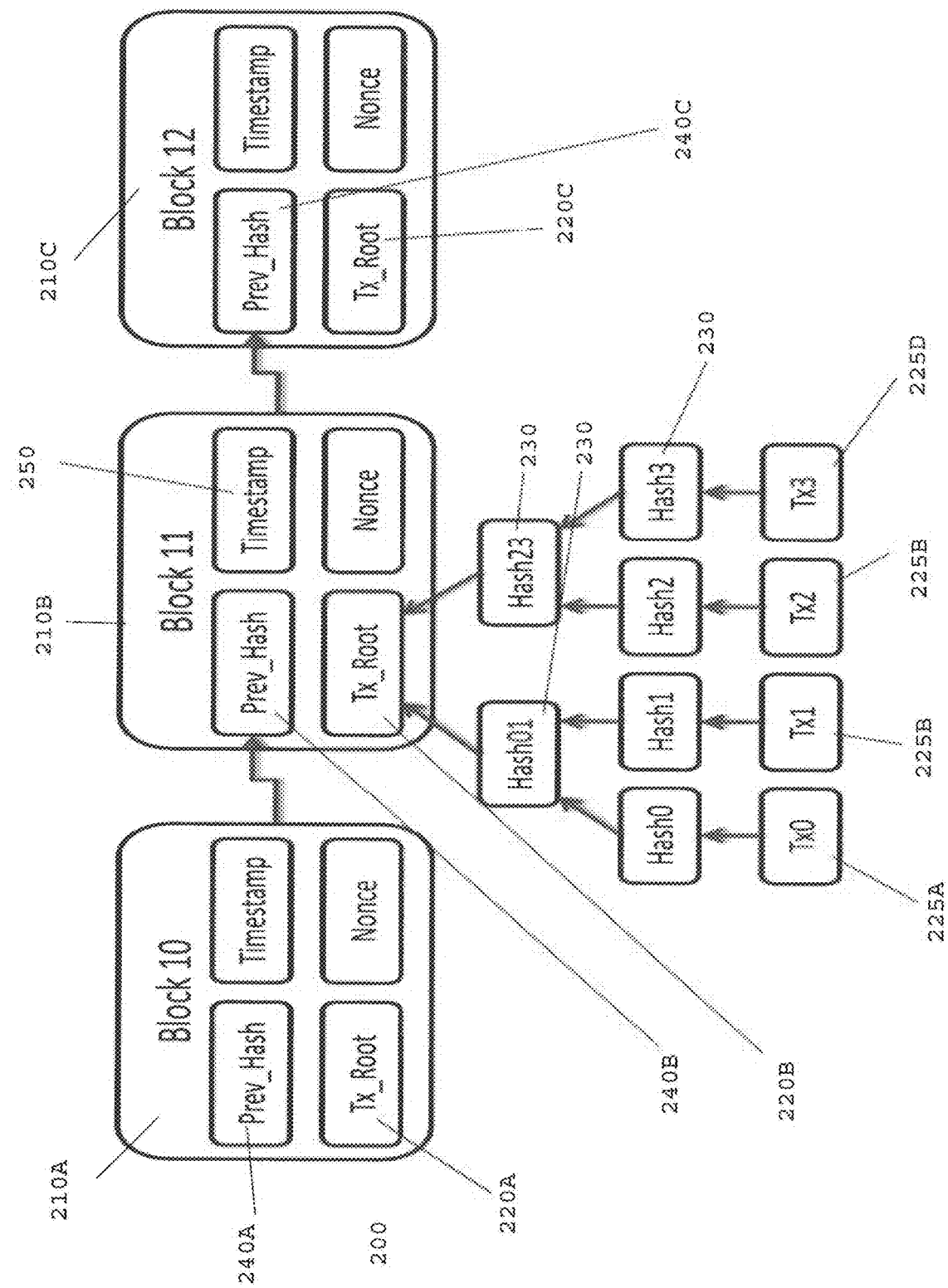
FIG. 2 illustrates the general structure and organization of a blockchain in accordance with at least one embodiment of the present invention.

The general structure of a linear blockchain data structure 200 is illustrated with reference to FIG. 2. The blockchain data structure 200 is an append-only, immutable data structure that comprises one or more individual blocks 210A-C, shown in FIG. 2 as Blocks 10, 11 and 12. Each block 210A-C represents a unique set of data records 220A-C. These data records of a particular block may not be contained in that block, but instead may be represented in the block by one or more cryptographic hash values, either the root(s) of one or more a Merkle trees 225A-D (shown in FIG. 2 for the Tx_Root hash for Block 210B, or the hash of an aggregated data structure (such as, the hash of some key-value map). Each cryptographic hash 230 is unique for the data that it is derived from, and will by design change radically even if the smallest aspect of its underlying data is altered.

Each block 210A-C on the blockchain data structure 200 can be described by, or in terms of the cryptographic hash of its contents 220A-C. The "Block Hash", in the context of the present application, is this cryptographic hash of the contents of a particular block. Each block refers to its preceding block in the chain 200 by that preceding block's block hash 240A-C, and includes that reference amongst its own data (i.e. the data that is used to derive its own block hash). In other words, block 210B stores as its own data the block hash 240B of the preceding block 210A. Each block may also store the timestamp 250 (shown for Block 210B in FIG. 2), which could indicate the time of the formation or acceptance of the block onto the blockchain.

This organization secures the immutability of the blockchain data structure 200. Given the existence of any block in a well-formed blockchain data structure (for instance, the last block on the chain), the entirety of the preceding chain, including both blocks and all the records they represent, are immutable. Any change to any record or any block would have a cascading effect on the cryptographic hashes that constitute the chain, and would invalidate any and all downstream blocks in their original form. Thus, any change in any record of the last block 210N on the chain 200 would invalidate all downstream (linked) blocks.

A new node that enters the Node Network must validate the chain, to ensure that each block accurately represents the records attributed to it, and that all blocks in the Blockchain are properly linked. This bootstrapping validation is performed in sequence, from the first block 210A and its first record to the last block 210N and its last record.

In addition, every new block generated by any Block-Building Node(s) on the Node Network must be validated by other Block-Building Nodes, or it will not be added to the Blockchain. Furthermore, because the validation process and new block creation process may be performed in parallel by many different Block-Building Nodes on the same network, each Node must also decide which instance of the Blockchain should be used when more than one valid instance of the ledger or Blockchain exists on the network. This is decision process often termed as a "Conflict Resolution". The term "Consensus Algorithm" refers to the deterministic procedure followed by the Block-Building Nodes of the network to unambiguously decide which valid version of the blockchain is "canonical" and can continue to be used. Each Block-Building Node independently decides which version of the blockchain is canonical, and proceeds to generate new blocks with reference to that version. Because all Nodes on the network by design run the same software, share all the same data, and use the same Consensus Algorithm, these independent decisions result in all Nodes agreeing to a single distributed ledger or Blockchain.

The "Token", in the context of the present application, refers to a unit of value that is tracked within the blockchain. Tokens belong to particular accounts or addresses, and may be transferred from one account or address to another through the inclusion of a transfer record on the blockchain. Tokens may be created through the operation of the Consensus Algorithm implemented within a particular blockchain system—for instance, as a reward that incentivizes Block Building Nodes to contribute computational resources to the operation of the network—or Tokens may be generated via certain types of records, namely the "Genesis Records".

Each Block Building Node keeps a duplicate copy of the token values associated with each account or address within the blockchain. At any given point, the current state of tokens, accounts or addresses is encoded within the blockchain as the whole series of records that have been added to the blockchain prior to that point. Thus, in order to reliably determine the current token balance for any given account or address, a node will execute and validate the entire history of the distributed ledger or Blockchain, creating and transferring tokens between accounts and addresses until the current state is reached. Once the full chain has been validated, updates are applied by accepting and validating, or by generating, new blocks.

The "Account", in the context of the present application, is an address with which certain data on the blockchain is associated. Tokens, smart contracts, or other data may be associated with an account. The account number is related to one or more public keys that are used in combination with one or more private keys to cryptographically sign records that are created on behalf of an account, and which may alter certain data associated with the account. Only a record that is cryptographically signed with its corresponding account's key will be considered valid and included on the blockchain. In some embodiments, the account number may be a hash or other transformation of a single public key.

The "Transfer", or "Token Transfer", in the context of this application, is a particular record type that re-assigns a certain token value from the signing account to some destination account.

The "Token Fee", in the context of this application, refers to the requirement that a record include a fee, which is a common feature of blockchains. In at least one embodiment, the present invention deal with more complexity with regards to fees, because certain records are re-executed for a number of blocks in succession.

The "Smart Contract", in the context of this application, is a small executable program that may be added as a record to the blockchain. A variety of smart contract runtimes exist, and a variety of higher-level languages compile down to such contract runtime executables.

The "Blockchain Segment", in the context of the present application, is a discrete, contiguous subsection of a blockchain. A blockchain segment may be a portion of the canonical blockchain currently accepted as such by nodes within the blockchain system, or it may represent a portion of a conflicting blockchain that differs from the canonical blockchain. Each block within a blockchain segment can be described as having a "Height" relative to the first block within the blockchain as a whole, calculated by counting the distance, in terms of number of blocks, between the blockchain's origin, and the block in question. When blockchain segments are compared for purpose of conflict resolution, they would typically both originate at the same block height.

Overview of Blockchain Consensus Algorithms

One feature that is common to most blockchains and blockchain systems is the use of a consensus algorithm to resolve conflicts between competing chains. A blockchain system will implement a consensus algorithm as a way for different untrusted nodes to come to agreement as to the current state of the blockchain in question.

The present invention, in at least one embodiment, utilizes and implements the Fitness Gradient Consensus, and in other embodiments utilizes and implements certain variations of Fitness Gradient Consensus, including Hash Distance consensus and Bucket consensus. These consensus methods and systems replace known consensus methodologies, including the original Nakamoto "proof-of-work" consensus methodology, and known "proof-of-stake" consensus methodologies, within a blockchain system.

A typical blockchain comprises an ordered set of "blocks", wherein the order of these blocks is embodied in a chain of references from each block to its preceding block (or to multiple preceding blocks). Each back reference is a unique cryptographically-generated digest or hash of the contents of the preceding block. Such back reference data is accreted to the other data encapsulated in the block, which together is passed through a cryptographic digest function or hash function to determine the unique reference that will be contained in the subsequent block. Blocks within blockchains that utilize non-linear arrangements of blocks will contain multiple back references.

The creation, sequencing and linkage of new blocks, and the contents of each new block, are determined by network-linked computers (Block-Building Nodes) that have been granted the right to make decisions on behalf of the whole network, according to a consensus algorithm. In a blockchain system, multiple block-building nodes may be working simultaneously to create new blocks and add them to the blockchain, thereby growing the blockchain and adding new data records to it.

Each Block-Building Node attempts to add blocks that point to the version of the blockchain that the consensus algorithm determines to be canonical, choosing from among the different versions that it has learned about from other nodes over the network. Block-building nodes typically abandon the new blocks they are attempting to build after confirming that the blockchain version they are building upon has been superseded by a new version of the blockchain. The nodes will then proceed to generate new blocks that reference (i.e. build upon) the new version of the blockchain.

For example, in one embodiment, if the block-building nodes within a blockchain system are working to build a new block at height N, when one of those nodes successfully generates a valid new block at height N and links it to the canonical blockchain, this new expanded blockchain may supersede the prior version. At that point the nodes that become aware of the new version may begin working to build the subsequent block at height N plus 1, which will have reference back to the block at height N.

However, competing nodes may simultaneously propose alternate blocks and alternate chains. When two or more competing versions of the same blockchain vie for supremacy within a single blockchain system, this occurrence is known as a "fork." Conflicts between different blockchain versions or segments caused by a fork can be resolved deterministically within a blockchain system provided that the nodes within the network are fully informed as to the nature of each fork. Being presented with the same set of choices, all nodes within a blockchain system will use the same consensus algorithm to choose the same fork. For this reason, a blockchain system will remain cohesive provided that all participating nodes implement the same consensus algorithm. Each node will use the consensus algorithm to determine which alternate chain terminating with a block at height N to reference when building a block at height N plus 1.

Within each block, data is represented as a set of records or transactions. Records and transactions included in blocks encode transformations to the global state maintained by the blockchain system. Such records are executed in a well-defined and predictable sequence as new blocks are generated, evaluated, validated and added to the blockchain by each Block-building node. By agreeing on which blocks and records are included in the blockchain and which are not—which agreement is enabled by the system's consensus algorithm—the block-building nodes are able to ensure that the whole system maintains the same global state.

Some portion of the records or transactions within blocks typically memorialize the creation or transfer of tokens. Token values are re-assigned from a certain specified source addresses to certain specified destination address via individual data records, each of which is cryptographic signed to prove that each transfer is authorized. Alternately, tokens are added to accounts or to addresses as per the consensus algorithm when a block is created.

In cryptocurrency blockchains, a block-building node that successfully adds a new block to the blockchain will typically receive a token reward. In order to incentivize nodes to compete in producing new blocks and to validate future updates to the blockchain, each new block contains a record that assigns a token reward to an address specified by the node that creates the block. Including such an incentive acts to increase participation in the block-building and block-validation process, thereby increasing the overall security of the system.

Different consensus algorithms differ in how this reward is determined and assigned. In a blockchain system that utilizes a proof-of-work algorithm, for example, miners receive token rewards for having solved certain computational problems. These block-building nodes earn the right to add new blocks to the blockchain after having solved a computational problem before any other node has done so.

Fitness Gradient Consensus Compared to Known Consensus Strategies

The Fitness Gradient consensus algorithm and the Hash Distance and Bucket consensus variations of the present invention, utilized with one or more embodiments, are distinct in a number of important ways from the known proof-of-concept and proof-of-stake consensus strategies that are used for various existing blockchains.

One important difference between the Fitness Gradient consensus method of the present invention, as compared to the existing and known consensus methodologies (including the proof-of-work and proof-of-stake consensus methodologies) is that in the Fitness Gradient system and method, no block or node is privileged. Instead, all active nodes may be simultaneously building blocks and broadcasting the blocks they are constructing. Every node is incentivized (but not required) to share every block it generates, as soon as it completes construction, in order to improve the node's chances for receiving a reward for the new block. If that block happens to have the highest Fitness among competing blocks, then the use of that block will spread across the network; a lower-Fitness block will be discarded.

By contrast, in the well-known blockchain consensus approaches that are in use today, a node will broadcast a block only after the node has attained some privileged status—which is different from the methodology used in the Fitness Gradient consensus of at least one embodiment of the present invention. Among the consensus approaches that are in use today, different consensus approaches will assign a block-building node its privileged status through different means.

Another difference between the Fitness Gradient consensus and existing known consensus methodologies is that existing approaches rely wholly on either computational power or cryptographic power to secure blockchain systems. By contrast, the Hash Distance consensus and Bucket consensus implementations of Fitness Gradient consensus, implemented in accordance with at least one embodiment, calculate Fitness through a process that combines both computational power and cryptographic power (i.e. control over tokens on the chain). By using a ratio of tokens sent within the blockchain per hash distance as a Fitness metric, Fitness Gradient consensus methods diminish or eliminate the possibility of computationally powerful nodes exerting concentrated influence over the production of blocks. Any node attempting to exert concentrated influence would have to control a disproportionate amount of both participating computational power and tokens held on-chain. In a widely distributed network, with many participating nodes, such possibility would be difficult if not impossible for a single actor to achieve, both technologically and also economically.

Another difference between the Fitness Gradient consensus of the present invention and known proof-of-work consensus and proof-of-stake consensus types is the way that nodes choose which block to reference when assembling new blocks (i.e., which block or blockchain segment to build upon), and by implication which node is given the right to include data records in the block and to assign the token reward of that block.

The Fitness Gradient and the Hash Distance/Bucket consensus methods of the present invention do not use separate algorithms or metrics when deciding which block to build upon on the one hand, and which chain to choose when resolving conflicts on the other hand. Instead, each potential new block that is broadcast to the network is evaluated as a competing chain with the same algorithm that is used to evaluate and compare potential forks. This simplification makes the application of the Fitness Gradient consensus much more efficient for blockchain applications where processing time is a key issue. Furthermore, it reduces the cost of transactions involving blockchains, the time needed to create and verify a new block, and also promotes participation of more nodes in the consensus/conflict resolution process.

In at least one embodiment of the present invention, single new blocks are evaluated as a fork or blockchain segment of height one, but are simultaneously evaluated against forks/ blockchain segments of arbitrary height if the forks all branch from the same initial state.

In comparison, the known proof-of-work and proof-of-stake algorithms are concerned with determining which node may be permitted to broadcast the next block, on a per block basis. In the event that two nodes satisfy criteria to permit them both to generate the next block on the chain—or if two separate chains are generated as a result of a network partition or fork—a separate algorithm is used for conflict resolution to decide which chain should be discarded, and which chain should be used to continue building upon.

Fitness Gradient consensus in general, as well as Hash Distance (which is a sub-type of Fitness Gradient consensus in at least one embodiment of the present invention) and Bucket consensus (which is a sub-type of Hash Distance consensus in at least one embodiment of the present invention) in particular, all use formulae to calculate a well-defined scalar value (i.e. Fitness) for each blockchain segment, in order to compare blocks or blockchain segments. These formulae determine whether one block or blockchain segment is selected over another on a non-binary basis (not strictly a yes/no validity choice). A large number of blocks and chains may be valid, but only the chain with the highest Fitness is chosen by participating nodes.

Nodes continually grow the chain, adding blocks and broadcasting the Fitness value of their chains across the network. When a node learns of a higher-Fitness chain, it requests and receives a chain update from the node in possession of that chain, and then undertakes block-generation activity building on that chain. In at least one embodiment, a node may be participating in new block-generation activity for one or a number of different chains simultaneously, but will discard the lower-Fitness chains (or segments) in favor of building on the higher-Fitness chain once it can confirm that the higher-Fitness chain is in fact valid.

In the known proof-of-work consensus systems, the determination as to whether or not a particular block is valid and qualified is a binary determination. Each of multiple "miner" nodes will race to solve the math problem that will make its block valid. The first node to generate a valid block broadcasts that block, and thereby claims the right to specify the next block accepted by the network (and to claim the reward for the solved cryptographic problem and the new block creation/validation). Forks are minimized because the difficulty of the math problem is calibrated to ensure that it is solved approximately once per block by a single node. When the math problem is solved more than once and by more than one node, it is treated as an exception, which exception is handled by a separate algorithm or ruleset.

Similarly, in the known proof-of-stake systems, some algorithm is used to assign a particular node the right to generate a block, and that block, when broadcast to the network, is accepted or rejected as per that determination. The choice of assigned node will depend on the "stake" held by that single node (for example, some ownership quantity of crypto currency, or the age, seniority, or some other quantifiable involvement or ownership that is linked to the node), possibly in combination with some random factor.

In contrast, in Fitness Gradient consensus, implemented in accordance with at least one embodiment of the present invention, most nodes build, publish and broadcast blocks, and the blocks compete head-to-head based on Fitness. All blocks that are eventually incorporated into the final, canonical blockchain will have been selected by winning a tournament whereby blocks generated by nodes in the network will be compared to each other in order to determine the block with the highest Fitness. Therefore, all or most nodes in a Fitness Gradient consensus network broadcast their blocks, as opposed to nodes utilizing consensus methodologies that only broadcast the individual blocks that satisfy narrow criteria.

Variations of Fitness Gradient consensus will compare the fitness of the entire chain, or the fitness of blockchain segments that contain multiple blocks, rather than only compare individual blocks. In such variations, the evaluation of blocks is subsumed by the evaluation of chains, forks or blockchain segments.

In a Hash Distance consensus, which is a particular variant or specie of the Fitness Gradient consensus, as utilized in at least one embodiment of the present invention, the Fitness of a block or blockchain segment is a function of the numerical distance between the hash of each block, and the "target hash" of each block. In one variation, the Fitness may be determined based on minimizing hash distance, or in another variation, by maximizing some ratio of "aggregate tokens utilized" per hash distance. This numerical distance is determined algorithmically as per the specific consensus implementation. Variations of Hash Distance consensus, including Bucket consensus, may have different ways and methodologies to decide upon the target hash and the hash distance.

In at least one embodiment of Hash Distance consensus, the Fitness function output may vary depending on some aggregation of token values assigned within records that have been included in the blocks or blockchain segments being compared. In other embodiments, related consensus systems may incorporate other inputs when calculating Fitness. For instance, a Bucket consensus variation of the present invention (described herein) combines the hash distance with the aggregate token value assigned to the "buckets" that are used to determine the target hash. In either case, these token values may be referred to as the "aggregate tokens utilized" for a given block or blockchain segment.

In Bucket consensus, which is a particular variant or specie of Hash Distance consensus, implemented in accordance with at least one embodiment, the target hash is determined by users sending tokens to buckets. Bucket consensus divides the potential hash output range into a continuous set of buckets, so that the output of the relevant hash algorithm would fall into one and only one bucket. Each bucket is a numerical range, and each record assigning tokens to a bucket will specify the bucket to which it is contributing tokens. Tokens that are sent to buckets in one block may be used to determine the target hash for a future block—i.e. for a yet-to-be-generated block a fixed number of blocks higher than the block.

Comparison to Nakamoto Proof-of-Work Consensus

Within the Nakamoto Proof of Work consensus system and methodology, all nodes work to create blocks, but a node will only broadcast a block if it wins a race to solve a brute-force proof-of-work computational problem. Due to the low probability of solving such a problem, a very small number of nodes reach the privileged status required to create, validate and publish a block and add that block to the blockchain.

The Fitness Gradient consensus of the present invention in at least one embodiment will skip the proof-of-work computational problem. A block is valid as long as it is properly constructed in terms of format, and as long as its internal records have integrity (meaning, the same token value is not transferred twice; account values do not become negative; and all other data found within the block are valid).

When more than one block is published at the same time, or when more than one sub-chain emerges within the network, with Proof of Work consensus, the longer chain is accepted by any and all nodes. While the length of the chain could theoretically be used as a Fitness criteria in Fitness Gradient consensus, it would be insufficient on its own to differentiate between two competing blocks or blockchain segments vying for inclusion in the blockchain.

Due to the absence of a proof-of-work problem within Fitness Gradient consensus, a malicious node trying only to maximize chain length could rapidly build block upon block with no constraints, without spending time and devoting computational resources to the necessary work of executing, processing and validating smart contracts, records and transactions for inclusion into blocks. As a result, cooperative nodes would be at a disadvantage because they would be penalized for actually attempting to assess Fitness, while the malicious node would be rewarded for limiting its computational resources for its own use.

In Nakamoto Proof of Work consensus implementations, the possibility of competing chains is relatively rare, and nodes begin building on the first valid new block they encounter without evaluating fitness at all, only validity. The majority of time, there are no competing chains to compare.

In contrast, with the Fitness Gradient consensus, before block-building operation begins, a node will inquire from the surrounding nodes as to other chains' Fitness metric, and will download the highest-Fitness chain from among those that are present. It will then begin building on that chain. This mechanism encourages each note to actively seek out a large number of competing blocks chains, rank them for Fitness, choose the highest-Fitness one, and then download and build on that blockchain.

One of the key benefits of the present invention is that because chain length and chain difficulty are replaced by more energy-efficient Fitness metrics, the energy expenditure and computational resources required to verify and establish chain length and difficulty are eliminated, and the throughput of the blockchain is significantly increased.

By contrast, Proof of Work consensus methodology includes the proof-of-work algorithm as an additional step required to permit the use of chain length as a metric that can be used when attempting to resolve conflicts between competing chains. This extra step computationally inefficient and energy inefficient and unnecessarily increases processing time required to grow the blockchain.

The Fitness Gradient consensus variations of the present invention are simplified algorithms that eliminate this unnecessary and wasteful step. Hash Distance consensus in at least one embodiment determines a scalar value that can place a block within a gradient of Fitness values. More significantly, Hash Distance consensus uses the hash-distance scalar value as part of the Fitness metric when comparing chains, while proof-of-work either disregards block-hash comparisons entirely when comparing chains via block length, or uses only the target hash value when comparing aggregate difficulty of two chains, ignoring the block hash.

Comparison to Proof of Stake Consensus

There are a variety of implementations of Proof of Stake (like, for example, Casper), but most share some basic aspects. Proof of Stake depends on cryptographic power, in contrast to Proof of Work relying on computational power.

Essentially, in Proof of Stake consensus, the right to generate or propose blocks is granted to nodes that place tokens at stake, or that can claim a set of tokens on the chain that lend that node authority. In some implementations, there is some inherent quality of the referenced tokens that is used to establish which node has block-generation authority.

In others, like Casper, the block-generating nodes place a vote in real time (not on-chain, but as part of the network protocol) as to which block to accept. In other words, the block-generating node has some specific real-world authority to accept or render a decision on the new block.

Proof of Stake is an approach to determine which node or nodes are permitted to work on creating new blocks. In contrast, in the Fitness Gradient consensus, any node may create new blocks, and all nodes are encouraged to work on creating new blocks. Furthermore, the block building nodes in Fitness Gradient consensus do not have any requirement or incentive to hold, freeze or not commit tokens at all, unlike block building nodes that operate within many Proof of Stake systems. When tokens are taken into account in the Fitness Gradient consensus, it is to assess token activity on the chain generally for purposes of determining Fitness, rather than to establish whether or not a particular node is permitted to publish a block or vote on a block.

The Bucket consensus of at least one embodiment does require some tokens to be "locked" on-chain for a period, and the accounts that lock these tokens may receive a reward for doing so. However, there is no linkage between these accounts' participation and the determination which node gets to generate the block that is accepted (which is effectively random). In at least some embodiments, upon a block being accepted, separate rewards may be granted to both the block-building node and the accounts that froze tokens.

The Fitness Gradient consensus of at least one embodiment does not have a nomination/voting type protocol that authorized nodes participate in, as is utilized by certain Proof of Stake consensus systems. Convergence is achieved in Fitness Gradient because all nodes agree on the criteria used to assess Fitness. Fitness Gradient consensus generally and Hash Distance consensus in particular do not necessarily require in all embodiments that tokens be involved as part of the consensus algorithm; for instance, the Hash Distance value alone may be used to determine fitness. When Hash Distance does use tokens, as noted above, it may just use the history of tokens on chain, not tokens identified or associated in some way with the block-building node.

Bucket consensus, as well as other variations of Hash Distance consensus of at least one embodiment, rely upon a combination of computational power (hash-distance component) and cryptographic power (token value component), as opposed to only cryptographic power for consensus.

Definitions Pertaining to Fitness-Gradient Consensus and Variations

The term "Fitness", in the context of this application, refers to a numerical score that is derived from the state of a particular blockchain instance, or from the state of a particular blockchain segment. The present invention utilizes and implements one or more versions of the "Fitness-Gradient Consensus" algorithm to determine a Fitness score. Under Fitness Gradient Consensus, in accordance with at least one embodiment of the present invention, the blockchain segment that has the highest Fitness value will be selected as the base upon which to continue building the blockchain. In other words, it will be selected by the nodes (or Block-Building Nodes) on the Node Network as the correct blockchain segment in case of a conflict between different segments being present on the network. Different Fitness Gradient Consensus algorithms and their distinct approaches to resolving conflict between different competing blockchains and blockchain segments are described in more detail below.

The "Target Hash", in the context of this application, is a numerical value pertaining to a block at a particular height, which numerical value is known prior to that block's creation and is derived from some pre-existing state. The target hash may be compared to the block hash of the block in question in order to calculate that block's hash distance. The "Hash Distance," in the context of this application, is the absolute value of the difference between that block's block hash and its target hash. The hash distance is a key component of the fitness calculation within Hash Distance Consensus.

In at least one embodiment of the present invention, a variation of Fitness Gradient Consensus, referred to as "Hash Distance Consensus", would calculate Fitness as some function of Hash Distance. For example, one version would calculate Fitness as follows:

$$\sum_{i=G}^{N} c \frac{V^y_{unique\ tokens}}{k + j \cdot D_{hash\ distance}}$$

where V is the aggregate value of certain qualified tokens within a block, D is the hash distance for that block and c, k, j and y are constants, for all blocks with heights G through N within the segment.

The "Unique Tokens", in the context of this application refers to token values that have not been transferred, re-used or re-assigned within a particular blockchain segment; tokens that have not been re-cycled between different accounts, and are therefore not measured twice when aggregate token values are used to calculate the Fitness of a particular chain. Measuring unique tokens requires tracing the origin of tokens from account to account back to the first block of a blockchain segment being evaluated. In at least one embodiment of Hash Distance Consensus referred to as "Bucket Consensus", Fitness would be calculated in the same manner as Hash Distance Consensus, but where V includes tokens assigned to buckets via bucket assignment records, and the hash distance D is determined by using a specified value with a certain bucket as the target hash. For example, in one variation of bucket consensus, the target hash is the midpoint of the bucket to which the largest aggregate token value has been assigned via bucket assignment records for the block in question.

The "Bucket", in the context of this application, refers to a numerical range; one of a set of contiguous numerical ranges that overlaps with the output range of a cryptographic hash function. For instance, for any input, the output of SHA-256 hash will be some number between zero and $2^{256}$; the lowest bucket will have zero as its lower bound, and the highest bucket will have $2^{256}$ as its upper bound.

The "Bucket Assignment Record", in the context of this application, refers to a particular kind of record on the blockchain that links a certain token value with a particular conceptual bucket and a particular block height. The originating account that signs the bucket assignment record with its cryptographic key may place this token value at risk for whole or partial loss in exchange for a chance to earn a larger token reward in the future, some number of blocks following the block at the specified height.

All bucket assignment records may be competing for a limited number of slots, and would win inclusion in the blockchain (and would therefore win an opportunity to place tokens at risk) based on the size of the fee they include. In at least one embodiment, the bids for the slots are conducted in a type of a Dutch auction. Because the lowest clearing bid price is accepted for all bids, an unused fee surplus accrues for the higher bidders. In one embodiment, the fee surplus can be returned, but in another embodiment, it is re-applied in future blocks in order to persist the record beyond its initial tenure. In addition, long-lived records may re-execute for some number of blocks following the block where they are first included. The fee, in according with at least one embodiment, is set to cover this precise and consistent set of blocks, after which the record would need to be added again.

Fitness Gradient Consensus Process and Method

The Fitness Gradient blockchain consensus method of the present invention may implement the following steps, elements and features (although not all steps, elements and features are required in every embodiment).

(1) Fitness Gradient consensus is implemented within a Blockchain System and network consisting of Block Building Nodes. When a new Block Building Node comes online, it connects to the network by peering with other Block Building Nodes already connected to the network.

(2) A newly connected Block Building Node downloads blockchain blocks, block headers, smart contracts, data records and transactions from peer nodes within the node network. It downloads all blocks, block headers, smart contracts, records and transactions that have been added to the blockchain up until the current blockchain height N minus 1 (N−1), and then executes smart contracts and validates and processes the records and transactions in sequence, building up its own internal representation of global state.

(3) The Block Building Node begins receiving new smart contracts, records and transactions from peer nodes, as well as from wallets and other network participants. The Block Building Node adds them to a pool of unprocessed smart contracts, records or transactions.

(4) The Block Building Node begins receiving information regarding newly built blocks having height N that are generated by other Block Building Nodes, and which are shared within the network via a gossip protocol.

(5) The Block Building Node Evaluates the fitness of newly built blocks at height N that it becomes aware of, in order to identify which blocks have the highest Fitness value according to the criteria of whatever fitness formula or algorithm is in use by the blockchain system as a whole.

(6) The Block Building Node chooses the highest fitness block(s) to build upon and begins building a new block at height N plus 1, assembling smart contracts, records and transactions from the pool. Global state is updated by executing smart contracts and validating and processing the records and transactions contained in the new blocks.

(7) Other nodes on the network continue broadcasting blocks and block headers as they create them. Blocks and block headers are shared as quickly as they are built, with little delay. Some of these blocks will be at height N, and some of these will be at height N plus 1, and some of these may be at even higher heights still. In at least one embodiment, the Block Building Node will receive these blocks and begin analyzing them in a separate thread, system process or coroutine, apart from the thread, system process or coroutine that is building the new block.

(8) If the Block Building Node becomes aware of a block at height N that is of higher-fitness than the block it is currently building upon, it may discard the work it has done so far, and begin building on that block instead, depending on the size of the discrepancy.

(9) After building a new block at height N plus 1, the Block Building Node will calculate the fitness of that new block, and compare it to the fitness of other candidate blocks at the same height that have been broadcast across the network. If the Block Building Node determines that the new block that it produced has a higher fitness than the other blocks it has become aware of, or if the new block at least has a fitness that exceeds a certain threshold, then the node will broadcast that block to the network.

(10) The Block Building Node proceeds to return to step (3) above, to begin the process again. To wit, the node receives new records and new blocks, choosing the highest-fitness block that it becomes aware of at height N plus 1 (N+1), and begins building a new block at height N plus 2 (N+2). Alternately, in at least one embodiment, if it becomes aware of an already-built block at a higher height—for instance at block height N plus 2, or N plus 3—and if the blockchain segment that it belongs to has a higher aggregate fitness than the other nodes, then the Block Building Node may skip ahead and begin building a new block at a higher height—for instance, at block height N plus 3, or N plus 4.

In at least one embodiment of the present invention, when the fitness of a given block is evaluated, it may be evaluated on an individual basis, or it may be evaluated for the blockchain segment or the entire blockchain that the block belongs to. When the fitness of two blocks is compared, either the fitness of the entire blockchain that the blocks belong to is compared, or it is the fitness of two blockchain segments that incorporate the most recent ancestor block that is shared by both blocks.

In at least one embodiment, the fitness calculated for a particular block may be added to the block header that is shared among the network nodes, along with the aggregate fitness of certain blockchain segments of pre-determined length that the block belongs to, so that an indication of block fitness can be known by nodes before a whole block is downloaded, in order to accelerate fitness evaluation by Block Building Nodes.

Hash Distance Consensus Variant of Fitness Gradient Consensus

A variation of at least one embodiment of the Fitness Gradient Consensus algorithm and method of the present invention is the Hash Distance Consensus algorithm and method.

The Hash Distance consensus variant of Fitness Gradient consensus decides the Fitness value of a blockchain segment according to a function of the Hash Distance of each block within the blockchain segment being considered. The Fitness of an individual block within a Hash Distance Consensus system can be determined by calculating the fitness of a blockchain segment of size one that contains that single block.

The Hash Distance Fitness formula, in accordance with at least one embodiment, can be described as follows:

$$F(H, V) = \sum_{i=g}^{n} c \frac{V_i^y}{k + j \cdot H_i}$$

H: hash distance values for all blocks in the segment being evaluated
$H_i$: hash distance value for block i
V: "Aggregate Token Utilization" for all blocks in the segment being evaluated
$V_i$: "Aggregate Token Utilization" for block i, for unique tokens within the blockchain segment being evaluated.
g: the height of the first block within the blockchain segment being evaluated
n: the height of the last block within the blockchain segment being evaluated
c, k, y: tunable constants
j: tunable constant, probably the ratio 1 over the maximum block hash value possible Alternate embodiments of Hash Distance consensus may vary the manner in which the inputs to this function are generated, or may modify this function with another function accepting hash distance values as input criteria.

Bucket Consensus Variant of Hash Distance Consensus

The Bucket consensus implementation of a Hash Distance consensus system and method in accordance with at least one embodiment of the present invention is shown with reference to FIGS. 3, 4A-B and 5. Such actions described by these figures are performed by a block-building node or miner that is executing an embodiment of the Bucket consensus algorithm.

Figure 3:
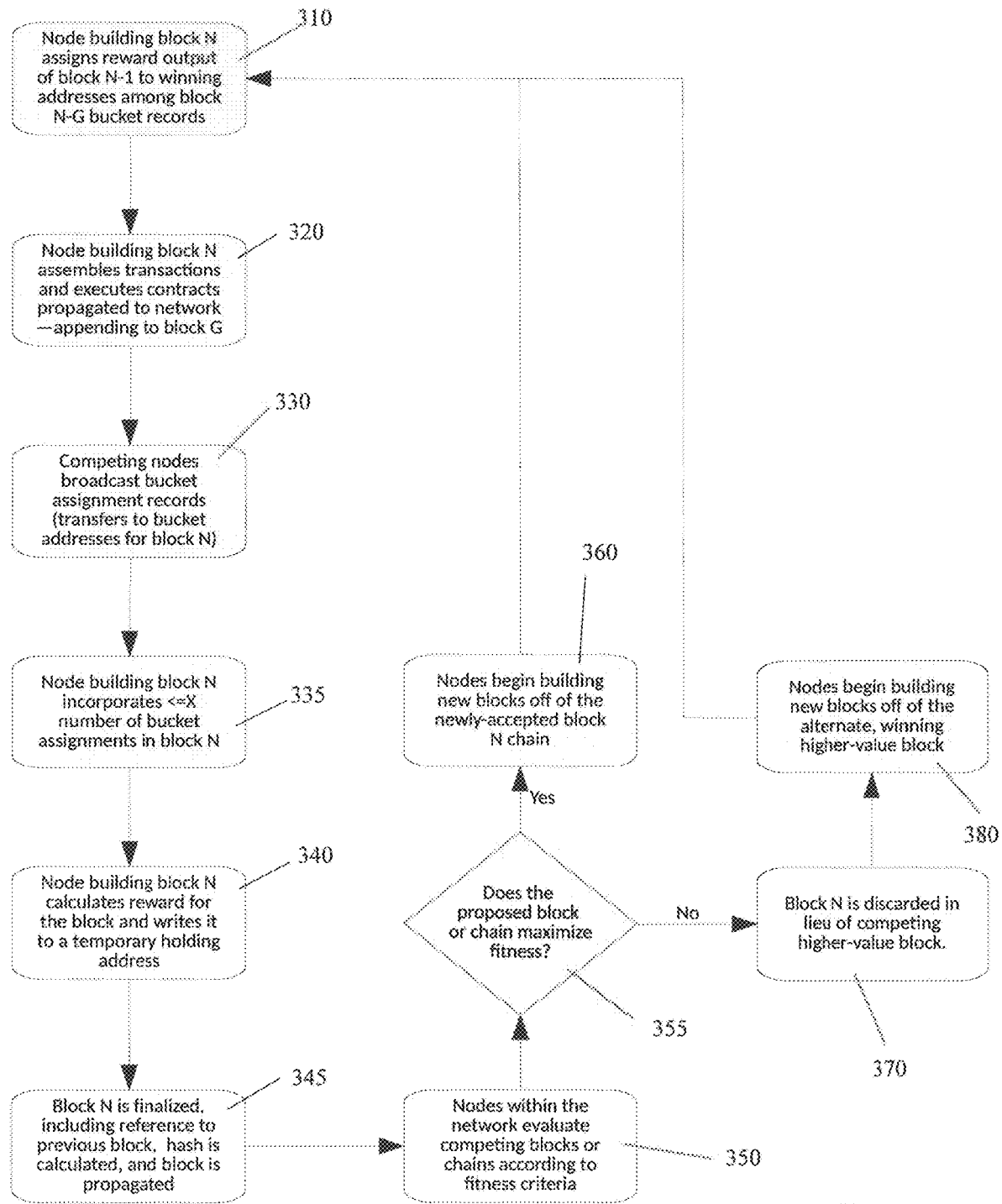
FIG. 3 illustrates the process flow for the Bucket consensus implementation of a Fitness Gradient consensus system and method in accordance with at least one embodiment of the present invention.

Referring to FIG. 3, at 310, within block numbered N (the current block), the reward output of block numbered N minus 1 (i.e. N−1) is assigned to winning addresses among the bucket records associated with block numbered N minus G (where G is a pre-defined constant integer value), as well as to the block building node or miner that generated block numbered N minus 1. At 320, within block numbered N transactions and records assigned to that block are assembled and smart contracts invoked within that block are executed.

Then, at 330, various nodes separate and apart from the block-building node broadcast bucket assignment records to the network. These records send tokens to bucket addresses for block numbered N. At 335, some portion of these bucket assignment records are incorporated into block numbered N, where the number of bucket assignment records incorporated into the block is less than or equal to a pre-defined upper limit count X. At 340, the token reward for block numbered N is calculated by the block-building node. The nature of this reward depends upon the nature or the variation or embodiment; for instance, it may incorporate some portion of tokens previously sent to buckets, or transaction or record fees, or new tokens generated as part of an inflationary token supply algorithm. The token reward value is stored in a temporary holding address for the block, in order for it to be allocated to the block-building node and bucket contributor(s) later in the process. Then, at 345, the block N is finalized, and the reference to the previous block (cryptographic hash of the previous block) is stored within the block N. The hash is also calculated for block N, and the block is propagated to the blockchain network for the Fitness evaluation.

At 350, other block building nodes within the node network evaluate the new block, and compare it to competing blocks based on Fitness criteria. Because nodes implement the same consensus algorithm, if all nodes share access to information about and the contents of the different competing blocks, all will independently choose and will agree upon the same block, whichever it may be, as having optimal Fitness. At 355, the evaluating nodes determine whether the proposed block or blockchain segment maximizes Fitness and whether the new block numbered N (or the blockchain segment containing this block) has the highest Fitness value among competing blocks (or blockchain segments).

If so, the evaluating nodes accept new block to the blockchain and begin building new blocks off the newly accepted block at 360. Otherwise, at step 370, the new block is determined not to be the winning block (based on the Fitness evaluation) and is discarded in lieu of a competing block with a higher Fitness value. Thus, instead of building on the new block, at 380, the evaluating notes begin building off of an alternative competing block that has a higher Fitness value. The block-building and evaluation process is then repeated for the next block with number N plus 1 (N+1), starting at 310.

In accordance with at least one embodiment, the block-building nodes incorporate by convention the highest value bucket token assignments they encounter. By convention, only the X number of bucket assignment records that assign the largest number of tokens to buckets are incorporated into the block. However, different block-building nodes within the same network may prioritize assignment records differently, provided that no more than X bucket assignment records are included in any one block. Higher-value wager values improve the likelihood that proposed block will be widely adopted and ultimately accepted.

The Fitness evaluation of competing blockchain segments or blocks—and the selection of the "winning" blockchain segment or block—can be implemented in at least one embodiment according to the following criteria and method. In step (1), the aggregate bucket value for the whole blockchain segment or block is calculated incorporating the values of all the buckets within all the blocks of the segment (this is the "aggregate tokens utilized" for that blockchain segment). In step (2), the "aggregate hash distance" for the whole blockchain segment or block is calculated by adding together the individual hash distance values for each block within the segment (i.e. the distance between block hash and winning bucket for each block, all added together). In step (3), the "aggregate tokens utilized" is divided by the "aggregate hash distance" to generate the Fitness value of the segment. Larger fitness values will be favored.

Alternately, the Fitness evaluation of block segments or blocks can also be implemented in at least one embodiment as follows. In step (1), an aggregate bucket value is calculated for each individual block (in other words, the "aggregate tokens utilized" value would first be calculated separately for each block in the segment). In step (2), an individual Fitness value is calculated for each block by dividing the block's aggregate bucket value by the hash distance of that individual block. In step (3) the Fitness values of individual blocks are aggregated into a single Fitness value for the blockchain segment. In other words, for each winning bucket, divide bucket value by hash distance, then aggregate all resulting quotients. As in the previous approach, larger fitness values will be favored.

Either of the preceding two variations may supplement the calculation of the "aggregate tokens utilized" value by incorporating the value of eligible token utilization within the blockchain segment. For example, token transfers and token fees paid within the segment would be incorporated in addition to the value of tokens assigned to buckets, such that blockchain segments containing records that move more tokens have a higher Fitness. Cyclic token transfers or spending would be fully discounted: within the blockchain segment, any token utilization being considered cannot be included in the aggregate if transmitted onward again after a first utilization; if spend is sent to an address, any spend from that address is subsequently reduced by the amount received, and any discounted amount received is not counted for the recipient address.

Figure 4A:
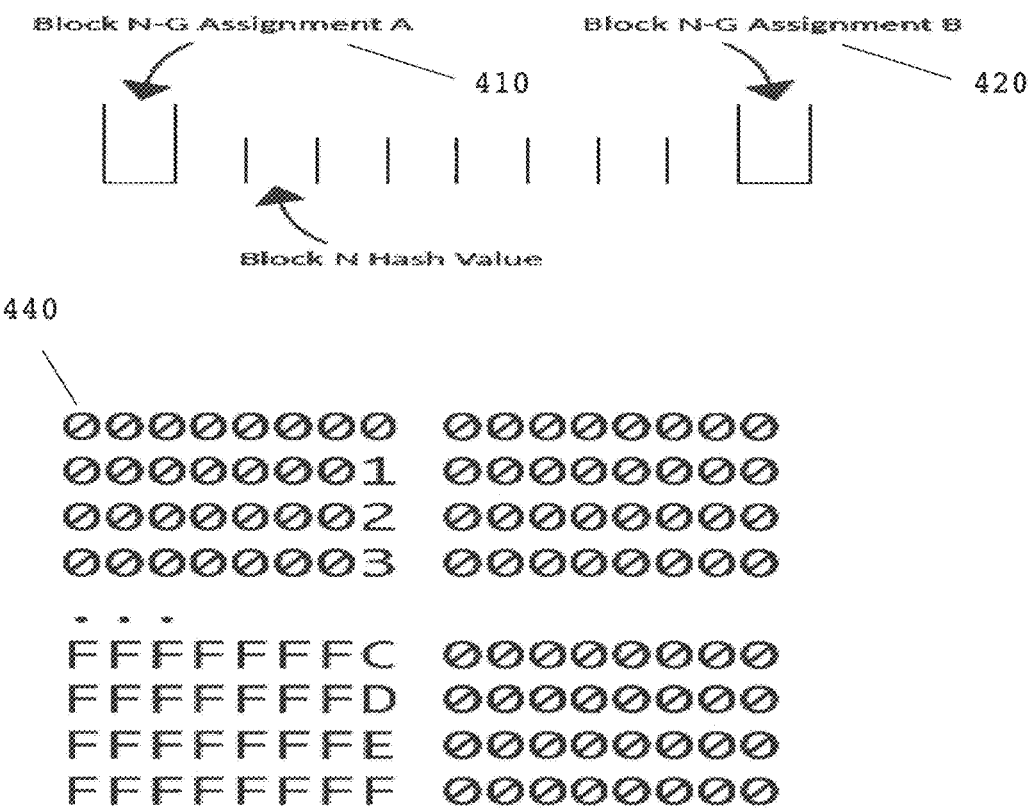
FIGS. 4A and 4B illustrate the Bucket consensus structure, organization and information stored in a bucket implementation of a Fitness Gradient consensus system and method in accordance with at least one embodiment of the present invention.
Figure 4A:
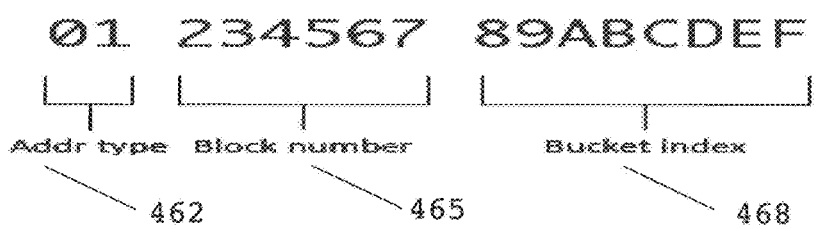
Figure 4B:
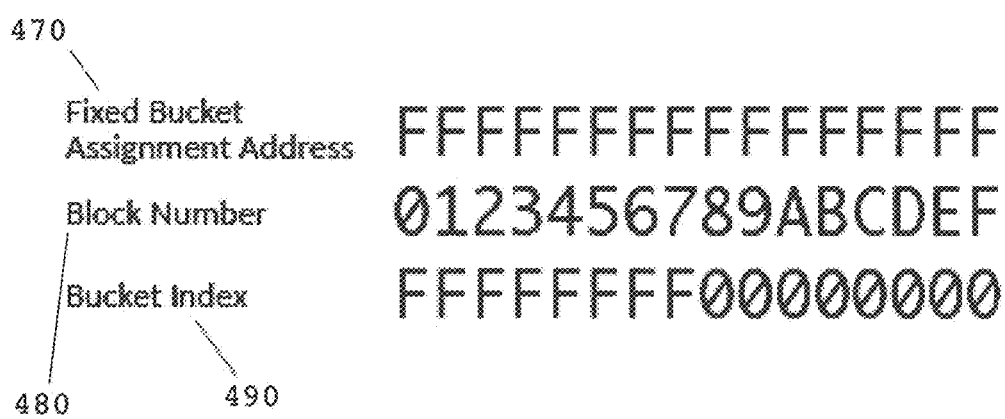

FIGS. 4A-B illustrate the Bucket consensus structure, organization and information stored in a bucket implementation of a Fitness Gradient consensus system and method in accordance with at least one embodiment of the present invention.

Each bucket represents a range of values potentially conforming to the block hash value that is yet to be determined for a future block numbered N. In other words, each bucket contains a potential target hash for block numbered N. Such a hash target for a bucket may be determined in a number of ways depending on the embodiment: it may be the midpoint of the value range represented by the bucket, it may be the minimum or maximum value represented by the bucket, or by some other function that is implemented consistently by all nodes. An assignment of tokens to a particular bucket is a vote in favor of that hash target.

Referring to FIGS. 4A-B, competing users (i.e. token holders) bet on the hash target of future blocks by sending tokens to individual buckets. The tokens sent to the bucket in block numbered N minus G (block N-G) that is closest to the final block hash value of block number N wins a token reward calculated for block number N.

Users send tokens to buckets by generating bucket assignment records (specifying bucket index, block number, token value, etc.), which records are signed with the private key of the account or address contributing the token value. Those records are broadcast block building nodes, so that these records may be included in a block that is accepted to the blockchain. Block building nodes will select certain proposed bucket assignment records and include them in new blocks, in at least one embodiment by ranking proposed records and selecting the X number of records that assign the highest token value to buckets for a particular block. Nodes will discard proposed block assignment records that were not successfully incorporated in past blocks, and will only attempt to incorporate block assignment records transactions for the current block.

Referring to FIGS. 4A-B, the Assignment A 410, which is registered as part of Block N-G (block numbered N minus G), "wins" (or gets assigned) a token reward for block numbered N over Assignment B 420 because it has committed to the bucket with the value closest to the final hash of Block numbered N. Such a token reward may include the tokens assigned to other buckets that did not "win" (i.e. buckets that are not the buckets of block N-G that are the closest to the block hash of block N).

In at least one embodiment, the buckets may be represented as addresses, so that token assignments may be made by transferring tokens (or by pointing) to such addresses.

Buckets may be represented as addresses 440, so that token assignments may be made by transferring tokens to such addresses. In the case shown, a blockchain uses eight-byte block hashes, but may have hashes that are either longer or shorted in accordance with other embodiments. In the case of this embodiment, the first four bytes may be used as a value to describe each bucket, thereby limiting the number of available buckets, so that there are fewer buckets than available hash values. In alternative embodiments, either more or less than one-half of the hash length may be used to define buckets, up to the full block hash size.

In the example shown in FIGS. 4A-4B, more than two billion buckets may be defined, but in alternative embodiments, more or fewer buckets may be defined. With so many buckets, the closest bucket holding any value may not be the bucket immediately closest to a hash; the bucket chosen will be the closest bucket holding value.

In at least one embodiment, blockchain may use eight-byte words to represent addresses to or from which tokens may be sent. Addresses within this blockchain may be distinguishable from each other according to their usage. Buckets are represented by addresses that are distinguished from contract addresses or user account addresses.

Referring to FIG. 4A, one way to distinguish such addresses from each other is to use a prefix. For instance, the first byte 462 of an address may be used to encode the "bucket assignment" address type. If the last four bytes 468 of the address are used to encode the bucket (ex. bucket index), then the remaining three bytes 465 may be used to encode the block number that the wager pertains to. In such a configuration, six bytes could be used to represent the block number the bucket assignment record is targeting, permitting any of ~16.8 million block generations to be referenced. In other embodiments, the address length may be higher, permitting more block numbers to be accounted for and used.

Alternatively, as illustrated in FIG. 4B, one fixed bucket assignment address 470 may be designated as the destination of all bucket assignment transaction, with block number 480 and bucket index 490 being separate fields within the bucket assignment record, along with token amount and token source account or token source address. In other embodiments, other data may also be included as separate fields of the record. For example, address type and block number may be included as separate fields within a bucket assignment record, such that the bucket address itself would only comprise the bucket index.

Figure 5:
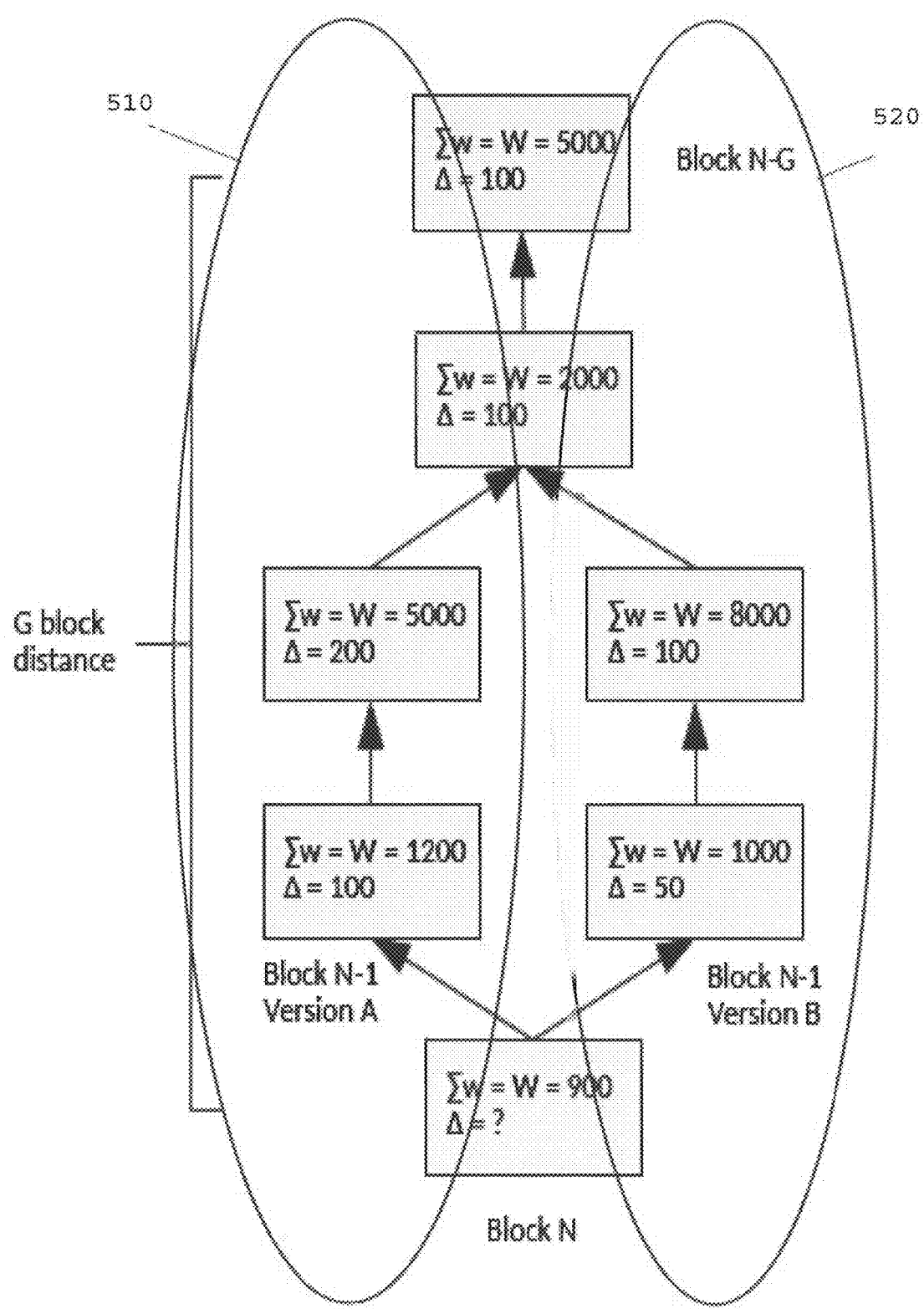
FIG. 5 illustrates a Fitness Gradient consensus determination between two competing blockchains A and B for the block N, in accordance with at least one embodiment of the Fitness Gradient consensus system and method of the present invention.

An example of the Fitness Gradient consensus determination between two competing blockchains A and B for the building block N, in accordance with at least one embodiment of the preset invention is shown in FIG. 5. Deciding between competing chains may be handled by a variety of algorithms that take into account the tokens assigned to buckets, as well as winning hash distances, in accordance with present invention. In one example, a system consisting of block building nodes determines which blockchain segment has the higher Fitness value, calculated to be $\Sigma W/\Sigma \Delta$, where "W" represents the aggregate tokens utilized value for a given block (i.e., the sum of all bucket assignment values and other eligible token utilization within the block), and "$\Delta$" represents the hash distance for a given block.

As illustrated in FIG. 5, a node building Block numbered N must decide between building on Version A 510 or Version B 520 of block numbered N minus one (Block N−1), which blocks are at the terminal ends of blockchain segments Version A and Version B. In other words, these two versions of block numbered N minus one are competing against each other on the network, but only one will be included in the blockchain that contains Block N.

To determine the correct block to build upon, the node must calculate a Fitness value for each distinct blockchain segment being evaluated. In the example shown in FIG. 5, the Version A blockchain segment 510 has a weight=(5000+2000+5000+1200)/(100+100+200+100)≈13300/470=28.29. The Version B chain 520 has a weight=(5000+2000+8000+1000)/(100+100+100+50)=16000/350=45.71. Thus, Version B chain has a higher Fitness Gradient value. Once a block-building node is informed with regards to both chains, it will build Block N on the Version B 520 chain because of its higher Fitness value. The Version B block numbered N−1 will be referenced by the new block numbered N that is being constructed, thereby growing the chain.

For each block in FIG. 5, $\Delta$ is determined by comparing each block's block hash to the bucket assignment records of the block situated G number of blocks prior to the block being evaluated. Because the value of $\Delta$ depends on having knowledge of the block hash of the block being considered, it is not calculated by the block building node that builds block it describes, but is instead calculated by the node building the next block. The $\Delta$ value of block numbered N will be incorporated in block numbered N plus 1, which is why the $\Delta$ value of Block N in FIG. 5 is unknown.

Figure 6:
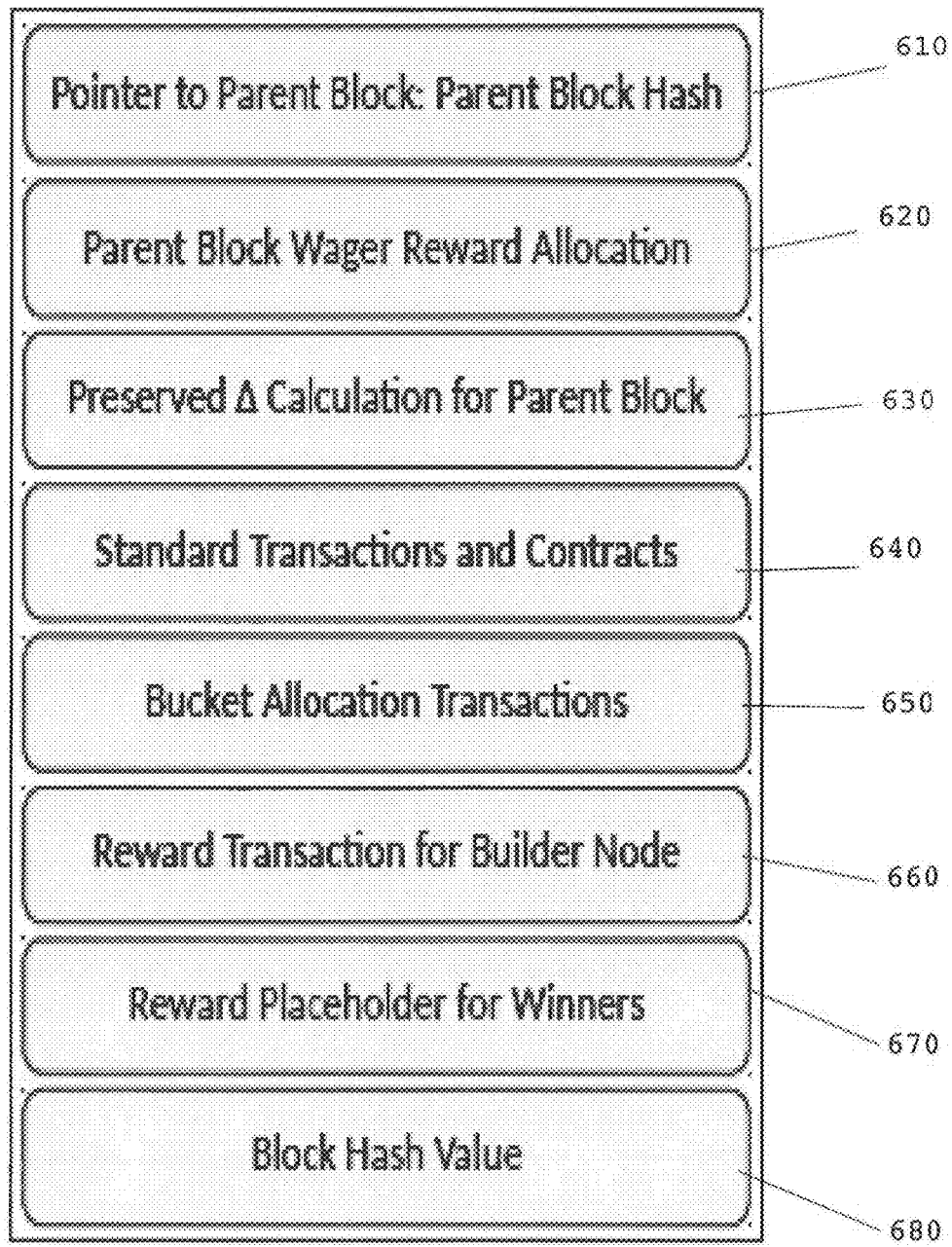
FIG. 6 illustrates the organization and data stored in a block in accordance with at least one embodiment of the present invention.

FIG. 6 illustrates the information that may be stored on a block, in accordance with at least one embodiment of the present invention. The block may contain such information as a Pointer to Parent Block or Parent Block Hash 610, which connects the block to its preceding (i.e. parent) block. It may also include a Parent Block Wager Reward Allocation 620, i.e. an allocation of token rewards to the accounts that made bucket assignments that were used in determining the Fitness of the prior (i.e. parent) block. It may contain a Preserved $\Delta$ Calculation for Parent Block 630, which is the hash distance value calculated for the preceding (i.e. parent) block. Standard Transactions and Contracts 640 may be placed in a block or be included indirectly as a pointer or a hash to the actual data. The block may also include Bucket Allocation Transactions 650, i.e. bucket allocation records that will be used to calculate the Fitness of a future block. It may also include a Reward Transaction for a Builder Node 660, which allocates some portion of the reward to the block building node that generated the block, and a Reward Placeholder for Winners 670, which would temporarily store the reward to be assigned in the next block to the bucket contributors that helped determine the Fitness of this block.

Finally, it may contain a Block Hash Value 680, which is a cryptographic hash of all the other elements of the block.

Blocks are built to conform to an internal structure that is verifiable. The data inside of a block must be ordered in a deterministic way, such that two blocks that contain the same data should always be identical. Within a block, standard transactions and contracts 640 may be recorded independently from data relevant to the consensus algorithm information. This means that this consensus algorithm should be able to accommodate a variety application functionality that may be implemented upon it.

Depending on the specific blockchain implementation, each block-building node may be permitted to assign some portion of the aggregate block reward to its own address 660. The reward that will be allocated to the winners for this block must be assigned to a placeholder address 670, due to the fact that the recipient is unknowable until the hash value has been calculated for the whole block. The subsequent child block will distribute this reward.

Alternate Bucket Consensus Method

Another version of the Bucket Consensus algorithm and method in accordance with at least one embodiment of the present invention is a variant whereby there isn't any one single winner that is allocated bucket rewards. Rather, all accounts that assign tokens to buckets may potentially receive rewards.

In this variation, the target hash is determined by the one bucket that has received the highest allocation of tokens among all the buckets. As in the preceding version of Bucket Consensus described above, each block allows up to X number of bucket allocation records, each record having a token allocation value w. In this scenario, however, the bucket that has the highest aggregate token allocation $\Sigma w$ is designated the target bucket, representing a target hash value T.

In at least one embodiment, Bucket allocation records for the block at height N minus G (block N-G) are used when forming the block at height N to determine what the target hash value is for that block. For instance, the midpoint of the bucket with the highest token allocation value in the block at height N minus G would become the target hash for block at height N. Among all of the potential new blocks generated by block-building nodes, the block that has the hash value closest to that target hash T is most likely to be used by nodes in the network to build the next block at height N plus one.

In at least one embodiment, the reward is distributed proportionally to all accounts that contributed tokens to the buckets of that block. The new block created at height N plus one will contain a record or records that proportionally distribute token rewards for the prior block at height N to those accounts that originated the bucket allocation records included with the block at height N minus G. Each account will receive a proportional allocation of the reward depending on the size of the allocation it made to the buckets in that block. Some portion of the token reward may also be assigned to an account designated by the network node that assembled/constructed the accepted block N.

In at least one embodiment, the reward would consist of the same rewards as would be included in any block within a Fitness Consensus implementation, including token fees included in various records and transactions, fees used to pay for smart contract execution, and any new tokens generated as part of an inflationary token supply algorithm. However, tokens contributed to buckets would not be included in the reward, but would be returned to the accounts that originally contributed them.

Unlike the preceding version of Bucket Consensus described above, users in this scenario are not incentivized to assign tokens to buckets in pursuit gaining a large reward, at the risk of losing all tokens assigned. Instead, users are incentivized to lock tokens in buckets for G number of blocks because of the assurance that they will receive a portion of the block reward after the lock-in period has ended. By locking these tokens, the blockchain is secured, because any parallel or competing chain created in a double-spend attack will have to have access to a greater number of unique tokens than those contributed to blocks generated within the lock-in period.

Hash Distance Consensus without Buckets

In another variation of Hash Distance consensus in accordance with present invention, users do not assign tokens to buckets. Instead, the users lock their tokens for a period of time in exchange for a portion of the reward.

Unlike the Bucket consensus variation of Hash Distance consensus described above, the locked tokens do not influence the target hash at all. But, in a manner similar to the Bucket consensus method, the aggregate value of the locked tokens in this embodiment contributes to the calculation of a block's or a sub-chain's fitness value. Fitness is established by comparing the hash of individual blocks in a proposed chain with a target hash appropriate to each block, and combining that hash distance value via some function with the total tokens assigned within the chain. The target hash in each case would come from an on-chain source; for instance, the target hash could be a transformation of the block hash already calculated for the block occurring some G number of blocks prior to the current block.

To illustrate: let total token assignment, S, within a blockchain segment equal $\Sigma s$, the sum of all native tokens assigned within each block of that segment. Let the total hash distance, D, within the blockchain segment equal $\Sigma d$, the sum of the individual distances between the hash of each block and each block's target hash for all blocks in that segment. Then, the blockchain segment chosen to build upon may be determined by choosing the chain with the largest value S/D (i.e. the largest value $\Sigma s/\Sigma d$), which would be considered the Fitness value for that segment.

In another embodiment, the chosen block may be determined by choosing the chain with the largest value $\Sigma(s/d)$. In other alternate embodiments, the chosen block may be determined by choosing the chain with the largest value $(\Sigma s^a/\Sigma(d+c)^b)^j$, where the values a, b, c and j are constant or are otherwise known deterministically upon each iteration based on the state of the chain, in a manner agreed upon by the network.

In another variation, Fitness of a blockchain segment is determined by a function $f(s_1, s_2, s_3, s_4, \ldots s_y, s_z, d_1, d_2, d_3, d_4, \ldots d_z, d_z)$, for blocks 1 through Z within that segment. The hash distance $d_i$ in this variation, as in other variations, is the absolute value of the difference between the hash of the block i being evaluated, and the target hash. The target hash is determined by some fixed algorithm able to determine the target in advance of the consensus evaluation being made. In at least one embodiment, the target hash for block numbered N would be the cryptographic hash of the block hash already calculated for block numbered N minus G. In at least one other embodiment, the target hash of block numbered N, $t_N$, would be the actual hash of the prior block numbered N minus G, plus some pre-determinable offset c, according to the formula:

$$d_N = |h_N - h_{N-G}| + c$$

Fitness Gradient Consensus Using Space and Time

In another variation of Fitness Gradient consensus in accordance with at least one embodiment of the present invention, users do not assign tokens to buckets, and the use of a hash distance value is optional. Instead, the fitness calculated for each block depends primarily on the number of computational steps performed by processing records within the block (time), on the amount of data or quantity of records in the block (space), and/or on the value of unique tokens within the block.

The embodiment using the Fitness Gradient Consensus Using Size and Time method, which builds upon of the general Fitness Gradient consensus process of the present invention, may implement the following steps, elements and features (although not all steps, elements and features are required in every embodiment). First, certain measurable metrics are collected with regards to each block:

(1) Some "unique token" value $V_i$ is calculated for every block in the sub-chain, which value is equal to some quantity of unique tokens assigned within that block, for example (a) tokens assigned to buckets within that block; (b) tokens included as fees for records added to that block; (c) tokens otherwise assigned within the block.

Here, as elsewhere herein, "unique tokens" refers to the "aggregate token utilization" of tokens that have not been transferred more than once, re-used or re-assigned within a particular blockchain segment—i.e. tokens that have not been re-cycled between different accounts, and are therefore not measured twice when aggregate token values are used to calculate the fitness of a particular chain.

(2) Some size value $S_i$ is calculated for every block in the sub-chain, which value may equal the number of records that have been added to the block (i.e. that are encapsulated within its Merkle tree or other data structure), or may equal the amount of memory occupied by the block, inclusive of all the records that it represents.

(3) Some execution time value $T_i$ is determined for every block in the sub-chain, which value represents the number of computational steps required to complete the validation and evaluation of the block, including the execution of all smart contracts invoked by records within the block. This value would be determined by actually validating the sub-chain, in the process executing all smart contracts invoked, and keeping track of all computational steps.

(4) Some hash distance value $D_i$ is calculated for every block in the sub-chain, as described elsewhere herein.

Second, a particular function accepting these values as parameters is defined—F(V, S, T, H), where V, S, T and D are ordered lists of the aggregate unique token value, size, execution time and hash distance values for each of the blocks in the sub-chain—which function represents the fitness metric used to determine fitness for use in the Fitness Gradient consensus process described herein:

(1) In one variation of this function, some constant scalar parameters are decided upon—s, t, d—each of which represents the relative weight given to each of the above dynamic block values when added together to determine the fitness metric value for the sub-chain, according to the following formula:

$$F(V, S, T, H) = \sum_{i=G}^{N} V + s \cdot S_i + t \cdot T_i + d \cdot D_i$$

If any value should be discounted fully, then its accompanying constant would be set to zero. For instance, if only the unique token quantity and the size were to be used to calculate fitness, then the values assigned to d and t would be zero.

(2) A number of variations of this function could also be used; some examples of specific formulas that combine all of the above would be as follows (where, in addition to the variables and constants described above, G is the index of the first block in the sub-chain, N is the index of the last block in the sub-chain, and c and k arbitrary constants selected to optimize the performance of the Fitness Gradient algorithm):

$$F(V, S, T, H) = \sum_{i=G}^{N} \frac{k \cdot V_i}{c + d \cdot D_i + s \cdot S_i + t \cdot T_i} \quad \text{(i)}$$

$$F(V, S, T, H) = \sum_{i=G}^{N} \frac{d \cdot V_i}{c + D_i} + \frac{s \cdot V_i}{S_i} + \frac{t \cdot V_i}{T_i} \quad \text{(ii)}$$

$$F(V, S, T, H) = \sum_{i=G}^{N} \frac{k \cdot V_i}{S_i \cdot (c + d \cdot D_i)} \quad \text{(iii)}$$

$$F(V, S, T, H) = \sum_{i=G}^{N} \frac{k \cdot V_i}{T_i \cdot (c + d \cdot D_i)} \quad \text{(iv)}$$

$$F(V, S, T, H) = \sum_{i=G}^{N} \frac{k \cdot V_i}{c + s \cdot t \cdot S_i \cdot T_i} \quad \text{(v)}$$

Discounting Duplicate Token Utilization; Identifying Unique Tokens

In at least one embodiment of Fitness Gradient consensus or Hash Distance consensus, token utilization counted to determine the "Aggregate Token Utilization" of blocks and blockchain segments, or token assignment activity otherwise used as an input to a fitness calculation, should not include tokens reassigned or reused within the period being evaluated, but should only include "Unique Tokens".

Two blockchain segments or forks being compared in the context of Fitness Gradient consensus ultimately trace their origin to a shared branching point somewhere within their history. The evaluation period for comparison only needs to include blocks included after that branching point (or some fixed number of blocks that precede that branching point) up until the most recent block being evaluated.

The term "evaluation period" is used herein to describe the set of blocks within each of the two segments being compared, the blocks of which link back via recursive back references to the shared branching point, in combination with the blockchain segment of size P which precedes and includes the block at the shared branching point (where P>=0).

Once a token value is assigned to a new address or account within the evaluation period, then at that point that value is included in the "Aggregate Token Utilization" value being calculated.

However, no token value may be double counted within the same evaluation period for a particular chain. When a source address or account is evaluated as to whether it contains sufficient token value to permit the assignment of its tokens to another address or account, any token value previously assigned to that address or account within the evaluation period will be wholly discounted from the contribution of that token assignment to the "Aggregate Token Utilization" value. Furthermore, any assignments originating from such an address or account will be similarly limited in subsequent assignments for purposes of determining the "Aggregate Token Utilization" within the evaluation period.

Without this limitation, a block-building node can construct a block with a Fitness value that is artificially inflated by the same tokens being sent back and forth, or spent and re-spent on fees, by accounts controlled by the block-building node.

Rewards Granted to Participants in Fitness Gradient Consensus

In at least one embodiment of the Fitness Gradient consensus of the present invention, for each block that is added to the blockchain, a token reward is determined according to some function of the record-generation activity within the block (token assignments, contract execution, and any other activities recorded within the block). This reward is assigned to one or more accounts chosen by the block-building node that has created the block, as well as to one or more accounts that may be mandated reward recipients according to the consensus algorithm implemented within the specific embodiment.

The block reward may have a variety of different sources, which may include one or all of the following, depending on the specific implementation or embodiment:

Brand-new tokens that increase the total aggregate token value available on the chain at a certain rate per block, which tokens are generated as part of an inflationary token supply algorithm.

The aggregate of individual fees and awards attached to data records included in the block; token fees and awards attached to data records incentivize the inclusion of those particular data records in the block (records without sufficient rewards may not be included).

The rescission or revocation of tokens that were originally awarded N minus R number of blocks prior to the current block (where R<=N), incentivizing the active use of tokens.

In at least one embodiment of Bucket Consensus, the token values assigned to bucket allocation addresses of the current block N; or, alternately, the token values assigned to the bucket allocation addresses of the block N-G which are used to calculate the hash distance for block N.

Depending on the specific implementation or embodiment of Fitness Gradient consensus, this reward may be assigned in whole or in part to an account associated with the block-building node that built the block, and/or it may be wholly or partially assigned to other accounts that participate in the consensus process.

In at least one embodiment of Bucket Consensus, a portion of the reward is allocated to those accounts that contribute tokens to the buckets that help determine the fitness of the new block, as described elsewhere herein.

"Trust-but-Verify" Variation of Fitness Gradient Consensus

Another variation of the Fitness Gradient Consensus system in accordance with at least one embodiment of the invention deals with transaction throughput limitations of the known current systems and improves the transaction throughput of the blockchain system.

One of the recognized hurdles that hinder the broad-scale adoption of blockchain technology in a variety of sectors is the "transaction throughput" of such systems. The Visa credit card network reports that it handles approximately 1,700 transactions per second on average, with an ability to scale to 24,000 transactions per second. The MasterCard credit card system has reported similar numbers.

The Bitcoin blockchain, by contrast, is unable to exceed 10 transactions per second, and Ethereum can typically process up to only 20 transactions per second. These well-known limitations of proof-of-work systems hinder the wider adoption of these blockchains in financial and other sectors and applications.

One major constraint of the known proof-of-work blockchain systems (and of many proof-of-stake systems) is their linearity. Because the output of every transaction can act as the possible input of every subsequent transaction, all operations must be executed sequentially, and all records must be ordered deterministically. Furthermore, the blockchain is organized as a linked chain—a linear sequence of nodes. Thus, a new block can only be created once the preceding blocks are known.

Under the linearity constraint, the maximum throughput of any blockchain can be theoretically projected as the number of operations and records that can be processed in sequence by a program running in a single thread on one computer. Depending on the hardware and software used, this may be hundreds of thousands or millions of operations per second—which can translate to many thousands of transactions per second, depending on the computational complexity of individual transactions.

Furthermore, in reality, actual observed throughput varies significantly from this theoretical maximum. A number of different reasons explain this difference and account for why known blockchain implementations are unable to achieve this theoretical maximum throughput.

In the known proof-of-work consensus systems, the bulk of computational resources are spent on solving the proof-of-work problem. Calculating the proof of work creates a delay, but this delay is treated as a feature rather than a flaw by these systems. The difficulty of the proof-of-work is targeted to a specific time delay between blocks, and difficulty is adjusted in order to sync to that time delay.

The known proof-of-stake consensus systems, as well as voting and approval-based consensus systems, take time to coordinate among nodes, so as to decide which node is authorized to create a new block. In practice, these approaches allow a much faster block-creation time and higher transaction throughput than proof-of-work systems, but typically at the expense of requiring some kind of centralization.

Still, even in these systems, the amount of time required to establish consensus is not trivial, as it does require nodes to sync their status. In addition, most of these systems build in some delay between blocks (during the consensus and creation), in order to provide enough time to allow for data propagation.

The delay between blocks allows for data records and discovered blocks to propagate over the network, typically via a gossip protocol. Between these two categories of data, transactions will constitute the greater proportion.

When a new block is created and distributed, nodes within the network will validate the block by executing the transactions that it contains. A "trust-but-verify" variation of the Fitness Gradient consensus in accordance with at least one embodiment purports to eliminate or reduce several of the known constraints of the known blockchain implementations, and allow practical blockchain system processing throughput to approach the theoretical maximum throughput (discussed above).

An example of the propagation block propagation using the "trust-but-verify" variation of the Fitness Gradient consensus in accordance with at least one embodiment of the invention is described below with reference to FIGS. 12A-D and 13A-B.

In at least one embodiment, the present invention will still execute the blockchain's operations linearly, but will utilize and leverage multi-processor/multi-core/multi-cpu (or clustered) computer systems by performing validation processing in a parallel, multi-threaded (or multi-process), software implementation. In at least one embodiment of the present invention, each of the following activities may occur simultaneously and largely independent from the other activities:

(a) the main block-building thread, process or coroutine builds upon the highest-Fitness block known to the node from among blocks already broadcast to the network;

(b) one thread, process or coroutine continues to build upon the node's own prior best block that it produced itself (inherently validated and confirmed) in case the "winning" thread, process or coroutine is not able to be validated (i.e. is fraudulent);

(c) one or more threads/processes in parallel build upon the runner-up block, or a late-discovered block, as another backup to the highest-fitness block;

(d) one or more threads/processes in parallel acquire from peer nodes all the externally acquired blocks' transactions, and then proceed to validate those blocks.

Using this methodology of the Fitness Gradient consensus of the present invention, a node does face a large risk that block-building efforts will be wasted in the event that a fraudulent, unverifiable block is adopted as the basis upon which to begin building the next block. Such fraudulent block will have to be discarded, along with any work performed to build upon it.

However, so long as the incidence of fraud is low, then the throughput of the implementation in accordance with at least one embodiment of the present invention would correspond to the speed of the threads/processes working to build the next block. Even being within one or two orders of magnitude of the theoretical maximum throughput would make Fitness Gradient consensus variation of the present invention, using the "trust but verify" data propagation method, more efficient and better performing (with regards to throughput) than the existing blockchain implementations.

Trust-but-Verify Block Propagation Method Using Bloom Filters

In at least one embodiment, the "trust-but-verify" data propagation operates as follows.

(1) Data records (such as transfer records or trade order records) are not propagated widely across the network prior to block creation. Prior to block creation, data records are only shared with direct peers, or peers of peers at some specific small number of hops away from the data-record-generating node.

Each block-building node only creates new blocks using data records originating from its near neighborhood. Near neighbors push transactions to each other immediately upon acquisition, but at a certain level of remove, propagation stops.

A node would know how many hops a particular data record has taken, because the record propagated would include that information. A node would decide whether or not to forward the data record based on that knowledge, and if the data is forwarded, the receiving node would be provided with an updated number reflecting the additional hop.

(2) Newly created blocks are propagated across the network via the gossip protocol, but only certain core essential fields are included with such block data. It is a common feature among blockchain implementations that a block's representation in memory and as a transmissible message (elsewhere referred to here as the "block header") excludes the bulk of the data belonging to the block in concept. In any event, enough information is included with each block to assess its Fitness and to otherwise perform the algorithm, including the block's "Account Bloom Filter" and calculated Fitness value.

(3) As nodes become aware of newly created blocks, low-Fitness blocks are discarded, while high-Fitness blocks are retained and forwarded onward. Most nodes will converge on the same set of high-Fitness blocks. Due to the fact that blocks at this stage are not validated (except for by the original creator), there exists the possibility that some of these blocks are fraudulent. In the context of the present invention, a "Fraudulent Block" is a block that has been transmitted, shared or broadcast by a block-building node despite being invalid according to the standards and software of the blockchain system. In order to mitigate the risk of building on more fraudulent blocks, block-building nodes may retain and build upon more than one block for redundancy.

(4) Immediately after the distribution of blocks has reasonably stabilized—meaning that the rate of high-Fitness blocks being sent over the wire has slowed to below a certain threshold, as measured from the perspective of an individual node—the node will begin to build the next block on top of the high-Fitness blocks that it has retained. It will build the block using the data records that it has itself generated locally, or that have been generated in its near neighborhood (as described above).

When a node builds this new block, the node will create a Bloom filter, representing all accounts affected during the execution of the block (the "Account Bloom Filter"). Alternately, two or more Bloom filters may be created, accounting for source accounts and destination accounts separately. In at least one embodiment, one or more additional Bloom filters may also be created which account for other data affected by the block which is not associated with any account. The Bloom filter(s) will be included with the block and distributed as part of the "block header" message sent.

Accounts included in the Account Bloom Filter(s) are those for which some data has changed within the block with which the Bloom filter(s) are associated. If an account is found inside the Account Bloom Filter(s), then it is possible or likely that its state would be modified if the node were to validate and execute the block. However, if an account is not found in the Bloom filter, then it is certain that the state of that account would be unchanged by the validation of the block, and therefore its current state would already be known by the node, even if the node has not yet validated or executed the block. The Bloom filter, in accordance with at least one embodiment of the invention, allows a new block to be built without having to validate and execute the prior block in order to update account values. Accounts can be checked for membership in the Account Bloom Filters as a smart contract executes, or as a data record is added to the block. The affected accounts are checked to ensure that each account is not contained within the prior block's Bloom filter. If so, the execution of the contract or inclusion of the record is halted, and it is discarded from the block.

(5) The Bloom filters used can afford to have a relatively high false-positive rate, allowing them to be smaller and faster than in most use-cases. Transactions that are discarded from one block in most cases can be included in a subsequent block.

Because addresses are generated via cryptographic hash, their distribution is already randomly distributed over the range of possible hash values. A simple modulo operation has been shown to be sufficient in such cases to achieve a low false-positive ratio, without additional hashing, as shown by Jianyuan Lu, et al., in their 2015 paper, "One-Hashing Bloom Filter", published in conjunction with the IEEE 23rd International Symposium on Quality of Service. Alternately, or in combination, a compressed Bloom filter could be used to reduce the size of the filter for transmission. The compression can be done in a number of known ways, including as described by Michael Mitzenmacher of Harvard in his 2002 paper, "Compressed Bloom Filters."

(6) Simultaneous with the creation of new blocks, in separate, parallel threads, coroutines or system processes, nodes will begin collecting and broadcasting data records belonging to the high-Fitness blocks that are being built upon. Data records can be learned in several ways:

(a) If a block originated from a node's direct peer node, then the node will already have those data records. These records would need to be ordered and assembled, and smart contracts executed, but the data would not need to be re-transmitted.

Once a node has all of the records pertaining to a high Fitness block, then it will begin to distribute those records via the gossip protocol. Other nodes receiving these records will retain and broadcast them (or, alternately, discard them) depending on whether those nodes have also retained the same block.

(b) If a node is still missing a transaction, then it can query for that transaction by communicating directly with a node (whether or not a direct peer) that claims to have validated the associated block.

(7) As soon as the set of data records pertaining to a block are downloaded, the block validation process can start. In at least one embodiment, this would occur simultaneous with the creation of new blocks. If a block cannot be validated for whatever reason (for instance, if the Merkle root cannot be reproduced using the set of data records, or if the block hash is incorrectly specified, or if the data records violate some rule or are otherwise themselves invalid in some way), then it is discarded along with the new block being built on top of it.

(8) In order to increase the likelihood of creating the highest-Fitness block, a node can work to build alternate blocks in parallel in one or more separate threads, coroutine, system processes, or clustered computers. A node will broadcast its highest-Fitness blocks as they are created, discarding lower-Fitness blocks.

The above-described approach could have the following expected impacts in practice:

(a) Emergent localization—certain hub nodes collect activity of certain accounts and other hub nodes collect activity of other accounts; responsibility for processing records pertaining to different sets of accounts is loosely and informally compartmentalized though the emergent network topology.

(b) Emergent diversification—nodes will exclude accounts from a block if they appeared in the previous block; the implication is that combined with localization, blocks on the blockchain will alternate as to what part of the network they originate from.

(c) Records broadcast on an as needed basis—records are only propagated throughout the whole network if there is a high likelihood that they will be preserved with the blockchain permanently.

The block propagation process using the "trust-but-verify" block propagation methodology in accordance with at least one embodiment of the present invention is described with reference to FIGS. 12A-D.

Figure 12A:
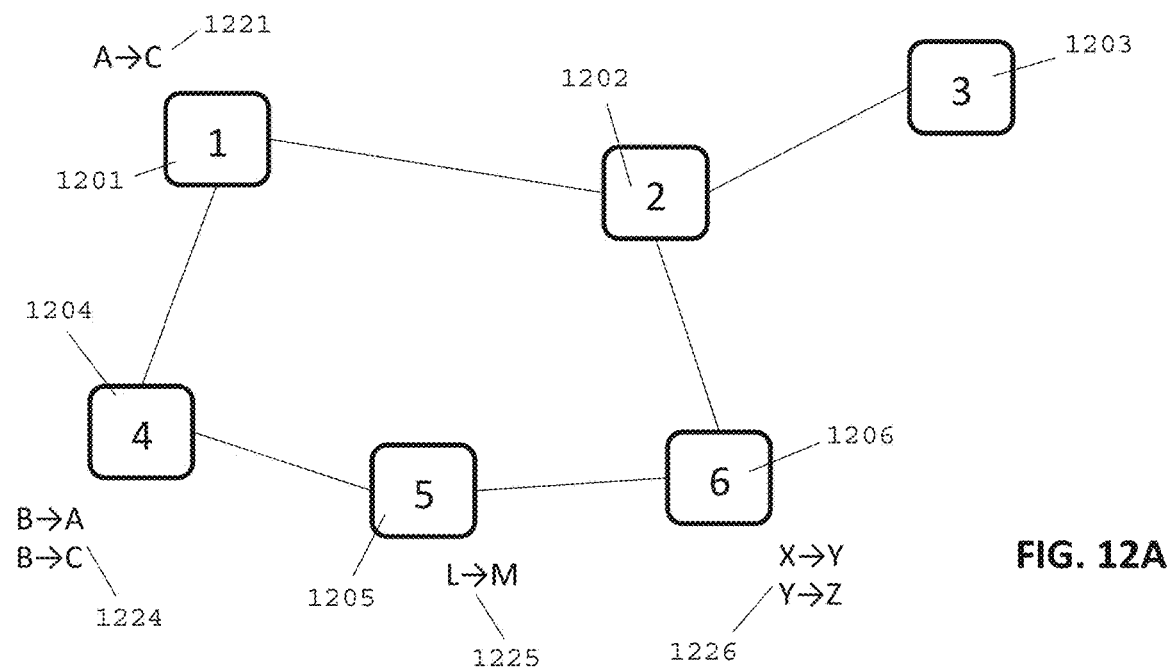
FIG. 12A-D illustrates a simplified process of block propagation processing using the "trust-but-verify" variation of the Fitness Gradient consensus using Bloom filters in accordance with at least one embodiment.

In Step 1, as illustrated in FIG. 12A, different transfer records are generated or sent by wallets to various nodes 1201-1206 (1-6) within a network. Each transfer record transfers tokens from one account to another 1221-1226 (accounts represented by letters). For example, the node 1201 (1) has a transfer record 1221 that transfer from account A to C, the node 1204 (4) has a transfer record 1224 that transfers from accounts B to A and B to C, the node 1205 (5) has a transfer record 1225 that transfers from account L to M and the node 1206 (6) has a transfer record 1226 that transfer from account X to Y and Y to Z. Nodes 1201 (1) and 1203 (3) do not have their own transfer records. The peering relationship nodes is shown by interconnected lines.

Figure 12B:
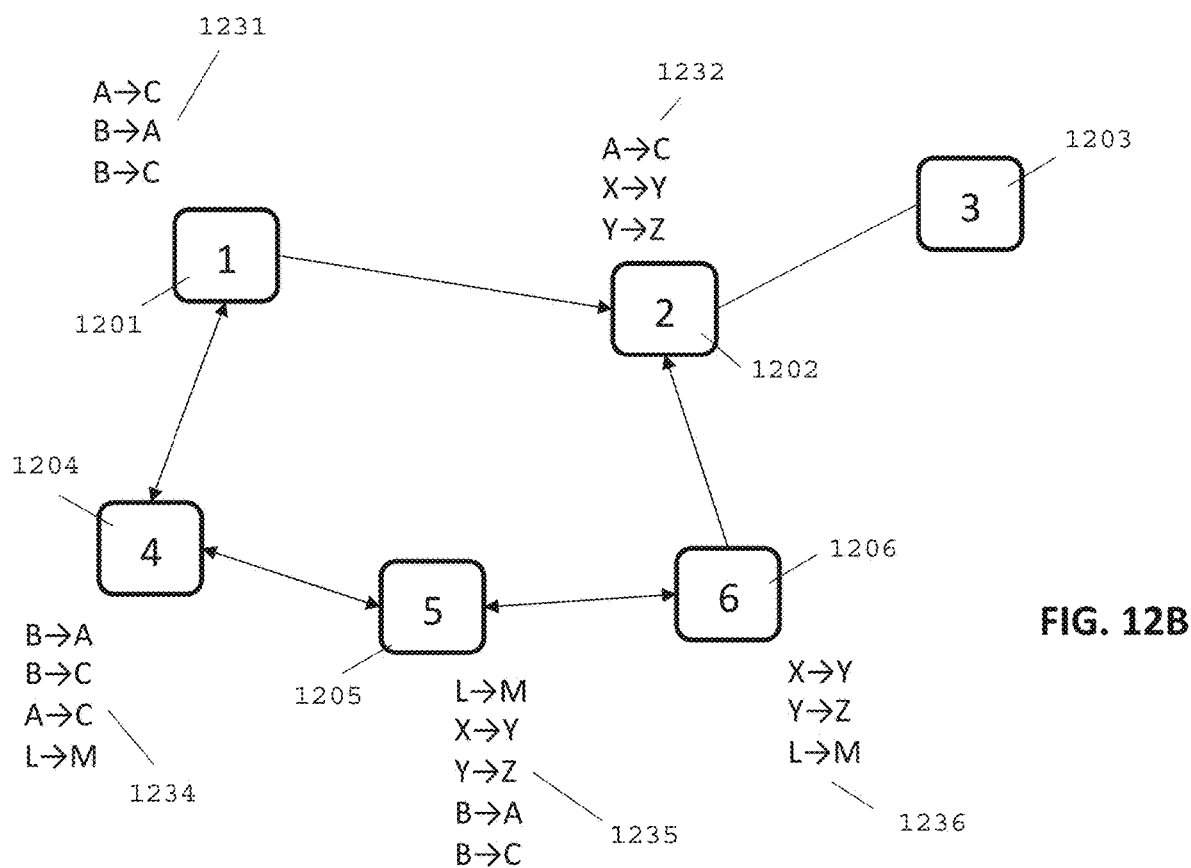

In step 2, illustrated in FIG. 12B, the nodes 1201-1206 (1-6) on the network share records only with their immediate peers. The records 1231-1236 that each node has after sharing with immediate peers are shown as 1231-1236 in FIG. 12B. For example, node 1201 (1) shares records with nodes 1202 (2) and 1204 (4). Therefore, it holds within a combined set of transfer records 1231 its own transfer record information 1221 (shown in FIG. 12A), for the transfer from account A to C and the transfer record information from the neighboring node 1204 (4), for the transfer from account B to A and B to C. Similarly, the combined set of transfer records 1232 for the node 1202 (2) contains transfer record information of the neighboring nodes 1201 (1) and 1206 (6). Thus, the node 1232 holds transfer record information for the transfers from account A to C, X to Y and Y to Z. The node 1205 (5) holds the transfer record information from the neighboring nodes 1204 (4) and 1206 (6), thereby holding within its computer memory transfer records information for the transfers from accounts L to M (the original transfer record data 1225 for the node 1205 (5) and transfer record data for the transfers from accounts B to A and B to C (from the original transfer record data 1224 of the neighboring node 1204 (4)) and transfer record data for the transfers from accounts X to Y and Y to Z (from the original transfer record data 1226 of the neighboring node 1206 (6)). The same methodology is applied to determine the transfer record data 1231, 1232, 1234, 1235 and 1236 held within computer memory by the nodes 1201-1206 (1-6). The node 1203 (3) does not have its own original transfer record data and its only neighboring node 1202 (3) also does not have any original transfer record data. Thus, there is no combined transfer record data held by the node 1203, as illustrated in FIG. 12B.

Figure 12C:
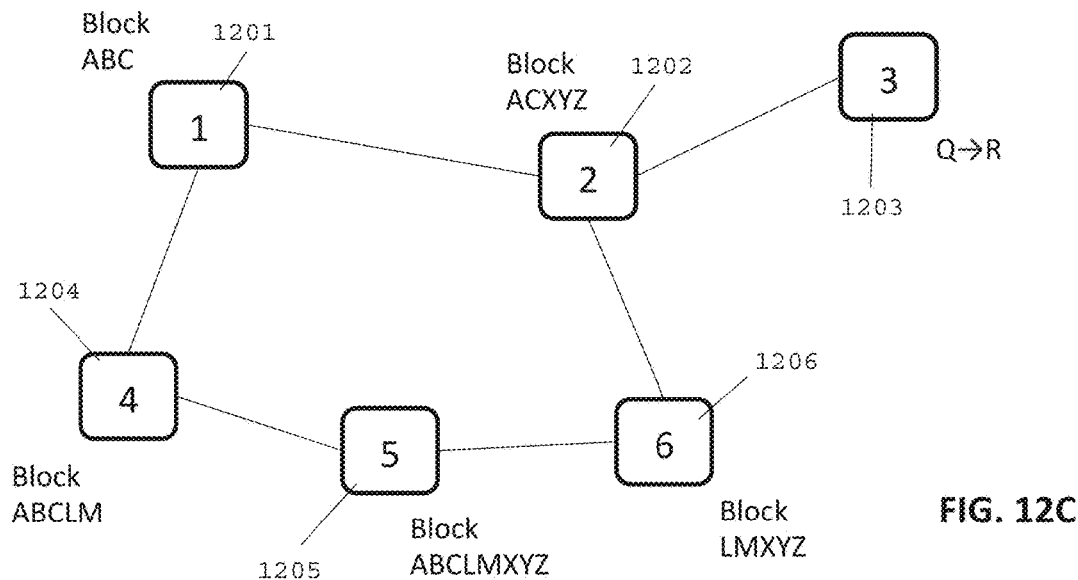

In step 3, illustrated in FIG. 12C, nodes 1201-1206 (1-6) build blocks containing the records that they are aware of. Each block has a bloom filter that identifies the accounts contained in the block 1241-1246, here shown as a list of the accounts (letters) affected by accounts that are part of block transfer records shown in FIG. 12B. For example, transfer record data of node 1201 (1) affects transfers between accounts A, B and C, forming a block with bloom filter ABC (1241), while node 1202 (2) has transfer record data affecting transfers between accounts A, B, C, X, Y and Z, forming a block with bloom filter ACXYZ. Similarly, node 1206 (6) forms a block with bloom filter LMXYZ, node 1205 (5) forms a block with bloom filter ABCLMXYZ and block 1204 (4) forms a block with bloom filter ABCLM, as illustrated in FIG. 12C. Concurrently, node 1203 (3) generates, or is sent a new transfer record, to be included in the next block; specifically, a transfer from account Q to account R.

The use of letters to represent accounts and blocks is for illustrative purposes only. In actual and other embodiments, the bloom filter is not a list of letters, or a list of accounts, but a standard data structure.

Figure 12D:
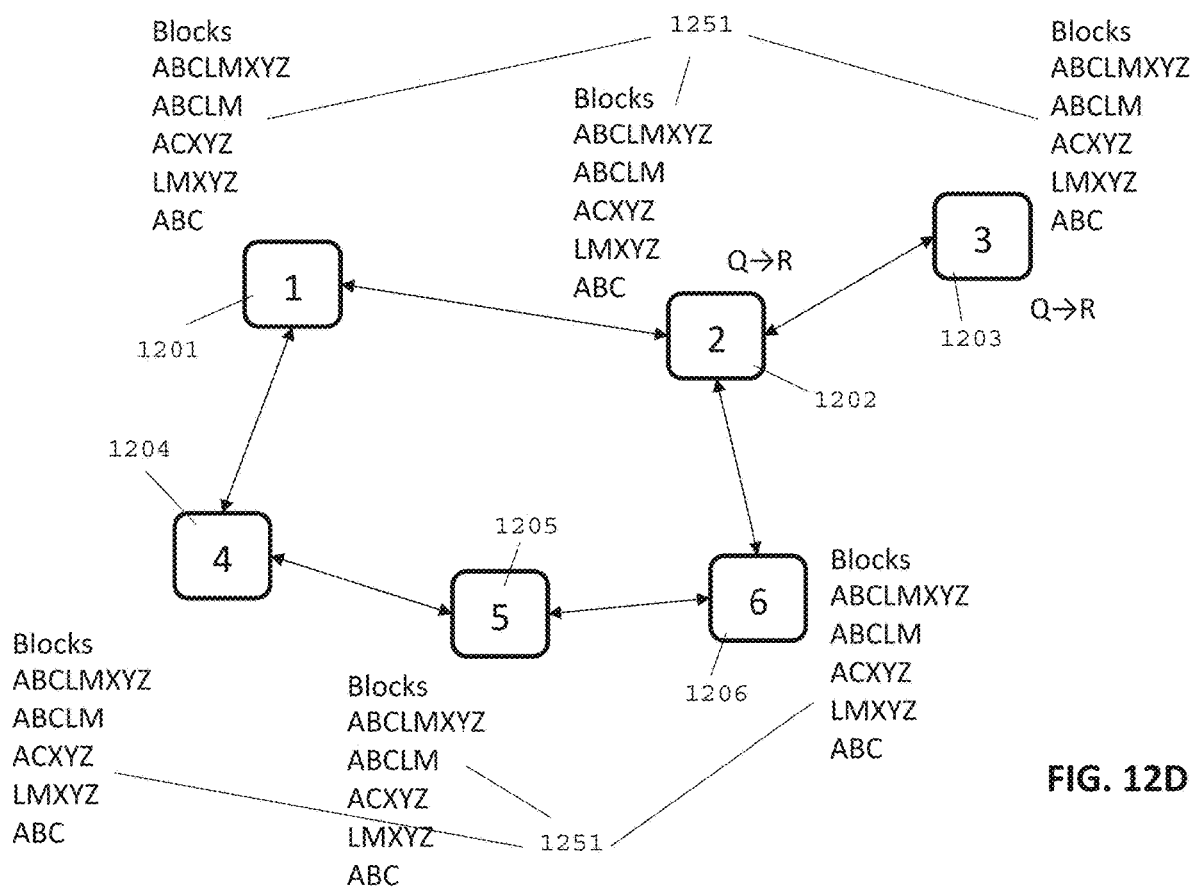

In step 4, illustrated in FIG. 12D, blocks (formed in FIG. 12C) are shared by all node peers 1201-1206 (1-6) throughout the network. In the simplified illustration of the network in FIG. 12D all blocks are shared with all nodes. Thus, all nodes in this network include shared collection of blocks 1251—ABCLMXYZ, ABCLM, ACXYZ, LMXYZ and ABC. In other embodiments of the present invention, the nodes may only share blocks (with account transfer data) if they exceed a certain fitness value threshold.

Also in step 4, node 1203 (3) shares its new transfer record with its single peer, node 1202 (2).

Figures 13A, 13B:
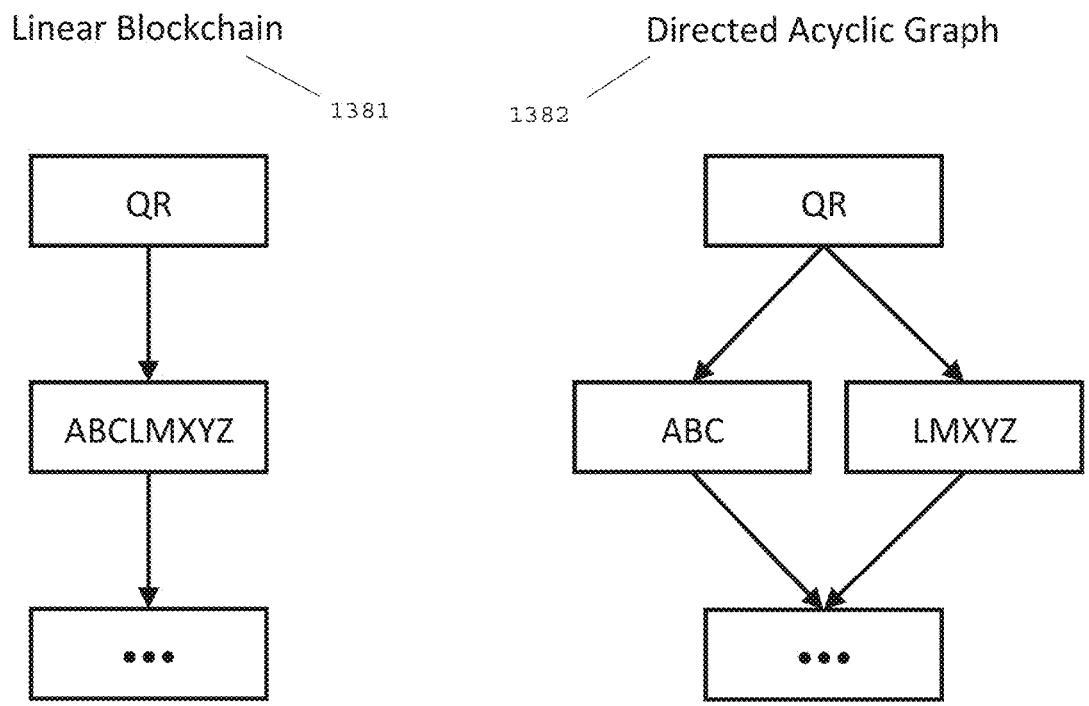
FIG. 13A illustrates a ranking by "fitness" of the blocks with Bloom Filters for a simplified process using the "trust-but-verify" variation of the Fitness Gradient consensus in accordance with at least one embodiment.
FIG. 13B illustrates the difference between a linear blockchain and a directed acyclic graph implementation of the "trust-but-verify" variation of the Fitness Gradient consensus in accordance with at least one embodiment.

In step 5, illustrated in FIG. 13A, nodes on the network rank blocks by fitness, in order to decide from which block to begin to build. In this illustration, a simplified fitness metric representing a "number of records" is used for illustrative purposes. In other embodiments, other metrics may be used for the fitness metric. In the illustrative example in FIG. 13A, each block with a bloom filter is evaluated based on a fitness metric involving number of included records or accounts.

For example, the block with a bloom filter ABCLMXYZ is evaluated based on included transfer records for the transfers from accounts L to M, X to Y, Y to Z, B to A. Based on the "number of records" fitness evaluation criteria, it receives a fitness score 5. Similarly, the block with a bloom filter ABCLM is evaluated based on included transfer records for the transfers from accounts B to A, B to C, A to C and L to M, which receives a fitness score 4. The blocks with bloom filters ACXYZ, LMXYZ and ABC, respectively, are similarly evaluated and each receives a fitness score 3.

If node 1202 (2) or node 1203 (3) were to build a new block, they would build a block that contains the transfer record shown, transferring tokens from account Q to account R. If such a block is built in a system using a linear blockchain data structure 1381 shown in FIG. 13B, then block with the bloom filter ABCLMXYZ would be used, because it has the highest fitness value of 5. However, bloom filters ABC and LMXYZ do not overlap at all, and when combined the blocks with these bloom filters have a higher fitness value/score of 6. Thus, if the new block is built in a system using a directed acyclic graph data structure 1382 shown in FIG. 13B, then these two blocks would be used.

Reducing Denial of Service Attacks that Propagate Fraudulent Blocks

As described above, a risk faced by block-building nodes that implement the "trust-but-verify" block propagation method is that they may begin building a new block on top of a fraudulent block, needing then to throw away the work after the fraudulent block is discovered. This risk to individual nodes can escalate beyond being a localized risk and can become a system-wide risk if malicious nodes begin broadcasting fraudulent blocks en masse.

Thus, an attacker wishing to slow or disable the network (i.e. using the known denial-of-service attack) could try to send out a flood of fraudulent blocks, hoping to overwhelm other nodes with wasteful work and slow down or disable the operation of the blockchain system. Although such an attack would be unlikely to subvert blockchain data or result in tokens being stolen (because all blocks are eventually validated), if too many fraudulent blocks are introduced, the performance of the network could significantly degrade due to the wasted efforts of nodes build on fraudulent blocks.

In accordance with at least one embodiment, the present invention may use several approaches to prevent or at minimum disincentivize this kind of attack and reduce the risk and effectiveness of such attack.

First, nodes may assign a risk-rating to other nodes, and may choose to only build on a block without validation if the block has originated from a trusted node. The high-Fitness blocks created by untrusted nodes would still be built upon, but only after data records are downloaded and verification is performed.

(1) In at least one embodiment, trust is established when recent blocks produced by the node in question have already been validated successfully. Trust would immediately be lost if a block created by the node is deemed to be fraudulent, but would be regained if the node in question produces a sufficient (potentially high) number of valid blocks following the detection of a fraudulent block.

One variation of this strategy would be a form of "tit-for-tat" strategy similar to that described by Axelrod and Hamilton in their 1981 article "The Evolution of Cooperation". In as least one embodiment of this strategy, a node that has lost trust in another node would allow that second node to reestablish its trustworthiness by the simple act of creating a valid block. Conversely, after trust has been gained, it would be lost if the node in question publishes a single fraudulent block. Determining the trust-state of a node would depend only on recent history, not the full history of the node.

Even within the same blockchain network, alternate strategies for determining trust may be employed by different nodes. It would not be necessary for all nodes to employ the same strategy, be it "tit-for-tat" or some other strategy, as internal node decision behavior with regards to trust would not need to be part of the global protocol shared by all nodes in order for consensus to be achieved.

(2) New nodes would automatically be in an untrusted state, so would have to build reputation in order to be trusted. At minimum, they would have to do enough work to generate one or more blocks with high enough Fitness that other nodes will risk building upon them, per the risk threshold configured within those other nodes. Because a new block will be built sooner on top of a block generated by a trusted node (and will thus be more likely to be permanently incorporated into the blockchain), nodes have an incentive to be trustworthy (in other words, to satisfy the risk threshold of other block-building nodes).

(3) In at least one embodiment, each block building node would be identified by a blockchain account address included with whatever block or blockchain segment that it is broadcasting. This account address would be the node's reward account address. Each node would cryptographically sign each block it produces using the private key associated with that reward account, preventing unauthorized nodes from being able to damage other nodes' reputations.

(4) In at least one embodiment, nodes would randomly sample untrusted blocks, choosing to spend some relatively small fraction of its computational effort to build on such blocks in order to build trust in new nodes joining the network. This sampling process would disregard the Fitness of the blocks being sampled, so as to be able to more quickly establish whether a new node can be trusted.

(5) In at least one embodiment, nodes would share trusted node information with peer nodes. In other words, when a block-building node makes a determination that another node is trusted, it would share that determination with peer nodes. In one version, the block-building node would generate and cryptographically sign a dedicated message declaring that a particular node is trusted, and share that message with its peer nodes. In another version, the node would generate and cryptographically sign envelopes encapsulating third-party unvalidated blocks that it shares with its peers, but only in the case that those unvalidated blocks originate with (i.e. are cryptographically signed by) trusted nodes. Peer nodes would extract information about the trusted node from these envelopes, before handling the unvalidated blocks.

Build Fee

In at least one embodiment, proposed blocks may contain some native token assignment made by the block-building node proposing the block, an incentive for other nodes to go through the bother of downloading the records of the block and performing validation. Such a block containing such an incentive is hereinafter referred to as an "Incentivized Block", and the incentive itself is referred to as a "Build Fee".

In this embodiment, every incentivized block would contain a build fee that would automatically transfer to the block-building node's reward account upon validation of the subsequent block. The source account for that fee would be the account address provided by the node that generated the incentivized block. All such block headers could then be included as records within the blockchain; if a block is not chosen to be built upon, the build fees for that incentivized block would nonetheless be transferred to the reward of the block that incorporates the block header records for these discarded low-Fitness blocks.

In accordance with the present invention, the block headers of incentivized blocks that are not chosen to be built upon could be located or placed in two mutually-exclusive places on the blockchain: (1) incorporated into the blockchain itself as "uncle" blocks, referenced in a manner similar to other blocks within the blockchain, but without contributing data records, transactions, or any modification of state to the blockchain, or (2) included among the data records associated with individual blocks, in such a way that the block is known by the blockchain and referenced by it, but without any of that block's data otherwise being incorporated into the state of the blockchain. Referencing these incentivized blocks in a new node in this way would effectuate the transfer of the build fee to the block-building node.

The size or amount of the build fee would not be set in advance, but would be chosen by the node broadcasting the proposed block. It may emerge that the average build fee is similar in size to the average data record fee, because otherwise it would not pay enough to include the block header as a reward record within a new block being built.

Two counterincentives would act in opposition to each other in practice, and disincentivize spam and reduce or eliminate the denial-of-service malicious attacks on a blockchain. On one hand, the cost of broadcasting the block would incentivize waiting to see what competing high-Fitness nodes might be generated by other block-building nodes. If a higher-Fitness block is generated by a competing node, then it doesn't make sense to waste the token fee to broadcast a lower-Fitness block. On the other hand, a node that has built a block with a recognizably high Fitness (as determined by some pre-established threshold) may be incentivized to include a large build fee, in order to better ensure propagation of that block.

In at least one embodiment, a build fee would accrue to a block-building node's reward account only in the event that the incentivized block is assessed as valid, in order to ensure that the block-building node did in fact validate the block before referencing it from the blockchain. If the block contributing the build fee is not valid, then the blockchain segment that references that block would be invalid; this would mean that work performed by the block-building node would need to be discarded, and that the block-building node may incur a penalty via a penalty record (described below), and would at minimum loose whatever reward it would have earned otherwise.

Because the build fee is part of the block that is used to determine the block hash and therefore the Fitness, a decision as to the size of the fee would have to be made before the Fitness is known (at least in the case where Hash Distance Fitness consensus is used). The existence of this fee, if it is high enough, can disincentivize spam, but a malicious attacker may only be dissuaded by a fee that is much higher than what cooperative nodes may be willing or able to include as a fee. Still, this approach would incentivize nodes only to broadcast their highest-Fitness blocks in those cases where they may produce multiple blocks concurrently. Thus, even if build fees are too low to mitigate the risk of fraudulent spam, they can nonetheless act to moderate network traffic and reduce the effectiveness of a malicious attack (and therefore its likelihood).

Penalty Records

In another embodiment, proposed blocks may be accompanied by a token assignment that, in contrast to the above, would be refunded provided that the block is verifiable. Block-building-nodes would incorporate this amount-at-risk as a form of surety or guarantee to compensate other block-building nodes that use processor time to validate a "Guaranteed Block," in the event that such a block proves to be invalid. This amount-at-risk would not be a fixed amount; larger amounts would incentivize more risk to be taken by block-building nodes deciding whether or not to build on the Guaranteed Block.

In at least one embodiment, this amount-at-risk would be incorporated into a penalty record, which penalty record would include all or some portion of the following: the amount-at-risk, the source address contributing tokens (the node's own token account address), the hash of the Guaranteed Block and other block-identifying information linking the penalty record to the proposed block, the network ID (for example, an IP address) of the publishing node (plus tier-1 peer nodes that may also have the transactions), and would be signed with the source address's private key.

The amount-at-risk would be "refunded" (i.e. deemed not assigned) in the event that the Guaranteed Block is validated and adopted. If the Guaranteed Block cannot be validated, then the amount-at-risk in the penalty record will be assigned to the block-building-node successfully adds the penalty record to the blockchain (i.e. the block-building-node that successfully establishes that the Guaranteed Block is not, in fact, valid). The existence of a penalty record will forward the amount-at-risk to the new block's reward.

In at least one embodiment, in the event that the Guaranteed Block is determined to be invalid, the mechanism by which the amount-at-risk is assigned to a block-building node is as follows: First, the block-building-node performs a validation of the Guaranteed Block, discovering that the block is invalid, and establishing that the penalty record may be used. Second, the block-building-node adds the penalty record to a new block, which causes the available reward for that block to increase by the amount of the penalty record's amount-at-risk. Third, in the event that the new block is accepted by other block-building nodes and is incorporated into the canonical blockchain, the reward would be allocated, at least in part, to the account of the block-building-node that generated the new block, and the balance of the account that contributed tokens to the penalty record would be diminished by an equal amount.

However, in order to confirm that the block containing the penalty record is itself valid, other block-building nodes will attempt to refute the penalty by successfully assembling, validating and executing the data records that contribute to the formation of the Guaranteed Block that is referenced by the penalty record. A penalty record referencing a Guaranteed Block that is not invalid would itself not be valid and its inclusion would invalidate the block that contains it. If the block that includes the penalty record itself is guaranteed by a separate penalty record, a finding that the first penalty record is invalid would make the second penalty record valid, making its amount-at-risk available for inclusion in a block reward.

If no block-building-node finds the Guaranteed Block associated with a particular penalty record to be invalid, then that penalty record would simply be discarded.

In an alternate embodiment, one node requesting block details from a second node could include its own account address in that request, causing the second node to generate and sign a block header that explicitly transfers a "directed fee" to that address. If one node does not trust the block created by another node, it will in the standard case download the untrusted block's constituent data records and validate the block before attempting to build upon it (as described above). If the one node sees that the other node's block has a very high Fitness level, however, and wishes to begin building on top of the block without performing validation first, it can request that the node issue a "directed fee" via a special record pointing to the block. Such a directed fee record would function as a type of penalty record, sending tokens to the recipient node's account only in the event that the newly proposed block (a Guaranteed Block in this case) is found to be invalid. Otherwise, the directed fee will be discarded.

Non-Linear Block Arrangements Enabled by Trust-but-Verify Block Propagation

When operating within the boundaries of a linear blockchain, the Fitness Gradient consensus and the "trust-but-verify" variation or approach to data propagation can significantly increase the throughput of a blockchain system or network. In addition to these improvements, further performance increases may be achievable by optimizing the blockchain data structure.

In at least one embodiment, the limitations of linearity can be overcome by allowing multiple sub-chains or blockchain segments to be included with the main blockchain data structure in parallel, transforming it into a directed acyclic graph (DAG).

It should also be noted that not all currently known distributed ledger systems utilize linear blockchains as such. Some known blockchain implementations utilize a lattice or mesh data structures, and some utilize directed acyclic graphs (DAGs).

The "trust-but-verify" block propagation methodology and variation of the Fitness Gradient consensus in accordance with at least one embodiment further enhances the feasibility and usefulness of a DAG data structure for arranging blocks, compared to what has been known and used in the past.

(a) Because all nodes are building and potentially broadcasting alternate blocks and sub-chains continuously, the number of already-existing sub-chains or blockchain segments eligible for inclusion in the blockchain/DAG is increased. Fitness Gradient consensus methodology in at least one embodiment provides a context by which these candidates may be ranked, so that the most fit among them may be included with the main chain as part of the DAG (assuming some upper bound as to how many sub-chains may be included).

(b) At least one embodiment of "Trust-but-verify" block propagation methodology has an effect of records being processed massively in parallel across the entire network. Because different nodes on the network are working on records associated with distinct, mutually exclusive sets of accounts (as enabled by "trust-but-verify" through the use of Bloom filters), the occurrence of unique, non-duplicative computation substantially increases. The more blocks that are shared originating at distinct places on the network, the greater the chance for unique combinations of records to be included as parallel sub-chains on the blockchain.

(c) Because "trust-but-verify" block propagation mandates that each block contain a Bloom filter representing the set of accounts it operates upon (i.e. that are affected by its inclusion into the blockchain), two blocks or sub-chains can be quickly compared to determine if they are both operating upon any of the same accounts. The Bloom filter comparison can provide certainty that the two chains do not operate on any of the same transactions.

(d) Because transactions are not propagated immediately, but are instead downloaded after a block is accepted, it is likely that different regions of the node network will know about different transactions, making it easier to combine two blocks when they are generated in different regions of the network—because they are less likely to share the same transactions (addressing a specific problem discussed by Lewenberg et. al.).

The Fitness Gradient consensus method when combined with the "trust-but-verify" data propagation variation described above, may implement the following steps, elements and features (although not all steps, elements and features are required in every embodiment).

(1) As per "trust-but-verify" data propagation described above, Block Building Nodes add records and transactions they generate to their own blocks and share those records and transactions with immediate peers. Transactions may also be shared with peers' peers, and peers' peers' peers, etc., up to a point, depending on the specific implementation or embodiment of the present invention. A node will build blocks that contain mostly "local" records that were built by that node or its peers.

(2) Nodes build blocks with these "local" records and transactions, updating Bloom filters to reflect the sending and receiving accounts referenced by these records and transactions. Nodes with sufficient computational resources may build multiple blocks simultaneously, in at least one embodiment with mutually exclusive sets of accounts being affected, using Bloom filters to guarantee this separation.

In at least one alternate embodiment of "Trust-but-Verify" block propagation, Block Building Nodes, Wallets and other network participants that generate new records and transactions may share those records and transactions with any Block Building Node. However, accounts and addresses are identified as being associated with certain Block Building Nodes, which are deemed their "home" nodes. Records and transactions are preferentially shared with the "home" nodes of accounts referenced within those records and transactions, thereby concentrating the occurrence of records and transactions that reference those accounts in blocks generated by the "home" nodes and their peers. This leads to less overlap among blocks with regards to the accounts they affect, and reduced likelihood that any two blocks will conflict with each other.

(3) Nodes broadcast block header details (but not the individual records or transactions contained in the block) across the whole network. In at least one embodiment nodes may optionally include some block fee amount or token amount-at-risk to incentivize other nodes to begin building on the block.

(4) Nodes assess all blocks that were broadcast without (in most cases) downloading and validating detailed records.

Bloom filter comparisons allow nodes to choose a number of new blocks that operate on mutually exclusive sets of accounts. More technical implementation-specific details for comparing Bloom filters may be found in Agarwal and Trachtenberg's 2004 CISE Technical Report, "Estimating the number of differences between remote sets". Nodes choose the combination of mutually exclusive blocks with the highest combined Fitness, up to a certain limit of parallel chains (i.e. maximum DAG width).

Nodes begin building new blocks on top of these subchains by executing records that operate on accounts not found among the selected sub-chains, as determined by comparing with the Bloom filter. With the implementation of the present invention, there is a relatively high probability that if a record is rejected after comparing with the Bloom filter, then that record is already in the chain but hasn't been removed from the record pool because validation has not yet proceeded.

(5) Nodes may build alternative blocks in parallel on top of different blocks or combinations of blocks, consistent with "trust-but-verify" block propagation methodology described elsewhere herein. In other words, nodes may build new blocks in parallel, and new blocks may have backreferences to one or more sub-chains. Building upon a variety of block combinations helps mitigate the risk of a fraudulent block being introduced, because if the main thread of work needs to be discarded, another thread of work might be able to pick up the task and continue the process of building blocks.

This node building includes building against the node's own block from the previous generation. In at least one embodiment, each node would always have at least one thread, process or coroutine building on the highest-fitness chain that the node has fully validated.

(6) In parallel with new block building, all transactions for the highest-Fitness block(s) are downloaded, and the various blocks are validated. Included records are removed from the record pool.

If at any point a block is discovered to be invalid, or records cannot be sourced, then the effort to build on that block is terminated—including efforts to build blocks upon that fraudulent block in combination with other blocks. The main building effort becomes the effort that is building on the next-highest-fitness combination of blocks and blockchain segments/sub-chains.

Once all fraudulent blocks (if any) are discovered and discarded, and all remaining blocks have been validated, then the optimal combination of blockchain segments/subchains can be used to build a maximally optimized block (if this has not yet occurred due to parallel efforts undertaken to build the new block).

(7) The new block that is ultimately built and broadcast to the node network will point to all contributing blockchain segments/sub-chains via multiple backreferences incorporated into the block header. Among the contributing sub-chains, the particular sub-chain that has the highest fitness will be considered the main chain. In at least one embodiment that combines this DAG-enhanced "Trust-But-Verify" block propagation methodology with hash distance consensus, when performing hash distance calculations for determining Fitness, the target hash will be found by counting blocks backwards along the main chain until the origin of the target hash is identified for that block.

Reducing Denial of Service Attacks that Target Non-Linear Block Arrangements

Trust-but-verify consensus variations of the present invention that employ non-linear block arrangements may be susceptible to a particular "denial of service" type attack that would significantly reduce the throughput of a blockchain implementing those consensus strategies. Specifically, an attacker may create a series of records that originate from (are signed by and assign tokens from) or terminate with (assign tokens to) a single account, but which are distributed to a large number of nodes operating on the network. If the fees included with those records is high enough, then they may be included in a large number of new blocks or sub-chains simultaneously.

Trust-but-verify consensus variations of the present invention that employ non-linear block arrangements leverage the fact that if two concurrently-produced blocks or blockchain segments do not contain records that operate on the same accounts—in other words, if the accounts referenced by both block or blockchain segments are mutually exclusive—then both blocks or blockchain segments can be used by a new block to build upon simultaneously in expanding the blockchain. However, if nearly all nodes attempt to produce blocks referencing the same account, then the number of contemporary blocks or blockchain segments that may be added to the blockchain will be severely limited. Among the blocks and blockchain segments that reference that account, only one—the most fit—will be included, which will give an advantage to otherwise less-fit blocks that do not reference that account (for instance, blocks built by an attacker attempting to exploit this feature).

There are a variety of strategies that could be employed to mitigate this risk, or at least to create strong incentives against this kind of behavior, increasing the cost of such an attack. To that end, the Fitness Gradient consensus, in accordance with at least one embodiment of the present invention, may implement the following steps, elements and features (although not all steps, elements and features are required in every embodiment).

(1) Accounts may optionally specify in their on-chain profile data or configuration a short, prioritized list of preferred block-building nodes. In addition, statistics may be kept with regards to the frequency of records that reference each account (for instance, a total reference count, or a reference count within the last 100 blocks, et cetera). In at least one embodiment, for high-volume accounts (for instance, merchant accounts and business accounts), any records referencing those accounts may be required to be sent directly to or forwarded to the preferred nodes, if those nodes are on-line. Only these accounts' preferred nodes would incorporate such records in their blocks, because other nodes would want to avoid the risk of their blocks not being added to the chain.

(2) In at least one embodiment, if two high-volume accounts are referenced by a particular record, and if both accounts designate different preferred nodes, then the record may be forwarded to the preferred node of the account that records among its usage statistics a higher volume of on-chain activity (as measured by number of records or total aggregate fees). Alternately, the record may be forwarded to all preferred nodes listed by these accounts, which nodes may compete against each other for the block they produce to be accepted into the blockchain. Provided that the nodes that attempt to include such records are limited to a small fraction of the number of active block-building nodes in the network, the overall throughput should not decrease as a result of too many conflicts emerging from new blocks containing the same record.

(3) A block-building node may require an explicit registration for accounts, such that if an account isn't registered with that node, the node will not accept records referencing that account. Such a registration may, in at least one embodiment, require some real-world confirmation of identity through offline channels. It may also co-inside with that node being listed among the account in question's preferred nodes. In at least one such embodiment, an account would be registered with a limited number of nodes, and if the account signs transactions that have been included in different blocks issued by too many nodes, then the account may lose its registration.

(4) In at least one embodiment, a block-building node may maintain a blacklist of accounts that it will not allow records to reference; any records referencing such accounts would be discarded and would not be included in any block being built by that node. The accounts that end up in that blacklist may, in some implementations, be accounts that were referenced by a competing block, and therefore resulted in a block or blockchain segment built by the node in question losing out to another block. Alternately, accounts that end up in the blacklist may be those accounts that repeatedly (with a frequency that exceeds a certain threshold, or with such frequency that it cannot be accounted for by random chance) send tokens to an account that is also sending or receiving tokens in contemporary blocks built by other nodes on the network.

(5) Some block-building node implementations may reject a record that has been signed by an account if recent records signed by that account have been broadcast to and incorporated into blocks by other nodes. A block-building node will benefit if an account is loyal, because if records referencing that account appear from time to time in competing blocks, conflicts between blocks will be more frequent, and it will be harder for that node to successfully have its block or blockchain segments accepted by the rest of the network. In an extreme example, if a particular account only sends its records to one block-building node, then that account itself will never be the cause of any conflicts that could result in blocks built by that node being rejected. This arrangement may not be beneficial for accounts, however, as it may reduce the probability of their records being added to the blockchain, by not appearing in enough proposed blocks.

(6) In at least one embodiment of the present invention, a record may include a reference to a recent block in the chain to which it claims to belong, and an expiration block height beyond which the record would no longer be viable. A system-wide maximum expiration window may also be specified such that a record cannot be added long after its reference block has been built (regardless of the expiration height specified within the record itself).

This approach would force a record to belong to a blockchain segment that contains the reference block, whereby the risk of the same record existing in more than one blockchain segment would be limited such that it would only belong to blockchain segments that fork or branch from the reference block before the expiration window has passed. In at least one embodiment, it may be required that records signed by a certain account would have to point to blocks within the same blockchain segment that contains other records signed by the same account—meaning, all records signed by an account would exist within the direct ancestor blocks of any block that contains other records signed by the same account, and not within a parallel blockchain segment within the DAG.

For some of the above strategies to work, they would have to be employed by every block-building node in the network, and implemented in the blockchain software used by every block-building node. For instance, strategies that require modifications to data representation, or that require information or configuration to be attached to on-chain data objects like accounts (storing preferred nodes, record counts) and records (storing block references, expiration height), would have to be facilitated by every node within an embodiment.

However, for other strategies to work, not all of them have to be employed by every block-building node in the same way. Certain block-building nodes may employ some strategies while other nodes do not, and different nodes employing the same strategies may have different tolerance levels or different configurations pertaining to those strategies. For instance, some nodes may use aggressive blacklisting, while others do not; some nodes may refuse to handle records not associated with registered accounts, while others do not; and some nodes may only handle accounts that list them as preferred nodes, while others might process any record they receive.

Optimization of Hash Distance Consensus by Participant Nodes

An important property and feature of the Fitness Gradient consensus and the "trust by verify" block propagation variant described herein is that specialized hardware most capable of accelerating the process beyond current performance limits will be the hardware that is most capable of accelerating the turning-complete code that resides within smart contracts, and the code that it used to validate new blocks. Devices akin to Bitcoin ASIC chips—"Application-Specific Integrated Circuits" that are specialized to perform proof-of-work calculations quickly—improve the performance of only one aspect of the block-building process in current systems—specifically, the cryptographic hashing process used to discover of proof-of-work solutions—and may not provide sufficient competitive advantage to justify their cost and use for other purposes. The Fitness Gradient consensus of the present invention in at least one embodiment provides the incentive to develop and improve specialized hardware for other calculations, including generic computation. Advancements and improvements in such hardware would be broadly beneficial in a wide range of contexts apart from blockchain consensus algorithms.

When implementing Hash Distance consensus, an improvement in a node's hashing rate will increase the likelihood that it will construct high-Fitness blocks, by increasing the rate and number of valid blocks that the node is able to build. As the hash distance approaches zero, however, there are decreasing returns to scale for such an effort. Repeated iterations of the hash distance calculation can reduce the hash distance of the block by random search. In each iteration, the block contents would only need to be modified in small ways—for instance by modifying the meta data of some trivial data record—for very different hash distance values to be calculated. However, the probability that each subsequent attempt will discover a particular variation of the block contents that produces a hash distance better than any previously discovered decreases as more attempts are made.

On the other hand, during the time that is taken to perform such calculations, network participants continue to utilize more tokens by spending and transferring more tokens, distributing more fees, and assigning tokens to buckets (in the case of a Bucket consensus implementation). Any iterative attempt to improve hash distance as described above—regardless as to whether hardware optimization is used or not—would be outpaced by the generation of these records, and would need to be re-set to incorporate these new records. Therefore, attempting to get closer to zero distance by optimizing the hash operation becomes less valuable as the number of new records and transactions broadcast over the network increases, and as more tokens are utilized. The tipping point might be closer to zero for hardware-accelerated iterative searches, but it is still there. The tipping point at which an iterative search for lower hash distances is no longer worth the effort may be closer to zero when using hardware acceleration of hash operations, but in any event there is a limit beyond which it makes more sense to move onto the next block rather than trying to optimize the current block.

Basic randomness across the whole network, with all block-building nodes operating in parallel, can result in hash distances very close to zero for highest-fitness blocks, and while hardware optimizations can push this number lower, such an effort would likely not have the same benefit as optimizing the execution time of smart contracts and other essential block-building operations. In order to optimize Fitness within Hash Distance consensus, An accelerated random search over the space of possible data record and block/sub-chain combinations—performed by creating new combinations of blocks and data records as these elements become known by block-building nodes—will not only optimize hash distance (by randomly creating new blocks with hash distance values closer to zero), but will also optimize unique native token values. It is the combination of these two values that contributes to the Hash Distance Fitness formula and method efficiency and speed.

The hardware acceleration of hash operations is therefore disadvantaged by massively parallel ordinary computation resources capable of computing Turing-complete contracts. This tendency enables Fitness Gradient driven blockchains implemented in accordance with at least one embodiment of the present invention to provide additional monetary incentives for improving the speed of computation in general. Investment in the acceleration of Turing-complete smart contracts is not an optimization with is sole application being blockchain performance, as Bitcoin and Ethereum specialized hash accelerators (ASICs) are, but rather would be broadly valuable in improving the speed of computation across all applications.

Fitness Gradient Consensus with Time Delays

In another variation of the fitness gradient consensus of the present invention, incorporates specific time delays into the block-generation process. Each block proposed (including blocks subsequently added) would conform to a specific segment of time.

Such a segment of time may be defined in different ways:
The time segment may be defined in terms of clock time—described as an offset against a particular point in time, or denominated in some standard manner in relation to time-keeping standards (UTC, etc.)

The time segment may be defined in terms of a number of essential computational units or steps required to be executed in sequence The time segment may be defined in terms of a proof-of-work assignment with a certain level of difficulty, which will take a certain expected amount of time to execute on average.

The number of records accepted into a block (i.e. the block size) would be bounded in relation to the time segment duration. Each block would be permitted to include records corresponding to a particular execution time. Only a quantity of records that represent an execution time matching exactly or approximately some fraction Q of the total time segment duration would be accepted into the block.

Alternately, each block would be permitted to include records corresponding to a particular expected aggregate transmission time across the network (being both a function of network latency and size of data). Only a quantity of records that can reasonably be expected to be transmitted across the node network within some fraction Q of the total time segment duration would be accepted into the block.

In another embodiment, both the expected execution time and transmission time would be taken into consideration when determining the maximum block size. Only a quantity of records that can be expected to be transmitted across the node network and then subsequently be executed within some fraction Q of the total segment time duration would be accepted into the block.

The fraction Q of the total segment time duration, which fraction is used to determine the block size, would be set so as to permit nodes to validate competing blocks and chains by interpreting the records they contain. Enough fallow time must be available within the block building process to allow a node to run through a long history of older blocks and catch up to the current block within a reasonable time frame.

In at least one embodiment of the present invention, each node will build new blocks on top of whichever chain it has found to have the highest fitness value. The process of finding the chain with the highest fitness value will be as follows.

(1) Nodes will pass between each other the Fitness value (and other identifying information) of the chain each is currently building on top of (i.e. the highest-fitness chain that each node has fully validated). Additionally, nodes may also share information about the highest-Fitness chain that they are aware of but have not been able to validate yet, along with the address of the node advertising that chain.

(2) In the event that a node becomes aware of a chain that is higher-Fitness than its current chain, it may request for that chain to be downloaded from the node that is advertising that chain (or the portion of that chain or blockchain segment that diverges from the requesting node's already-validated chain).

(3) Upon receiving the new chain data (including all records), the requesting node would interpret all records in sequence until it is able to confirm that all blocks (and contained records) are valid, and that the fitness of that chain is in fact higher than any other chain it has validated (especially its current active chain).

(4) Due to the fact that this validation process may result in the new competing chain being rejected—because it is invalid, or because the advertised fitness value was wrong, or for some other reason—a requesting (validating) node could concurrently continue to build on its highest-fitness already-validated chain. Each new block that is built will begin to be built only after the required time delay (i.e. time segment) has passed for the previous block.

(5) A node's current chain would only be replaced at the moment that the validation of the competing chain has caught up to the same block number as the current chain, so that the new chain can seamlessly be used to build a block and the appropriate time segment.

In at least one embodiment, the time delay required between blocks can be enforced by requiring a minimum space of time between blocks, or requiring a maximum number of blocks to be included in the blockchain within a certain amount of time. In this embodiment, every block would identify the date and time of its creation and inclusion in the blockchain (i.e. its timestamp), from the first block to the last.

A blockchain or blockchain segment would be considered invalid (1) if the spacing between blocks fell below a certain threshold, or if the number of blocks in the chain exceeded the number of blocks expected for the timestamps included with the blocks; or (2) if the most recent blocks at the end of the blockchain did not line up with the current time as it is understood by the block-building node. Similarly, new blocks being evaluated by block-building nodes would only be valid (1) if each block's timestamp is within some threshold of the current time as it is understood by the block-building node, and (2) if the block's timestamp is not too close to the timestamp of the preceding block in the blockchain. Any invalid blockchain, blockchain segment or block will be discarded in lieu of an alternate, valid blockchain, blockchain segment or block.

In at least one other embodiment, the time delay can be enforced by requiring that blocks include a proof-of-work that is of a level of computational difficulty that it would be executable on an amortized basis within the amount of time represented by the time segment. A block would be valid only if (a) the difficulty represented by this proof-of-work corresponds on an amortized basis to the time segment duration, and if (b) the block has successfully completed the proof-of-work, as demonstrated by the nonce and block hash.

In at least one embodiment, the mandatory time segment duration enforced by the methods described above may change depending on the computational and network performance of the blockchain system. If more or less time is required for block-building and block-validation computations to be performed, or for data to be shared across the network, then the time segment duration may be increased or decreased. Such changes to the time segment duration would cause a change to the minimum space of time between blocks, the maximum number of blocks that may be included in a blockchain segment for in a certain amount of time, or to the difficulty level of a proof-of-work problem used to space out blocks.

The fraction Q of the total time segment duration used to determine the block size must be carefully chosen such that it is computationally possible for a node to build new blocks in real time according to the segment time schedule, while the node concurrently validates a competing chain of some length L that may replace its current active chain. The validation process must proceed at a faster pace than the block-building process, otherwise it will never catch up to the current block.

For instance, if the fraction Q is ⅓, then it may be possible for a node to validate a sub-chain of length L=6 blocks within approximately same time it would take to build two new blocks and add them to the node's current chain, assuming parallel execution of both processes.

Similar timing concerns would also affect bootstrapping of a new node joining the network (i.e. a node that does not have any blockchain or record data). A new node signing onto the network must obtain all blocks and records of the blockchain that have been accepted by its peer nodes on the network. Although there may be some variation between peer nodes with regards to the most recent blocks on their individual chains, the overwhelming larger set of blocks going back to chain origin should be identical.

This may be done by retrieving block data and record data over the network from peer nodes, or it may be done by installing a data package encapsulating block and record data onto the block in an out-of-band manner (for instance, by copying such a data package from a USB thumb drive or other physical medium, or by downloading the package from some server over the network).

In any event, a node must validate all such data for correctness, and execute smart contracts and process the data in order to build up a local runtime instance of the system's global state. This is likely to be done by executing the entire history of records and smart contracts on the chain in sequence. Until this has been completed, the data must be considered potentially invalid or even malicious. After it has been completed, however, the node can treat this third-party blockchain and record data as valid and verified.

After the new node's initial download of bootstrap block and related data, the rest of the network will be adding blocks at a steady pace. As a result, even after the new node has completed verification and validation of the bootstrap data, that new node will have to download and verify the new blocks, records and other data generated since that initial download.

The value of Q will determine how far ahead the rest of the network will have run by the time that new node has completed its verification of the blockchain and related data, as a function of the blockchain's length at the time of initial download. The value of Q will also determine how long it will take for the new node to fully catch up to the current state of the network after the initial data has been verified.

The order in which different types of records may be evaluated for incorporation into a block may be constrained by the requirements of this variation. If there are some operations that must be executed before the block is finalized—and which may directly implicate the creation of additional records and further execution steps—then these items should not be left to the end of the block creation/execution process, and should be processed at the beginning of the process.

Other records that may be optional and could be included/interpreted/evaluated at the end of the process, so that they may be omitted or cut off in the event that the maximum block size is reached. For instance, bucket records are a mandatory part of the Bucket consensus algorithm, so they must be incorporated first or at least near the beginning of the block creation process.

For example, in at least one embodiment, trade matching and settlement records (described elsewhere herein) may be considered mandatory parts of any block when trading is implemented. The implication of performing trade matching and settlement at the beginning of the block creation process, before new trade order records are added to the block, is that under such circumstances the matching and settlement of trade orders must only be done for trade orders added to the blockchain in prior blocks.

However, in order to evaluate records that invoke Turing-complete smart contracts such as those implementable with the Solidity language, an unpredictable, variable length of time may be required. Although every smart contract must be deterministic in its execution at the point at which it is included in the blockchain (so that every validating node will see the same outcome), due to the "halting problem" (classic computer science proposition proved by Alan Turing), the amount of time required to execute such a contract is not knowable without actually executing the contract.

The execution time of these contracts may be capped by the requirement that individual computational steps be paid for through the use of a token fee known as "gas", such that even a smart contraction that implements non-terminating logic will terminate when its computational steps exceed what has been paid for in advance. Nonetheless, because this cap represents an upper limit only, the actual amount of time taken by these smart contracts will be variable, even if they are capped.

At a certain point in the process of executing such contracts, the node will surpass the point at which the execution time available for the block. The last record incorporated/interpreted/evaluated in a new block by a node will either be the record the interpretation of which first surpasses the time threshold, or the record immediately preceding the record that causes the time threshold to be surpassed. All other proposed records are triaged, either to be discarded, or delayed for inclusion in a future block.

Other records, such as balance transfers, new trade orders, or proposition-related records are potentially more predictable in their performance, and may be incorporated in the middle of the process. The different types of records are described in more details below. If these records are linked to smart contracts via pattern linkage records, they may need to be treated as if they directly invoke Turing-complete smart contracts, and triaged in the same way.

In order to avoid making the evaluation of Turing-complete contracts mandatory, it may be required that pattern linkage records are not mandatorily executable (such that there is no guarantee that they be executed). Or, alternately, it may be required to only have a limited number of compute cycles available for linked contracts each block, and force pattern linkage records to bid on their inclusion using fees. Such a limit could be conservatively enforced by assuming that each smart contract will consume the entirety of its gas allocation, regardless of the ultimate outcome.

Token Supply Algorithms

Among various blockchain implementations, a wide variety of strategies exist with regards to how native tokens (often termed "coins" in currency blockchains) are created, distributed, managed and destroyed. At least one embodiment relates to the "supply" of such tokens.

Not all blockchain implementations utilize native tokens. For instance, blockchain software that utilizes permissioned-voting-based consensus, such as IBM's Hyperledger Fabric, does not require the existence of any native token or coin to incentivize participation in the consensus process. Hyperledger Fabric is used by businesses that operate in an environment of "partial trust", so nodes that join the network are explicitly authorized to do so by the other nodes, and are incentivized to participate because of ancillary business benefits their operators receive as a result of the network's existence, such as document time-stamping and document preservation. The computational contribution made by nodes in such a network is essentially a gift, given to benefit a closed or semi-closed group of participants without receiving direct consideration in exchange.

In contrast, blockchain networks that do utilize native tokens are typically open to participation by any anonymous node able to connect to the network over the Internet. These implementations (for example, Bitcoin and Ethereum) primarily use native tokens to incentivize the participation of nodes that otherwise would not have an incentive to participate in building the blockchain, and thereby help secure the network against attack by untrusted parties.

Within proof-of-work blockchain networks, the market value of tokens, the number of tokens issued and outstanding at any given time, the way that tokens are distributed, and the rate and manner in which new tokens are created all have a direct impact on the computational power that is brought to bear to solve proof-of-work problems. Proof-of-work miners spend real-world money ("fiat" currency in industry parlance) to pay for mining equipment and electricity to perform proof-of-work calculations; they recoup their costs by selling the native tokens generated in exchange for "fiat" currency. Trends in the market value of tokens have historically had a direct impact on the total computational power brought to bear solving proof-of-work problems, which has a direct impact on the overall security of the system (more computational power means greater security).

A dramatic and sudden drop in the value of a native token can result in a rapid drop-off of participants in the network, even while physical capacity remains intact. For instance, if a double-spend attack is ever to be carried out on the Bitcoin network, a likely way for it to happen would be for a large miner to disengage its mining capacity following a market rout, and to use that capacity to mine a duplicate chain in parallel, and in secret. To stage an attack such an actor would (1) buy a large quantity of Bitcoin; then (2) use their capacity to begin mining a secret chain; then (3) sell their Bitcoin, finalizing settlement on the public chain; then (4) release their longer, secret chain, which would replace the main chain, erasing the record of the sale; and finally (5) sell their Bitcoin a second time. In other words, token price volatility can decrease the security of proof-of-work networks.

In proof-of-stake blockchain networks, the higher the value of native tokens in a given node's designated account, the more that node will be in a position to "stake" in a given round. A higher "stake" increases the chances of that the node being chosen to build the next block and receive the block reward. Nodes that are able to "stake" a larger number of tokens/coins will therefore accumulate more tokens via block rewards, and will have a disproportionate influence on consensus determinations.

Without built-in countermeasures, accounts that are already the largest holders of native tokens will continue to accumulate them at the expense of ordinary users who are paying fees to add records to the blockchain. This tendency is accelerated if the algorithm that is used to distribute native tokens at the outset also results in concentration. Concentration carries specific risks and implications for a proof-of-stake system: if all but a few nodes face a low probability of building a new block (and benefiting from the rewards) then nodes may tend to drop out of the network and decline to participate. Fewer participating nodes increases the possibility of collusion among (or of common control over) a majority of nodes, substantially impacting security and increasing the network's exposure to a possible double-spend attack.

Variation Among Supply Algorithms

The kinds of algorithms that are used to determine how tokens are distributed, and how many tokens are to be distributed, are varied. For instance, the first block on the blockchain, the "genesis block", may itself contain a token allocation. This initial supply is sometimes called a "premine" or an "instamine", although the term "initial supply" is more precise. Depending on how tokens are generated and distributed subsequent to this event, it may result in a high degree of centralization of ownership of the token.

As part of each block, new tokens may be generated. The total number of tokens to be generated over time may be capped, or it may be potentially infinite.

Bitcoin generates additional tokens each block as a function of the block height of the chain: the same number of new Bitcoin are added every block, except that every 210,000 blocks that number is cut in half. New Bitcoins will continue to be generated until the total supply equals 21 million. In 2019, 12.5 Bitcoin are created every block. Ethereum currently issues a constant 3-ethers per block, and there is no built-in limit; unless a change is made to the Ethereum software and is adopted by a critical mass of nodes, 3 ethers per block will be generated for as long as Ethereum exists, and a potentially infinite supply of Ether tokens may be generated.

In some blockchain or cryptocurrency networks, such as Ripple, the tokens generated at the outset comprise the maximum supply of tokens that will ever be generated; in such cases there is no protocol for issuing more tokens. Some blockchain implementations destroy tokens. In the case of Ripple, tokens used as fees are permanently removed from circulation, causing the total supply of tokens to gradually decrease over time.

The issuance and supply algorithms implemented in blockchain software materially affect user adoption, ongoing participation levels, and price volatility of native tokens. The total number of tokens outstanding influences pricing through supply and demand, and the rate and mechanism of token issuance influence user behavior through incentives. In spite of this, many if not most blockchain and cryptocurrency implementations have chosen their issuance and supply algorithms without having clear, long-term objectives with regards to user behavior.

In contrast, the present invention seeks to reduce volatility and improve predictability as to the native tokens price over time, by using on-chain information that is accessible to each block-building node in order to deterministically decide the number of native tokens to issue or to destroy in a given block.

Price Stability Algorithms

Native tokens within a blockchain system serve to incentivize the block-building activities of block-building nodes, but they also serve the essential purpose of monetizing the services provided by the blockchain. Native tokens are a means for blockchain users to compensate the network for providing services. Generally speaking, these services include the preservation of data on-chain, and the computational processing associated with creating a new block. It is reasonable to expect that a native token's price in relation to external real-world assets and currencies would vary according to the perceived utility of those services. However, it is not necessarily the case that the quantity of native tokens allocated as fees to partake in those services must be volatile.

Essentially two distinct approaches may be taken to stabilize the price or off-chain value of tokens, where each can be implemented in accordance with at least one embodiment of the present invention.

According to the first approach, a blockchain system may designate a value peg to anchor the price of the token in terms of a real-world asset or currency (for example, USD, SDR). In order to stabilize the price of that token some human or algorithmic intervention must be performed—for instance, by purchasing tokens in exchange for the peg asset, or by selling tokens in exchange for the peg asset, or by creating or destroying tokens, or by locking up or unlocking tokens. While there are some systems that have attempted to utilize at least some of the above-mentioned methodology (for example, the Tether tokens), the present invention offers a number of improvements over the known systems.

According to the second approach, a blockchain system may identify some value metric internal to the blockchain itself and perform algorithmic intervention in order to stabilize that metric, independent from external market price information. One example of this value metric would be the native token fees paid by users wishing to add data to the blockchain, or wishing to have nodes perform some computational work (i.e. "fee-for-service" pricing expressed in terms of the token used for that purpose). This second approach is unique to the present invention, and is not found among known blockchain systems.

Two new processes and methods, each in accordance with at least one embodiment of present invention, are described below. The first process and method described is an implementation of the second, "internal metric" approach introduced above, along with several variations. The second process and method described is an implementation of the first, "value peg" approach introduced above.

Token Supply Via Internal Metric Targeting

In accordance with at least one embodiment of the present invention, the supply of native tokens may be managed in such a way that the native token fees paid by users wishing to add data to the blockchain, or wishing to have nodes perform some computational work, will be generally consistent (although not necessarily fixed) over time.

To that end, a target may be set for what the average token fee should be for adding records or to perform work on the blockchain (i.e. the blockchain "fee-for-service"). This target may be fixed over the whole time period that the blockchain network is operating, but it would better be defined as a function of the current block height, so that the target average fee-for-service can vary over time.

In at least one embodiment, if the actual average fee-for-service for new records on the blockchain falls below the target, then some quantity of new native tokens would be created and added to the block reward. This quantity of tokens would be deterministically determined at the time that a block is created. Specifically, in at least one embodiment, the quantity of new native tokens would be determined by examining the n number of blocks immediately preceding the block in question, and determining some weighted average of the discrepancy between each block's actual average fee-for-service, and the target fee-for-service at that block number. In other words, a weighted rolling average would be used, but only a weighted average of blocks immediately preceding the block where the new native tokes would be assigned.

All else being equal, augmenting the block reward would thereby increase the total number of tokens in circulation on the blockchain and increase the global supply of tokens available. This, in turn, may be expected to gradually reduce the price users must pay to acquire tokens and cause users to allocate higher fee values when proposing new records to be added to the blockchain.

On the other hand, if the actual average fee-for-service for new records on the blockchain rises above the target, then the block reward would be decreased by some quantity of native tokens. As above, this quantity would be deterministically determined at the time that a block is created. Specifically, in at least one embodiment, the quantity of tokens by which the reward is reduced would be determined by examining the n number of blocks immediately preceding the block in question, and determining some weighted average of the discrepancy between each block's actual average fee-for-service, and the target fee-for-service at that block number. As above, a weighted rolling average would be used, but only for blocks immediately preceding the block where the new native tokes would be assigned.

All else being equal, decreasing the block reward in this case would decrease the total number of tokens in circulation on the blockchain, and decrease the global supply of tokens available. This, in turn, may be expected to gradually increase the price users must pay to acquire tokens and cause users to allocate lower fee values when proposing new records to be added to the blockchain.

In either case, the size of the block reward would be at least slightly decoupled from the size of the fees specified in records added to the blockchain. Although a block having higher fees in the aggregate will produce a larger reward than a block having lower fees in the aggregate, the actual final reward for the block would be a percentage of those fees (be it 150% of the fees, or 50% of the fees, or 0%), which percentage value would depend on a function of the fees assigned in preceding blocks. The final reward may depend on the weighted average fee-for-service for preceding blocks, as described above, and in at least one embodiment it may depend on the rate of change in the fees recorded for those blocks.

The block reward cannot fall below zero, so the maximum impact of reducing block rewards would be proportionally less than the maximum impact of increasing the block reward by creating new tokens to increase the total supply. The block reward wouldn't be reducible to zero, but rather to some pre-defined minimum level.

That being said, however, rescinding tokens already in circulation provides a way to effectuate a reduction in the number of native tokens in circulation beyond this limit. In the case of Bucket consensus or similar algorithms, in at least one embodiment, if the average fee-for-service rises too high above the target (i.e. beyond some expressly-defined high threshold), then some portion of the locked tokens or tokens-at-risk may be reduced as well in order to further reduce tokens in circulation.

Rescinding locked tokens in this manner would have the effect of decreasing the total number of tokens in circulation at the expense of decreasing the incentive for participants to lock or stake tokens (by effectively imposing a negative interest rate on those tokens), which would impact security negatively. The next section below describes possible alternate token rescission strategies that do not create this perverse incentive.

The reduction in block rewards and the rescission of tokens may destroy the tokens in question, just as an increase in the block rewards may create new tokens that didn't exist before. Meaning, there would likely be a mismatch between fees committed by records included in the block and the block reward issued for that block. In effect, when employing a token supply algorithm like that described here, the total number of native tokens resident within the blockchain system before a block is processed may be more or may be less than the number of native tokens resident within the system after it is processed. In this manner, the global supply of native tokens is influenced by the price of blockchain services—i.e., the level of fees included in new records added to the blockchain, on average.

Token Rescission and Metric Targeting

In at least one embodiment of the "internal metric" token supply method described above, if the actual average fee-for-service were to fall below the target metric by a certain threshold, then some portion of the tokens in general circulation would be rescinded. Depending on the implementation and embodiment, a percentage of tokens that have not been assigned or moved at all within the blockchain for some time would be rescinded; or a certain percentage of tokens that have been held for a certain period of time without having been used as fees would be rescinded; or in the case of Bucket consensus (and similar algorithms) a percentage of tokens that had not been locked or staked for a period of time would be rescinded; or some combination of these.

This "hoarding fee", "free rider penalty" or "inactivity penalty" would incentivize inactive tokens to be actively used, putting upward pressure on fee-for-service pricing by increasing the number of tokens in active circulation. In at least one embodiment, the rescinded tokens themselves may be re-introduced into active circulation by being added, in whole or in part, to the block rewards available for distribution; alternatively, the rescinded tokens may, in whole or in part, be destroyed.

In addition to incentivizing an immediate increase in the overall circulation of tokens, this approach over time would bring back into circulation native tokens that had been effectively lost due to the cryptographic credentials (i.e. private key) of the account holding those tokens being lost. This would also help reduce the risk of some massive surge of tokens re-entering circulation en masse, which would have a large impact on both the external price paid for such tokens, as well as the fee-for-service pricing that actual users experience. In contrast to the increased stability that is provided by at least one embodiment of the present invention, in the case of the Bitcoin blockchain, there are billions of dollars' worth of Bitcoin that are widely assumed to be permanently locked and therefore lost. However, it is not certain that those Bitcoins are permanently lost, and there is some risk that those dormant tokens may re-enter circulation at some point, crashing the price of Bitcoin in the marketplace.

In the case of Bucket consensus (or related Hash Distance Fitness consensus approaches where locked or staked tokens contribute to the fitness value) in accordance with at least one embodiment, assigning tokens to buckets and locking them would exempt them from the inactivity penalty. As a result, in addition to stabilizing the value of native tokens, there would be an incentive for larger quantities of tokens to be locked or staked at a given time, increasing the security of the consensus algorithm.

In order to determine which account balances would be subject to this rescission, block-building nodes would trace back through the blockchain to the block in which the tokens were distributed as part of a block reward, or to the block in which the tokens were released after having been locked or staked. The number of blocks between the current block and that specific block would be considered the token's "age".

In at least one embodiment, if an account mixes tokens of different ages, every transfer out of that account will be considered to have transferred tokens of those different ages in proportion to the ages of tokens originally held by the account. When allocating fees or assigning tokens to a bucket (or locking or staking tokens), then the "oldest" tokens would be deemed to have been assigned first, before the younger tokens have been assigned.

For optimization purposes, in at least one embodiment, the age of the various token balances held by an account at any given time may be tracked as part of the account's data residing on the block, so that the age doesn't have to be re-calculated following initial validation.

In at least one embodiment, the percentage of tokens rescinded as part of the "inactivity penalty" may be determined by a function that considers such factors as token age in combination with the discrepancy between the target fee-for-service and the actual fee-for-service experienced over the most recent n blocks.

In another embodiment of the present invention, completely dormant tokens—tokens that have not been included in any data records written to the blockchain after some well-defined block height—would be rescinded at a certain rate. In each block, some percentage of dormant tokens would be rescinded; however, the size of this percentage may or may not depend upon the current discrepancy between the target average fee-for-service and the actual average fee-for-service. In at least one embodiment, the occurrence of this dormant-token rescission would depend only on token age, and would be evaluated independently from the "inactivity penalty" described above and the "retention allocation" described below.

Retention Allocations and Metric Targeting

In at least one embodiment of the "internal metric" token supply method described above, if the actual average fee-for-service goes above the target by a certain threshold, then some quantity of native tokens would be distributed to accounts that are holding native tokens. This "retention allocation" could be implemented by allocating to theses accounts some portion of the reward that would otherwise be distributed to consensus participants; or by issuing new token value not previously accounted for on-chain (in other words, via the issuance of new native tokens created through inflation); or by a combination thereof.

This "retention allocation" would inflate the size of all native token balances simultaneously across the network by a percentage that is determined, in at least one embodiment, by how large the discrepancy is between the target average fee-for-service metric and the actual average fee-for-service metric among the n most recent blocks added to the blockchain. The larger the discrepancy, the higher the percentage.

This retention allocation, however, would only apply to accounts with an "age" above a certain threshold, or would apply proportionally to accounts based on the age of the tokens they hold. In this manner, the retention allocation would also incentivize holders of the native token to continue holding them and not use them (and not sell them to be used), potentially decreasing the number of tokens in active circulation.

Configuration and Tuning of Internal-Metric-Based Token Supply

The above approaches in accordance with at least one embodiment of the "internal metric" token supply method of the present invention, may incorporate a number of constants and functions that depending on the details chosen at the time of implementation would have a material effect on the behavior of the software and the incentives that motivate its users. These may include:

The target average fee-for-service function
The block reward augmentation and block reward diminishment function(s)
The inactivity penalty and retention allocation function(s)
The dormant token rescission percentage function Each of these functions may be implemented in a manner that is integrated directly in the block-building node software, or they may be implemented in whole or in part as smart contracts that can be modified at runtime by privileged users.

If a function is integrated into the block-building node software, all nodes on the blockchain network must share the same version of the implementation of that function. For block validation to work properly it requires that all nodes agree as to the outcome of this function. An implication of this requirement is that a substantial percentage of all nodes—more than a majority—must update their software and agree on the same version of that software in order for that tweak to take effect. The programming of such systems may be implemented in different programming languages and/or for different operating systems by a person skilled in the art who follows the description of the features and limitations of the system that are described herein and properly reflects, applies and implements them in the specific coding implementation.

Alternately, any one of these functions that is implemented as a smart contract on the blockchain may be superseded by another smart contract added to the blockchain without requiring any new version of the software to be deployed. In order to supersede such a smart contract with another smart contract, one or more authorized accounts would sign the new smart contract record with instructions to replace the old smart contract record. Alternately, a single smart contract could be programmed to delegate responsibility to a subordinate contract, which subordinate contract could be modified by a voting majority of authorized accounts. Blocks prior to this act of replacement would be valid only if the old version of the function were used, while blocks following this act of replacement would be valid only if the new version of the function were used.

Some special consideration should be made with regards to the target average fee-for-service function. The nature of this function can have a significant impact on the incentives of potential users to participate in the network by running nodes and by adding records to the blockchain. For instance, if the function is linear, then the fee level for services will grow at a steady rate over time. This may provide stability, or it may discourage adoption at the outset if block rewards are diminished in order to squash rapid fee increases as the network begins to provide utility to users—or it may discourage adoption if tokens are rescinded in order to incentivize token velocity before the network has reached a critical mass of participating nodes. On the other hand, for instance, a function that resembles a sigmoid function (offset so that $y \approx 0$ at $x=0$) could address these issues by providing a smooth transition from a zero- or low-fee period, to a stabilized, higher-fee, long-term existence. In order to align such a transition with the network reaching critical mass of nodes, such a function could also take into consideration the network's current throughput, or how dramatic and consistent price spikes may be; the more upward pricing pressure could trigger the transition to the higher stable level.

Alternatively, or in addition, more nuanced functions could be implemented taking into consideration network behavior following deployment. Replacing these supply functions could be done if a majority of block-building nodes agree to the modification and updates their software. A function that is implemented as a smart contract could be, but if a consensus builds among node operators that a particular smart contract implementation is optimal and should be preserved, the logic of that function may be implemented itself in the block-building node software, giving it a semi-permanent status that cannot be replaced by anything but a broad consensus of the network's block-building nodes.

Token Supply Via Value Peg Targeting

A further example of at least one system and method of the present invention that improves native token price and supply stability is discussed with reference to FIG. 7.

Blockchain implementations typically either keep the aggregate value of native tokens within the blockchain system constant, or increase it at a pre-determined rate (either at a constant rate or with a gradual drop-off). This typically results in cryptocurrencies being deflationary, with token values increasing in comparison to real-world assets as usage increases.

At least one embodiment of the present invention attempts to use on-chain data relating to trades between native token and user token pairs as inflation or deflation indicators. Native token creation or destruction is triggered in accordance with these indicators.

Figure 7:
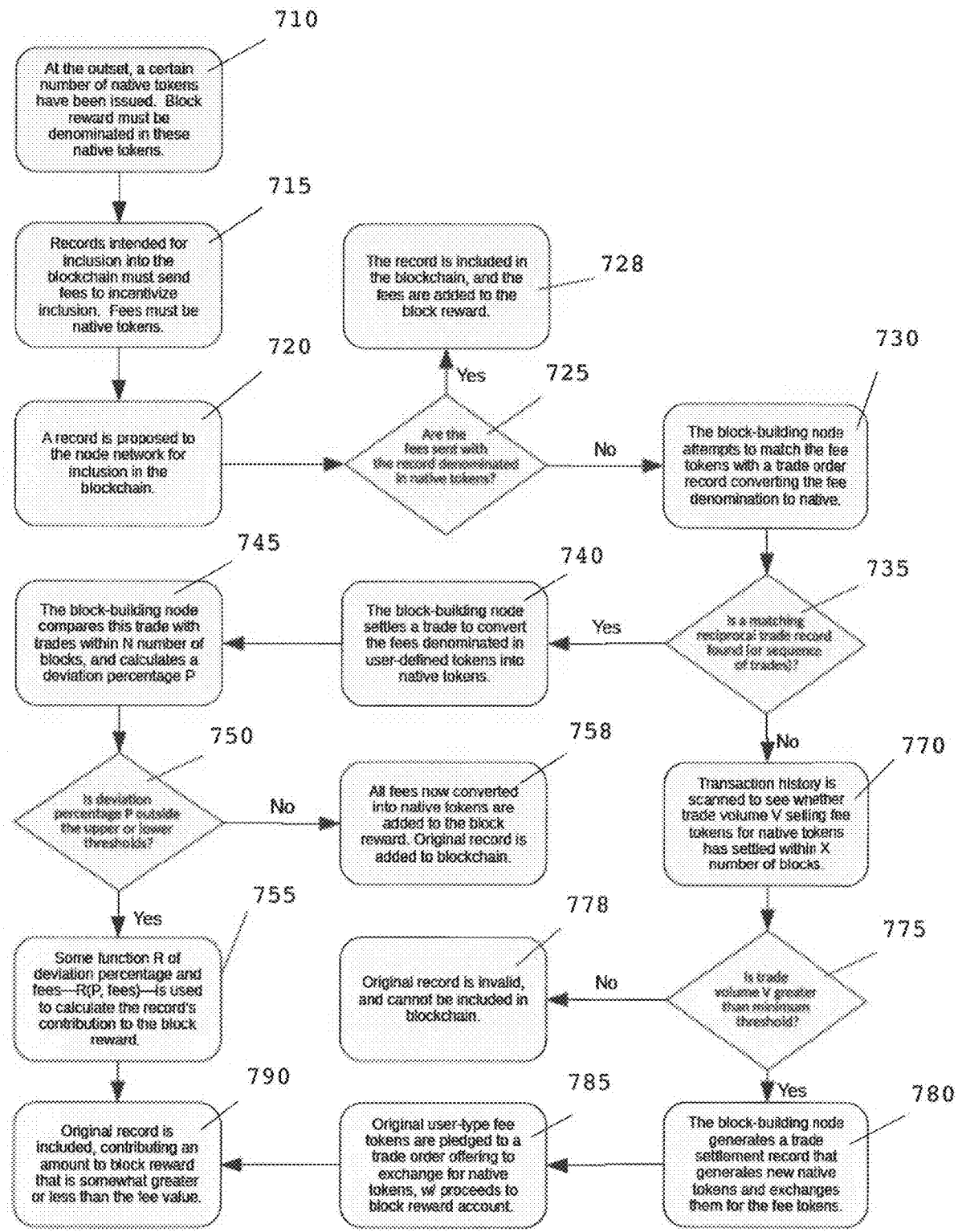
FIG. 7 illustrates a flowchart and algorithm of trading between native and user-defined token pairs in accordance with at least one embodiment that increases and/or assures the native token price and supply stability.

Referring to FIG. 7, at the outset, in step 710, a certain number of native tokens is issued. Block rewards may be denominated in these native tokens. At 715, the records that are intended for inclusion into the blockchain must include fees to incentivize inclusion. These fees must be in the form of native tokens within that blockchain. At 720, a record is broadcast to the node network for inclusion in the blockchain.

At 725, the nodes first check whether the fees allocated with the record are denominated in native tokens. If so, at 728, the record is included in the blockchain, and the fees are added to the block reward. Otherwise, if not denominated to native tokens, at 730, the block-building node attempts to match these fee user tokens with a trade order record that would convert the fee denomination (in user tokens) to native tokens.

At 735, it is determined whether a matching reciprocal trade record (or a sequence of records) is found. If such reciprocal trade or sequence of trades is found, then at step 740, the block-building node settles a trade, and converts the fees denominated in user-defined tokens (or currency) into native tokens.

At 745, the block-building node compares the trade with trades within N number of blocks, and calculates a deviation percentage P. It then determines at 750 whether the deviation percentage P is beyond the upper or lower threshold limit. If so, at 755, some function of deviation percentage and fees R, which may be described as R(P, fees), is used to calculate the record's contribution to the block reward.

In at least one embodiment, this function would be implemented so as to augment the reward if the price for native tokens is too low relative to historical precedent, so as to disproportionally increase overall supply of tokens. If the tradable price for native tokens is too high relative to historical precedent, then this function would reduce or eliminate the reward, so as to suppress the overall supply of tokens. In any event, once the reward is calculated, at step 790, the record is added to the block with a reward that is either higher or lower than the record's fee, depending on the output of function R.

Otherwise, if the deviation P is not beyond the threshold at step 750, the fees converted into native tokens are added to the block reward at 758, and the original record is added to the blockchain.

If at step 735, it is determined that a matching reciprocal trade record (or a sequence of trades) is not found, then at 770, the transaction history is scanned and analyzed to determine whether trade volume V selling fee tokens for native tokens has settled within X number of blocks. As part of this process, at 775, it is determined whether trade volume V is greater than some minimum allowed threshold. If not, then the volume of trading is not high enough and the original record is considered invalid at 778. As a result, it is not included in or added to the blockchain.

If the volume V is over the minimum threshold, then at 780, the block-building node generates new native tokens and exchanges them for the fee tokens. At 785, the original user-type fee tokens are pledged to a trade order offering to exchange for native tokens, and with proceeds going to block reward account. After that, at 790, the original record is included on the blockchain, contributing certain amount to the block reward that is somewhat greater or possibly less than the fee value, but within the permitted level of fluctuation.

Thus, the stability of the native token type price and supply is maintained by the system.

Enhanced Cryptographic Key Management and Security

The security of a person's ownership of tokens, cryptocurrency, or other assets held or tracked on a blockchain typically depends on that person's ability to keep secret the private cryptographic key that is used to sign records, transactions, or smart contracts originating from that account. Such records, transactions, or smart contracts, when signed, are able to effectuate the assignment of those tokens, assets, or cryptocurrency units to accounts held by other people.

If a private cryptographic key becomes known to a person other than the owner of the account secured by that key, then that other person typically shares equal control over the contents of the account, even if they do not have de jure ownership of it. This de facto control extends to the point of being able to transfer those assets out of the original account and into an account out of reach from their legal owner.

One or more features and methods of the present invention solve this problem by reducing the risk of surreptitious key access by malicious actors. These features and methods also resolve certain regulatory hurdles caused by uncertainty regarding the custody of cryptographic keys. In some jurisdictions, broker-dealers may be prohibited from trading in and managing assets over which they cannot maintain exclusive control. The following is a means by which such entities may substantiate an assertion that it maintains complete control over the tokens in its custody.

In at least one embodiment of the present invention, each account may be assigned multiple cryptographic key pairs, each managed separately, and each able to authorize records that originate from—and modify the state of—the account. These key pairs would consist of a public component and a private component. These public and private components would work to enable the creation and verification of digital signatures using a standard digital signature algorithm such as ECDSA.

In at least one embodiment, each account key pair will have a separate configuration pertaining to the activities it may authorize and the records it may sign. If a record is signed by a key pair that is not authorized to generate that record, then the record is invalid, even if the account itself may validly originate that record. One or more designated master key pairs would be able to modify the configuration attached to the other key pairs that are associated with an account.

Different key pairs may correspond to different devices that act as wallets, providing the user or users with the ability to control what activities may be performed, and what records may be generated, on each device. This will permit more-secure devices to perform more activities—and have access to greater token values—than less-secure devices.

In at least one embodiment, for example, the wallet installed on a smartphone may use a key that has been configured to only generate transfer records, and only move 100 tokens per day. A home or office computer, on the other hand, may use a key having a limit of 1000 tokens per day, and be authorized to sign most record types. An air-gapped computer, on the other hand, would use a key that has unrestricted authorization. All these keys, however, would be accessing the same account.

In order to reduce the possibility of private keys being stolen undetected, and to ensure that each key pair is associated with one device at most, in at least one embodiment, every key would be usable one time only, replaced after each use. When a key pair is used, the record shares the public portion of the replacement on the blockchain, and the private key is retained by the wallet device. The whole configuration of the original key pair transfers over to the replacement key pair. Alternately, a configuration may control how frequently the key pair is replaced.

In at least one embodiment, individual account key pairs would be associated with sub-accounts, the purpose of which is to keep track of the configuration that adheres to the specific key pair, and in order to link key pairs to devices, and devices to accounts. When a record is generated and signed, the sub-account number is included in that record, in order to properly identify which key pair should be used to sign it.

In the event that an old, now-replaced key-pair signs a record, in at least one embodiment this will cause either the particular device/sub-account, or the entire account to lock up, and become unusable. Every on-chain activity and record corresponding to that account or to that device/sub-account would be treated as invalid.

Whether the whole account becomes locked, or only the one device/sub-account becomes locked would depend on the configuration of the account and of the device//sub-account. Similarly, the duration of the lock would depend on the configuration. The lock could be for a limited amount of time, or it could be indefinite, until certain steps are taken to unlock.

Reactivating the account or the device would require a process to regenerate the key for the inactive device, similar to the way that new devices and key pairs are added in the first place:

(a) An authorized, still-active device generates new key pair for the disabled device, updates the public portion on the blockchain via a reactivation message, and packages the key pair into a message to share with the inactive device or wallet.

(b) The new key message is shared with the disabled device via a QR Code, or via URL sent via text/email, via a network socket connection, via a radio transmission, via manual entry, or via some other means.

(c) The newly-reactivated device installs the key pair, and immediately generates a blockchain message to replace the shared key pair with a new key pair.

In high-security environments, re-activation may require that all or a majority of affiliated devices/accounts be used to generate the new key—including offline keys. In this case, in at least one embodiment, the above re-activation procedure would be repeated for multiple active devices, with the inactive device staying inactive until a sufficient number of reactivation messages had been added to the blockchain.

One implication of the key rotation and account locking method described above is that new records proposed by an account would have to specify their ordering or block height. If key rotation is frequent, then the order that records are added to the blockchain matters, because out of order records can trigger a lock.

This account locking feature, in combination with the key-rotation feature described above, would force one of two outcomes in the event of key theft: either the key thief would be quickly blocked from using the account, or if the key thief is successful, the account owner would be alerted by being blocked from using the account as soon as the unauthorized usage of the account occurs. Limits on the size of token transfers, and on the types of activities that an account key pair may authorize, mean that if a private key is stolen, the economic impact is capped.

In order to enable this functionality, and bootstrap the distribution of keys to distinct devices, the following method and process would be implemented in accordance with at least one embodiment of the present invention.

(1) A wallet device generates a new account on the blockchain, and produces a new key pair that is associated with a master sub-account for that new account. Because this wallet device holds and controls this master key pair, it should be considered the master wallet.

(2) This master wallet generates a new, secondary key pair associated with a secondary sub-account of the account.

(3) The master wallet adds the public portion of the key pair to the public blockchain, while the master wallet retains the private portion. The master wallet configures that secondary key pair as per the needs of the user, and adds this configuration to the blockchain.

(4) The master wallet packages the secondary key pair into a message to share with a secondary wallet device. The message is encoded in binary format, as a 2-dimensional bar code or QR code, as base 64 data within a URL, or another format.

(5) The secondary wallet, via a network socket connection, via a radio transmission, via a scan of a QR code, via manual entry, or via some other means, receives the key-replacement message from the master wallet.

(6) Finally, the secondary wallet device installs the key pair, and immediately generates a blockchain message to replace the shared key pair with a new key pair, giving the device exclusive control over the key pair.

In the case that a higher level of security is required, in at least one embodiment, an offline mode would allow secret offline keys to be set up as a security measure, and then kept in "cold storage" until needed.

This would be a way to add extra keys to an account, in order to provide some override capability in the event that an account is hijacked by having its online keys stolen. Alternately, keys with full permissions with regards to an account may be kept offline in cold storage, while active wallet devices all operate using keys that only have partial permissions.

The offline key generation method of the present invention may implement the following steps, elements and features (although not all steps, elements and features are required in every embodiment).

(1) A wallet device holding the master key pair for an account is taken offline and isolated in a secure environment, in order to reduce the possibility of hacking during this process. This air-gapped wallet device would act as the master wallet for purposes of this process.

(2) The master wallet generates a new, secondary key pair associated with a new offline sub-account of the account.

(3) The master wallet generates and signs a record adding the public portion of the key pair to the public blockchain, while retaining the private portion. The master wallet configures that offline key pair as per the needs of the user, and also generates and signs a record adding this configuration to the blockchain. If the offline key pair is intended to be a means to lock away full control of the account, then this configuration step may give the key pair the same permissions as the master key pair of the wallet.

(4) Because the master wallet is not connected to the blockchain via any network, these records are not automatically added to the blockchain. Instead, they are encoded visually using a QR code or some other visual means of storing data, and are printed on paper using a printer connected directly to the wallet.

(5) The master wallet then packages the offline key pair into a message, encoded visually using a QR code or some other visual means of storing data. This visual encoding is printed using a printer connected to the wallet, or is displayed on a computer monitor or other visual display connected to the wallet.

(6) A supporting wallet device, placed in a less-secure area, scans the QR code of the two records using an attached camera, and then conveys those records to the blockchain, thereby updating the blockchain to reflect the new offline key pair's public portion and configuration.

(7) The offline printed physical message (i.e. QR code) containing the key pair is kept in a secure facility until it is needed. For instance, it may be kept in a safe, lock box, or bank vault.

(8) Going forward, the master wallet may be reconnected to the network, but for maximum security it would remain disconnected, powered off or even destroyed. Before it is decommissioned, however, the master wallet of this process may follow this same offline procedure to again create one or more key pairs, in this case with reduced permissions. These key pairs would be uploaded to connected wallet devices, which would manage the day-to-day handling of the account, with reduced permissions in order to reduce the impact of a potential hack.

Note that this process depends on a feature of the present invention where, in at least one embodiment, a wallet device is able to receive an encoded record directly from another wallet device before that record has been added to the blockchain. The receiving wallet device is then able to add that record to the blockchain on behalf of the sending wallet device, by uploading the record onto the blockchain network. In the case described above, the means of transferring such a record is by visually-scanned QR code, but in other embodiments the message may be encoded in binary format, as base 64 data within a URL, or another format in addition to a 2-dimensional bar code or QR Code. Such data may be shared with the receiving wallet device via a network socket connection, via a radio transmission, via a scan of a QR code, via manual entry, or via some other means, in addition to via the means of a visual scan of a QR code or the like.

Payment Risk Mitigation

A common challenge that blockchain users face when using tokens to make payments in real time, especially retail payments, is that it takes some time to finalize or confirm a payment or token transfer on the blockchain.

First, a payment or transfer record or transaction needs to be accepted to a block that is added to the blockchain. Second, the risk of that block being overridden (i.e. being part of a fork that is discarded via a conflict resolution process) must be reduced. The risk of a block being overridden decreases as more blocks are built on top of it, because each additional block increases the fitness of the overall chain.

Without fast confirmation or finalization, it is difficult for commercial transactions, especially retail transactions, to utilize blockchain tokens as a means of payment. Customers and merchants both typically do not want to wait for payment to clear before products and services are conveyed from seller to buyer.

The present invention aids in the process of finalizing or confirming payments or transfers in at least one embodiment by decreasing the delay between blocks and increasing the rate that new blocks are added to the blockchain, via processes and methods described herein.

In at least one embodiment of the present invention the following process further improves the ability of the recipient of a payment or transfer to reduce the risk of that payment or transfer being reversed, thereby increasing the confidence of that recipient that they will be assigned control over those tokens in a durable way.

(1) One party, the "Recipient", generates a payment request specifying that a certain number of tokens be transferred to a certain account. The payment request is encoded as a message that contains the token amount requested and destination account or address to which the message will be sent, as well as other information including, in at least one embodiment, itemized details as to the services or products for which payment is being requested (as in an invoice), details regarding the identity of the requestor (for instance, name, street address, telephone number, photograph), and the type of token being requested in the case that more than one token is hosted within the blockchain system.

In at least one embodiment, the payment request will also incorporate a cryptographically-signed "transaction header" record, which record is required to be included for multi-signature atomic transaction processing according to the transaction protocol described elsewhere herein.

(2) This request message is then transmitted electronically via various possible means to the second party of whom payment is being requested. This second party, the "Sender", may, in at least one embodiment, receive this message via mobile text message or SMS, or via an electronic mail message, which message will contain a visual encoding of the request (for instance, as a QR code or 2-dimensional barcode) in a graphical attachment, or a URI which encodes the message in base 64 or other encoding format. The sender may also receive the payment request via a message sent over a packet-switched computer network via tcp/ip, udp or other protocol.

In at least one embodiment, the recipient generates the payment request using a computing device such as a mobile phone, smartphone, tablet, laptop, desktop computer, server computer, point-of-sale device, or purpose-built computation device (the Recipient device). This Recipient device would be connected to a monitor or other type of computer display; when the request message is generated, it is encoded as a QR code, 2-dimensional bar code, or other visual encoding, and is displayed on the monitor. The Sender would then use a camera attached to a Sender computational device to capture an image of the visually-encoded message, and decode the message by analyzing the captured visual image.

In at least one embodiment, the recipient transmits the request message via a radio-frequency antenna attached to the Recipient device, which message is received via a radio-frequency antenna on the Sender device. The information may be transmitted via near-field communication or other protocol.

(3) The Sender receives the payment request message via a computation device that is also a Wallet device, which stores cryptographic private key information pertaining the Sender's blockchain account or address. This Wallet device presents the payment request information to the Sender via a monitor, graphical display, text-based terminal or other output device (for instance, by reading the details using a voice synthesizer), requesting that the sender authorize a payment be made using tokens assigned to the Sender's blockchain account or address. The sender may provide this authorization by pressing a button, by providing verbal approval that is accepted by voice recognition, by typing in a specific command using a command-line interface, or by other means.

(4) Upon the Sender providing authorization, the Wallet device generates a token transfer record assigning the indicated tokens from the Sender's account or address to the account or address indicated in the Request message. This token transfer record would be signed using the private key signature that is held within the Sender's wallet device. In at least one embodiment, the signed token transfer record would be accompanied by additional metadata including relevant identity information such as (depending on the embodiment) name, zip code, address, telephone number, government ID number, and/or other relevant information.

If the request message is accompanied by a signed transaction header record, then token transfer record will include a reference to the transaction header record according to the transaction protocol described elsewhere herein.

(5) Upon the transfer record being signed, the Sender device would transmit the signed transfer record, along with any metadata, to the Recipient device. This signed transfer record may be sent via mobile text message or SMS, or via an electronic mail message, which message will contain a visual encoding of the signed transfer record (for instance, as a QR code or 2-dimensional barcode) in a graphical attachment, or a URI which encodes the message in base 64 or other encoding format. The Recipient may also receive the signed transfer record via a message sent over a packet-switched computer network via TCP/IP, UDP or other protocol.

In at least one embodiment, the Sender device would be connected to a monitor or other type of computer display; when the signed transfer record is generated, it is encoded as a QR code, 2-dimensional bar code, or other visual encoding, and is displayed on the display. The Recipient would then use a camera attached to the Recipient device to capture an image of the visually-encoded message, and decode the transfer record by analyzing the captured visual image.

In at least one embodiment, the Sender transmits the request message via a radio-frequency antenna attached to the Sender device, which message is received via a radio-frequency antenna on the Recipient device. The information may be transmitted via near-field communication or other protocol.

(6) The Recipient device, upon receipt of the signed transfer record, will then share the signed transfer data and any included metadata with a separate processing server, which is itself a specialized block-building node, or which is connected to a block-building node that it controls.

This processing server maintains a risk-weighting computational model that is capable of assigning a risk-weighting score to the signed transfer record that it has received. This risk-weighting score is based on the nature and history of the Sender's account that has been shared.

In at least one embodiment, the risk-weighting model would be implemented using machine learning techniques, which techniques shape the model by analyzing a corpus of data involving similar transactions, or by otherwise analyzing the blockchain data. Machine learning techniques such as neural networks, multi-layer perceptrons, random forests, support vector machines, decision trees, logistic regression, XGBoost, Reverse Bolzman Machines, Isolation Forests, Variational Autoencoders, Local Outlier Probability, Local Outlier Factor, DBSCAN or other machine learning algorithms may be used for this purpose.

(7) Depending on the risk score assigned, the processing server will either provide an immediate indication via the Recipient device to the Recipient whether the payment has been immediately accepted, or whether the payment requires further processing. The Recipient device will convey this information to the Recipient via its user interface.

If the processing server indicates that payment has been accepted, this tells the Recipient that it is safe to hand over products or merchandise or to provide services to the Sender, because there is a high likelihood that payment will be finalized on the blockchain. If the processing server indicates that further processing is required, then the Recipient may decide not to hand over products or services to the Sender until processing has been completed.

(8) The processing server will share the record with the blockchain network, and then will begin building a block that contains the record (along with other similar records that it has received). This may happen concurrent with the determination of the risk-weighting score, or following the determination of this score.

In accordance with at least one embodiment, if the transfer record points to a transaction header record, then the processing server will build a transaction record around the transfer record as per the transaction processing protocol described elsewhere herein. The processing server will then share that record (which will encapsulate the transfer record) with the network, and will build a new block containing that record, instead of doing so with the transfer record.

In the case that the risk-weighting model causes the processing server to decide that payment is not immediately accepted (i.e. of the risk-weighting score is too low), then the processing server will continue to analyze the blockchain consensus. When the processing server detects that the transfer record or transaction has been included in a block, and that the block has been built upon by a sufficient number of additional new blocks, such that it has a high enough likelihood of not being overturned or overridden, the server will then notify the Recipient device that the payment is finally accepted.

(9) In at least one embodiment, the processing server may be controlled and managed by a separate person or entity, the "Processor". The Processor maintains an account or address on the blockchain (the Processor Account) which is separate from the blockchain address or account maintained by the Recipient (the Recipient Account).

Under such an arrangement, the payment request message will indicate that tokens should be transferred to the Processor account, rather than the Recipient account.

In at least one embodiment, if the payment is immediately accepted, it means that the processor has guaranteed the payment. The processor will transfer tokens from the Processor Account to the Recipient Account, in an amount equal to the payment amount less a processing fee, by generating a transfer record to that effect. Separately and independently, the processor will broadcast the transfer record received from the sender (or the transaction which encapsulates it). If the first of these two transfers (from processor to recipient account) expires and is not ultimately accepted, the Processor will re-generate the transfer until it is accepted, regardless of the outcome of the second transfer (from sender account to processor account).

In at least one embodiment, if the payment is not immediately accepted, it means that the Processor has not guaranteed the payment. The processor in this case will also generate a transfer record from the processor account, assigning the payment amount less a fee to the recipient account. The processing server will broadcast this record to the blockchain together with the transfer record, and will then begin building a new block with these records. However, in this case, if the first of these two transfers (from processor to recipient) fails or expires, it will only be re-transmitted if the original transfer from the sender is confirmed and finalized on the blockchain.

In at least one embodiment, if transaction records are implemented as part of the embodiment, these two records will be combined into a single transaction record. This transaction record will be broadcast, and included in the next block that the processing server builds, so that both transfers are included on the blockchain, or neither are included.

Token and Record Type Definitions

Different record types may be utilized by a blockchain system and method in accordance with present invention. These records interact with and manipulate two types of token: native tokens, and user tokens.

The "Native Token", in the context of this application, refers to a token type that is inherent to the operation of a blockchain implementation, and can only be created or destroyed as part of the requisite operation of the blockchain implementation itself. Fees and rewards are in preferably denominated in the native token in accordance with at least one embodiment.

The "User Token", in the context of this application, is a token type that has been named and assigned some aggregate value through a user-created record on the blockchain.

The "Derived token type", in the context of this application, is a type of user token that is in some manner dependent upon another type of user token, a base token type. This allows for the delegation of new token type creation and new token creation in a controlled way.

The "Trade order record", in the context of this application, is a particular kind of record. A trade order offers to exchange one token type (be it native token or user token) for another token type. The offer is valid for a particular period of time, after which it expires if it is not matched.

The "Settlement record", in the context of this application, is a record that matches two trade orders. A statement record assigns the spread to an account specified by the Block-Building Node.

The "Pattern Linkage record", in the context of this application refers to a particular kind of record that may be added to the blockchain. A pattern linkage record links a pattern with a particular smart contract—if the pattern is matched by some event occurring within the processing of a block, by some record appearing within a block, or by some state being achieved as a block is processed, the linked smart contract will be executed as part of the block-building process.

The term "Proposition", in the context of this application refers to a real-world statement of fact that conforms to some formal structure and is quarriable and retrievable within a smart contract. For example, a statement with regards to outdoor temperature measured at a particular time and location, or the level of rainfall experienced at a location over a particular period, or the number of hurricanes named within the course of a calendar year. A proposition may also be a structured statement of fact that refers to a specific object within the blockchain, for instance referring to an account or address, or to a token type. A proposition would have a truth-state that is decided through processes implemented in the blockchain software: undecided, true, and false.

The "Proposition record", in the context of this application refers to a record that introduces a proposition to the blockchain, and initiates the process of deciding the truth-state of that proposition. A proposition record is created with a token reward that is distributed to the accounts that have voted in the majority when the proposition is decided, which decision occurs at a point in time defined by the proposition record.

The "Decision record", in the context of this application, refers to a record that risks a certain number of tokens to vote in favor of or against a proposition associated with a proposition record. Upon decision of the proposition, the tokens risked by records voting in the minority are distributed to the addresses specified by records voting in the majority.

Native and User-Specified Token Types

Two broad categories of token types may be defined for a blockchain: native token types, and user-specified token types. Instances of these two types of tokens, referred to as native tokens and user tokens, exist as account-associated or address-associated values within a blockchain system's global state. Nearly all blockchain implementations have a single native token type, which is used to pay fees and generate rewards that incentivize participation by users. In addition, within at least one embodiment of the present invention, any number of user-specified token types may be declared and defined as well. Depending on the specific embodiment, blockchain accounts and addresses may store value for a single token type, or they may store value for multiple token types. Blockchains built in accordance with at least one embodiment of the present invention may be able to hold multiple token types.

Native tokens may accrue to an account (1) via a transfer from a separate account that holds a native token value in excess of the transfer amount; (2) via the assignment of an automatic reward; or (3) via opening account balances set in the first block of the chain when the blockchain network first goes live. After the first block sets initial native token balances, the total aggregate balance of native tokens on the blockchain may only be increased via the mechanism of blockchain rewards.

User tokens function under different constraints. In at least one embodiment of the present invention, a new user token type is declared and defined via a "genesis" record. This genesis record may also assign some number of these tokens to an account or address, or set rules for the operation and use of the token within the blockchain system. Future use of that particular token type is restricted according to the configuration data specified as part of the genesis record. In at least one embodiment, a "genesis" record may be a unique format and class of record—separate and apart from other record classes. In other embodiments it may be the first transfer record accepted onto the blockchain that references that token type.

A user token type is identifiable by its label, which is a number or a character string. No two token types may share the same label. Any record referencing a particular token type label is only valid if it adheres to restrictions established according to the blockchain history preceding that token type's genesis record. In other words, the use of token type labels is enforced within the block-building process.

Genesis Records

A Genesis record is a type of record resident within a blockchain system. Within the present invention, genesis records are added to the blockchain in order to declare and define new user token types. Genesis records may contain all or some portion of the following data (not all elements and features are required in every embodiment):

- Label—the unique string that distinguishes one token from another, and which identifies different token balances within an account.
- Value—the aggregate token value created as a result of the inclusion of the genesis record; can be 0 in the case of a genesis record being used to increment the stake associated with an already-declared token type, in the case of a record that in some manner modifies the configuration of an existing token type, or in the case that the home account is granted authority to generate an unlimited number of derived tokens.
- Base token type—Optional. In at least one embodiment, a derived type will explicitly reference its base token type.
- Derived token label—Optional. In at least embodiment, the labels of derived tokens will be restricted according to the derived token label field. This field will specify a pattern that the label must satisfy for the derived type to be valid, which pattern may be implemented as a regular expression, or in a similar language.
- Home Account—the account that receives the newly-generated user tokens, and is thus able to distribute these tokens.
- Issuer Account—the account that cryptographically signs the genesis record; in the case of an "open" token issuance scheme, this is the source account for the original stake; in the case of an "authorized" token issuance scheme, this is the account that has authority to issue new tokens with the indicated label. This is the originating account that cryptographically signs the genesis record with its private key.
- Stake—in the case of an "open" token issuance scheme, the native token value staked (i.e. locked) in support of this user token; field not present under the "authorized" issuance scheme (see below).
- Fee—the amount that will be included among the block rewards to incentivize inclusion of the record in the blockchain.
- Fractional—setting that controls whether fractional or decimal values are permitted to be held by an account, or whether only whole number values may be transferred for the token type. Options are "fractional" and "whole"; default is "fractional". An alternative to the "unit fraction" field below.
- Unit fraction—setting that controls how many fractional tokens make up a single unit of the token. In an embodiment that implements the Unit Fraction field instead of the Fractional field, each token represents the smallest possible fraction of the asset represented by the token. Each token represents a fraction equal to 1/"unit fraction" of one unit of the asset. "Unit fraction" number of tokens equals one unit of the asset.
- Supply—in the case of an "authorized" token issuance scheme, controls whether the home account or the issuer account may arbitrarily increase the aggregate value available for a particular token, or whether the value is permanently fixed upon initial issuance. Options are "fixed", "unlimited" and "original issuer"; default is "fixed".
- New Issuance—in the case of an "authorized" token issuance scheme, controls whether the home account or the original issuer account may issue subordinate derived tokens—or, whether an account that is the bearer of a token may transform a token into new derived token types. Options are "original issuer", "home" and "bearer"; default is "original issuer".
- Authorization Subroutine—Optional. A smart contract subroutine to be executed whenever tokens of this type are included in any record. In at least one embodiment, this subroutine, when invoked, would receive as input all data records subject to authorization as arguments, along with the token type that originally linked to the authorization subroutine. The subroutine would return False in the case that the proposed record is not authorized, and True in the case that the record is authorized.
- Authorization filters—Optional. A list of filters that may be used to exclude conforming accounts from holding, sending or receiving tokens of the given type, or that may be used to require that accounts that hold, send or receive tokens of the given type conform to a certain profile. Filters would consist a pattern that records or accounts would need to conform to, and would reference details of a given account, including details that are attached to an account through the use of a proposition record. In at least one embodiment, each authorization filter may also specify which specific third-party accounts would need to have created, confirmed or decided any proposition record used or referenced by the authorization filter.
- Authorization Cascade—Optional. Boolean value that indicates whether or not the authorization subroutine should be invoked, and/or authorization filters should be enforced for instances of token types derived from the token in question. Options are "True" or "False", depending on whether or not the authorization subroutine and/or authorization filters of this particular user token type must be applied in the case of derived tokens as well as this token type itself.

As indicated above, two strategies may be followed in defining and declaring user-specified token types: one process for "authorized" tokens and one process for "open" tokens. User token types able to be declared and defined under an "open" scheme would be limited in number, and each new token type declaration would require a stake (with supplemental stakes also being possible in at least one embodiment). The specific number C of token types permitted to be declared and active at any one time would be constant for the blockchain implementation. An account that declares and defines an "open" token type would stake (i.e. lock) a certain number of native tokens, which native tokens would remain locked for as long as the associated user tokens remain active.

Only a new token type with a stake larger than the smallest stake among the global set of C-number token types will be accepted, although any positive-value stake would be sufficient if fewer than C token types are defined. Also, in at least one embodiment, a stake may potentially be subject to rescission based on age, diminishing the stake over time, and allowing dormant or abandoned token types to be cleared from the system when the stake falls below the requisite threshold. From time to time, additional native tokens may be staked to the token's "home" account in order to keep up with the stake values of other open token declarations; otherwise, a token type is liable to be removed from circulation when it is displaced by a sufficient number of new genesis records.

In at least one embodiment, a token type that has been declared and defined under the "open" process described above may avoid the limitations of this process—including the cap on the number of open tokens and the staking requirement—by being converted into an "authorized" token type. Such a conversion would occur if a well-formed authorization or genesis record is issued and cryptographically signed by an account authorized to initiate such a conversion, and is, in at least one embodiment, also countersigned by the account that signed the genesis record that originally declared and defined the token type in question. Alternately, a new token type that is defined and declared under the "authorized" process described below would never be subject to these limitations.

Issuance Process for Authorized Tokens

In contrast to "open" token types, the number of "authorized" token types is unlimited. While the number of possible "authorized" token types is unlimited, however, any new "authorized" token generation must proceed through an account-authorization path via a chain of genesis records that originates with the account that ultimately has authority to issue any new token type with any label: the "root" account, which would be the "home account" specified in the first genesis record within the blockchain. In at least one embodiment, this "root" account would be designated through the issuance of a genesis record using the empty string " " as a label, which genesis record would convey to the root account ultimate authority over the issuance of all other accounts.

Authorized token types would be generated via the following "issuance" process involving genesis records. As per this process, in at least one embodiment, new tokens can only be issued, and new token types can only be declared and defined, if these tokens and token types are issued and declared and defined by individual accounts that are explicitly authorized to do so.

As per the process described below, given two token types, one may be deemed to be a "derived" token type and the other a "base" token type if the existence and configuration of the "derived" token type is in some manner dependent upon the existence and configuration of the "base" token type. A new token type is deemed to derive from a base token type if the genesis record of the derived type in some manner references a base token type. Other than token types declared and defined by the "root" account, all authorized token types are derived from some base token type, including base token types within this reference chain.

The issuer account indicated in a genesis record must be authorized to issue derived tokens as per the base token's "new issuance" setting. Additionally, this issuer account must cryptographically sign the genesis record of the derived token type.

In at least one embodiment, the label of the first token type (the "derived" type) builds on the label of the second token type (the "base" type). In such an embodiment, a new token type is deemed to derive from a base token type only if the base type label consists of the same characters that form the starting portion of the derived type label.

In another embodiment, one token type may be is deemed to be the "base" of another "derived" token type if the home account of the base token type is counted as the issuer account used to issue the derived token type, and if the genesis record of the derived token type references the base token type. This alternate system may be useful in the case where no specific constraints are placed on the labels to be used by derived tokens.

A base token's "new issuance" setting determines which account is authorized to issue a new token type derived from that base token. A derived token's issuer account is the account that is authorized to issue new derived tokens as per its base token's "new issuance" setting.

New Issuance Setting of Authorized Tokens

In at least one embodiment of the present invention, if "new issuance" is set to "original issuer" or a comparable indicator, then only the issuer account specified in the base token type's genesis record may declare new derived types that derive from a particular base type. For instance, if "tok" is a base token type with the new issuance setting "original issuer", and "tok.derived" is a token type derived from "tok", then the genesis record that originally issues "tok.derived" is only valid if its "issuer account" is the same "issuer account" that signed the "tok" genesis account.

If "new issuance" is set to "home" or a comparable indicator, then a base token's home account may issue new derived tokens directly; the base token's home account would be the issuer account of the new derived token type. For instance, if "tok" is a base token type with the new issuance setting "home", then the genesis record issuing a new derived token type "tok.derived" would specify an issuer account that is the home account associated with "tok".

If "new issuance" is set to "bearer" or a comparable indicator, then any account may transform some portion of the user tokens it holds into a new derived type; this action would be destructive of the original base tokens. In this case, an account holding tokens of type "tok" could issue new derived tokens of type "tok.derived", provided that the new issuance setting of "tok" is "bearer".

Supply Setting of Authorized Tokens

In at least one embodiment of the present invention, the "supply" setting specified in a genesis record controls whether or not the total aggregate value available for a given token type may be augmented, and if so which account is authorized to augment that supply.

If a new token type is defined with "supply" set to "unlimited" or a comparable indicator, then the home account for that token type may arbitrarily increase the aggregate value of that token within the blockchain; records using that token's home account as a source account (and signed by the home account) will be valid even when they exceed the token value stored in the home account.

If a new token type is defined with "supply" set to "fixed" or a comparable indicator, then only the token value specified in the genesis record will ever be created.

If a new token type is defined with "supply" set to "original issuer" or a comparable indicator, then the total aggregate value of tokens issued of that type may only be augmented by the issuer account of that genesis transfer record. In at least one embodiment, records (such as transfer records or trade order records) using such issuer account as a source account will be valid even when they exceed the token value stored in that issuer account, provided that the authority of that issuer account is not itself restricted by a more restrictive genesis record with reference to its base token type.

Whenever a derived token type is declared and defined, unless the base token type has its supply set to "unlimited", the value specified in the derived token type's genesis record will draw down the total supply available to the base token type (i.e. the total aggregate value of all authorized tokens of the base token type). In this manner, the total aggregate value of all tokens of a given base token type and all its derived types cannot exceed the supply that is authorized for that base token type.

The following scenario descriptions illustrate the interplay of the "new issuance" and "supply" settings:

(A) Token_A token type is declared in a new genesis record with "new issuance" field set to "home", "supply" field set to "unlimited", and home account set to Account_A.

In this case, Account_A may at any time increase the total aggregate value of Token_A tokens on the blockchain. Account_A may also at any time issue new derived token types that reference Token_A as a base token.

(B) Account_A declares a new token with label "Token_A.Child_1" in a new genesis record with base token being "Token_A", "new issuance" field set to "home", "supply" field set to "original issuer", and home account set to Account B. Token value in the genesis record is 10,000.

In this case, Account B is able to declare a new derived token with base token "Token_A.Child_1", having label "Token_A.Child_1.Grandchild". Without any intervention from Account_A, Account B is only able to declare 10,000 total token value of Token_A.Child_1.Grandchild, which also depletes the token balance of Token_A.Child_1.

Account_A, however, is able to issue new Token_A.Child_1 tokens at will via additional genesis records, replenishing Account_B's balance of Token_A.Child_1, and permitting Account_B to increase the total aggregate value of Token_A.Child_1.Grandchild tokens.

(C) Account_A declares a new token with label "Token_A.Child_2" in a new genesis record having "Token_A" as its base token type, with "new issuance" field set to "home", "supply" field set to "fixed", and home account set to Account_C. Token value in the genesis record is 10,000.

In this case, Account_C is able to issue a new genesis record declaring a new token type with label "Token_A.Child_2.Grandchild", having a base token type "Token_A.Child_2". The maximum total value of Token_A.Child_2.Grandchild tokens that Account_C is able to declare is 10,000, which also depletes the balance of Token_A.Child_2. Because supply of "Token_A.Child_2" is fixed, no additional tokens more than 10,000 total will ever be declared for Token_A.Child_2 and all of its derived token types in the aggregate.

In at least one embodiment, "new issuance" is set to "original issuer" and "supply" is set to "fixed" by default if the settings are omitted in the genesis record.

In the case of a new derived token type, in at least one embodiment, "new issuance" may only be set to "home" if the original base token type's genesis record also sets the "new issuance" setting to "home". A derived token type cannot have a more liberal issuance policy than its base token type.

Also in the case of a new derived token type, in at least one embodiment, "supply" may only be set to "fixed" if the base token type has a "supply" setting of "fixed" or "original issuer". However, if the base token type has a "supply" setting of "unlimited", then the new derived token type may be set to any of "fixed", "original issuer" or "unlimited". This means that an account issuing a new derived token can only specify a "supply" setting that is at least as restrictive as the "supply" policy to which it is itself subjected.

Both "authorized" and "open" tokens may also be issued to smart contracts (where the smart contract address is the home account in the genesis record). These smart contracts, implemented as Turing-complete code, may transfer and issue tokens and perform any other actions permitted by a non-contract account. Smart contracts may limit or automate the way that tokens are issued or distributed.

Authorization Contracts, Authorization Filters, and Authorization Cascade

Token issuers and creators of new Token Types may from time to time wish to restrict the use and ownership of tokens to certain qualified entities and persons. Or, they may want to enforce certain rules for the transfer and acquisition of tokens—for instance, buy limiting the total number of accounts that may hold a particular token, or by specifying a minimum holding time for tokens, or any other arbitrary limitation that may be placed using computational logic. The use cases specified elsewhere herein enumerate a variety of restrictions that may be desirable for token issuers.

In order to specify and enforce these limitations via the block validation process of the blockchain, in at least one embodiment of the present invention, genesis records may specify Authorization Contracts and Authorization Filters that are used to control and limit transfers and trades of user tokens. Genesis records may also be used to enforce these limitations on derived tokens through the use of the Authorization Cascade configuration option specified herein.

If a record is not authorized, then either it will not be added to the blockchain, or if added to the blockchain, it will not modify the global state of the blockchain system, and any token assignments it contains will not be reflected in token balances within the global state.

In at least one embodiment, any data record that references a particular user token would be subject to authorization via the authorization subroutine referenced by or specified within the genesis record defining that token's type. Genesis records, transfer records, trade order records, settlement records, transaction records that encapsulate other data records that reference the user token in question, and any other data record that references tokens of the token type in question would require such authorization if an authorization subroutine is specified.

Due to the computational cost of executing the authorization subroutine, any blockchain record subject to authorization may need to allocate a higher native token fee than would otherwise be required if it were not subject to authorization. Some portion of the native token fee assigned with the record must be used to cover the full cost of executing the authorization subroutine.

Authorization subroutines are invoked and executed during block validation, at the point when block-building nodes evaluate whether a block or blockchain segment is valid to be built upon. If an authorization subroutine returns False, the record in question is still considered valid and any block that includes the record is still considered valid, provided that the record and block are otherwise valid and well-formed in all other ways. However, modifications to the global state specified within this kind of unauthorized record will not occur, with the exception of the usage of the native token fee to compensate the execution of the authorization subroutine.

Prior to validation in at least one embodiment, the network node that first becomes aware of a record will execute its authorization subroutines before new blocks are created and broadcast to the node network. This way, no data record will be broadcast, transmitted or included in any block unless it is properly authorized. This would happen immediately at the point at which the user constructing a data record first submits it to a network node, and would only happen if the record is provided to the node by a trusted source. In at least one embodiment, only records signed with the node's own account's private key would be authorized in this way before being added to a block, in order to prevent nodes being overwhelmed by the computational burden of analyzing too many records.

Authorization filters, however, in at least one embodiment, are not Turing complete, and are not able to execute any arbitrary computational procedure. In at least one embodiment, one or more filters would be applied to a record before it is broadcast to the blockchain network. If a record does not conform to these filters, it cannot be incorporated into a valid block, and will not be broadcast to the network at all.

In at least one embodiment, authorization filters will consist of pattern definitions of the kind found within pattern linking records (described below). For example, in at least one embodiment, pattern definitions may be written using a declarative query language, such as XPath. In a manner similar to the process used to identify objects conforming to the pattern definitions of pattern linkage records, the pattern definition of an authorization filter will be applied to the set of objects that constitute and/or are related to the record being authorized. If the objects do not conform to the filter—if there is no conforming object within this set of objects—then the record is unauthorized. Otherwise, it is authorized.

In the case of a record that operates on one or more derived tokens, in at least one embodiment, after authorization filters and authorization subroutines pertaining to the token types named in the record have been applied, the configuration of base token types is examined by whatever node is assessing and processing that record. If base token types specify that "authorization cascade" field is True, this will cause the node to apply the authorization filters and authorization subroutines attached to the genesis records of the base token types.

In at least one embodiment of the present invention, the authorization subroutine of a genesis record would not return a Boolean value, but instead would return the number of tokens that are authorized to be transferred or traded. In this manner, the authorization subroutine may augment the number of tokens, or decrease the number of tokens that are ultimately received as part of the transfer or trade. In this manner, a form of interest could be distributed to token holders, or maintenance fees could be imposed on token holders. Any increase in the token value would draw down the total number of tokens issued or issuable per the genesis record; Any decrease in the token value would increment the tokens available to be issued. An unauthorized record would cause the subroutine return a negative number.

Alternately the authorization subroutine could return an entire instance of the same type of record that it receives as input. In such a case, the authorization subroutine may transform any aspect of the record, leave it unchanged, or if the record is invalid, return an error code of some kind.

Transfer Record

A transfer record moves a token value out of a source account or address and into a destination account or address within the global state of a blockchain system. A transfer record is acceptable for inclusion in a new blockchain block if it is well-formed, if it has been signed by the private key of the source address, and if it is otherwise valid. For a transfer record to be valid, for example, processing the record should never result in a negative token balance, or result in the global state of the blockchain itself becoming invalid.

Transfer records may incorporate the following data (and potentially other data as well, although not all elements and features are required in every embodiment):

Source account—account signing the transfer record, from which the transferred token value will be subtracted Source token type—the type of token being transferred out of the source account Source token value—the value in source token type being transferred Source token fee—the amount that will be included among the block rewards to incentivize inclusion Source token fee token type—the type of token being used to supply the fee; typically, this will not be specified, and will default to native token type Destination account—account to receive the transferred tokens Destination token type—the type of token received as a result of the transfer; if not specified, assumed to be the same as source token type; if different from source token type, then an attempt would be to match a trade order record that may be settled to permit the transfer to occur.

Destination token value—the value in destination tokens that would be assigned to the destination account. This is field optional, and is only specified in the case that a destination token type different from the source token type is specified.

If the source token type and the destination token type are not the same, then a transfer record may only be included in the blockchain if it is matched with a trade order record and is settled via a settlement record that references the trade order. Depending on the implementation and embodiment, the transfer record and the settlement record may be two separate records, or the settlement may be represented by certain fields on the transfer record itself.

In any event, the inclusion of such records in the blockchain will result in the destination account receiving tokens of the destination token type in an amount equal to the destination token value, and in the account that originated the trade order record receiving tokens of the source token type in an amount equal to the source token value. If a single trade record is insufficient to cover the total value of the transfer, then a combination of trade orders would be referenced by the settlement records.

In at least one embodiment, a block-building node would generate this settlement record when processing a multi-token-type transfer record. The block-building node would identify a matching trade-order record—specifically, the trade order record offering to purchase source tokens in exchange for destination tokens at the most beneficial exchange rate among all known trade orders—and would construct a specialized settlement record that references that trade order as well as the transfer record. Any spread between the transfer record and the trade order—meaning, any difference between the destination token value and the token value that can be acquired by trading for the source token value—would accrue to the block-building node.

Per this implementation, multi-token-type transfer record will only be accepted into the blockchain if it is accompanied by a valid settlement record, and if the settlement record points to a valid trade order record already incorporated into the blockchain in an earlier block (and active within the order book), or a valid trade order record that is included in the same new block. Furthermore, a multi-token-type transfer record cannot be added to a block if there is no trade order record available with an ask price lower than the effective bid price represented by the destination token value (or vice versa). In other words, a positive spread must be generated when a multi-token-type transfer is processed.

In at least one embodiment, if the destination token value is unspecified at the same time that a destination token type is specified within a multi-token-type transfer record, then such a transfer record may be matched with any corresponding trade order, provided that the trade order offers (or improves upon) the most advantageous bid or ask price specified in the permanent order book at the time, excluding trade orders already matched.

The fee value included with a transfer record may be of the native token type, or it may be of a user-specified type. Depending on the implementation or embodiment, it may or may not be required that fees be denominated in the native token type. An implementation that permits an account to store value for many token types allows, among other things, more flexibility in terms of how fees are included with transfer transactions. In the event that fees are required to be denominated in native tokens, but if fees are instead denominated in a user-specified type, then they must be matched against a trade order and settled in a manner similar to that described above for the transfer record to be accepted.

Another embodiment might combine transfer records and genesis records into a single type of record. A new token type would be declared and defined via the first transfer record containing that type that is accepted onto the blockchain. By convention this would act as a "genesis" record; all of the rules described above would apply to such a record, and the fields described above would be included in such a record as well, but it would be formatted and presented on the blockchain as a transfer record. The first transfer record to send tokens of a given type would act as the genesis record for that token type.

Transactions and Transaction Protocol

A transaction, in accordance with at least one embodiment of the present invention, is an ordered collection of records and smart contracts that must all be added to the blockchain together, or none will be added at all.

Furthermore, if a transaction and its constituent records and smart contracts are successfully added to the blockchain, no modification will be made to the global state of the blockchain system unless all are records are fully authorized, and unless all smart contracts invoked while processing the transaction terminate successfully. In other words, the transformation to the global state of the blockchain system represented by each record and smart contract will only proceed if all records and smart contracts within the transaction are able to effectuate their individual transformations successfully.

The individual constituent records and smart contracts comprising a transaction must always be processed and executed in sequence in the order specified by the transaction record itself—with no intervening records or smart contracts, except for arbitrage trades or other mandatory records that must be included, or smart contracts that must be invoked, as a necessary implication of the inclusion of these constituent records in the blockchain.

In at least one embodiment, a transaction record itself is not signed; instead, it is secured by the signatures of the individual records that it contains. The data of each of the transaction's constituent records include reference to the preceding record in the list, and then each record is individually signed, potentially by different parties depending on which originating account or address is included in each record. Under this arrangement, multiple parties may contribute separate records to the transaction, such that records from multiple entities, and the global state transformations each record represents, may all be executed atomically. In such a scenario, the following multi-signature atomic transaction protocol may be followed to include records that are signed by multiple parties controlling multiple accounts.

(a) The first record in the list is a "transaction header" record generated by the entity that will ultimately broadcast the transaction to the blockchain network. This transaction header record is signed by this first party.

(b) The first party may then add additional records to the transaction by generating new records, each record having reference to the preceding record. The first party would then sign each record independently. After adding records, the first party would then share the transaction and all its constituent records with other parties, using a data transmission method capable of sharing data between computational devices.

(c) Parties wishing to add records to the transaction would add records in sequence, with each record referencing the preceding record, and with each record being signed independently using a private key that corresponds to its originating account or address. Any entity appending a new record to the transaction would be provided the reference value needed to refer to whatever record is preceding in the list.

In at least one embodiment, the reference made by one record within a transaction list would be a deterministically-generated hash of a standardized representation of the data of the preceding record in the list. Because the data of each record incorporates a reference to the preceding record in the list, including its cryptographic signature, no individual record in the chain may be extracted and processed separate and apart from its specific placement in the transaction. Any modification to any element of the list of constituent records would invalidate the entire transaction.

(d) After all parties have added records to the transaction list, the whole set of records will be shared with the original first party. The first party will add one more record to the list, a transaction footer record, and then would broadcast the transaction and its record list to the blockchain network. The transaction footer record must be signed by the same account that has signed the transaction header record. The existence of the transaction header and the transaction footer ensure that the transaction must be execute together, and cannot be re-formed by a malicious actor.

(e) Any block-building node that includes the transaction and its constituent records into a new block would first need to verify the correctness and validity of all internal references within the transaction record list, as well as the validity of individual records and their signatures. Any individual constituent record would not be accepted for inclusion unless the referenced transaction record is included, along with all other constituent records, which requires all of them to be valid and signed.

In at least one alternate embodiment, a single omnibus transaction record may be constructed, which record would encapsulate all constituent records, without the constituent records each needing to be independently signed. In such an embodiment, if all constituent records have the same originating account or address, then the transaction record would only need to be signed using the private key of that sending account. If, however, the constituent records have different originating accounts or addresses, then the transaction record would need to be signed by multiple accounts or addresses; the transaction record would need to be signed once by each account or address referenced as an originating account or address within its constituent records.

Proposition Determination Procedure

Within the present invention, proposition records serve the purpose of incorporating external off-chain information into the blockchain, for it to be utilized for various purposes by smart contracts and specialized records that operate within the blockchain. Proposition records incorporate this information into the blockchain, and establish its veracity, via a decision process involving proposition records, supporting reward allocation records, and decision records.

In at least one embodiment of the present invention, proposition determination has two phases: (1) the initial reward collection phase, in which proposition records and supporting reward allocation records assign the initial reward to be distributed to whatever accounts correctly determine the outcome of the proposition in the end, and (2) the determination phase, in which votes are cast in the form of token assignments either for or against the proposition as initially put forth in the original proposition record. These votes are cast in decision records.

Per this procedure, the truth or falsehood of a proposition is decided according to which side is willing and able to risk the highest value in tokens. The rewards allocated and distributed to the winning side (and the penalties incurred by the losing side) incentivize participants to vote in favor of or against a proposition when those participants have specific independent knowledge of its trough or falsity—or when they highly trust other participants who have already cast their vote.

A proposition is decided—and the proposition determination process is closed—after a well-defined amount of time has passed, typically measured in terms of blocks added to the blockchain. In at least one embodiment of the present invention, this amount of time is defined within the original proposition record when that record is added to the blockchain, kicking off the determination process. Such a proposition record would specify a time (i.e. block height) when decision records will be accepted to the blockchain, and may also specify a time (i.e. block height) when decision records will no longer be accepted to the blockchain, at which point the process is closed.

At least one embodiment may decide whether to close the proposition determination process according to some function that contemplates both the value differential between decision records, and the number of blocks occurring between decision records. If only low-value decision records are being added at the end of the decision process, then it would be appropriate to cut short the amount of time required to pass (i.e. it would be appropriate to decrease the block height) before the determination process is closed. Alternately, the inclusion of a high-value decision record would extend the amount of time (increase the block height) before the determination process is closed. This will prevent late bidders from overwhelming a proposition that has a hard cutoff, and will prevent small-time bidders from indefinitely prolonging a proposition that uses inactivity to determine closure.

In order to provide participants in the proposition determination process information that is potentially useful in deciding whether the proposition is true or false, in accordance with at least one embodiment, decision records and proposition records may incorporate evidence, or reference to external evidence, as to the truth that they are asserting. For instance, IPFS urls, DIDs as defined by W3C or some kind of independently verifiable digital declaration could be added as supplemental data within these records. References added to proposition records and decision records could point to image files, PDF files, or cryptographically signed files of any kind. All participants and potential participants within the proposition determination process would benefit from the inclusion of such information due to the opportunity it would provide them to assess such evidence to make independent determinations as to the validity of the proposition.

Figure 8:
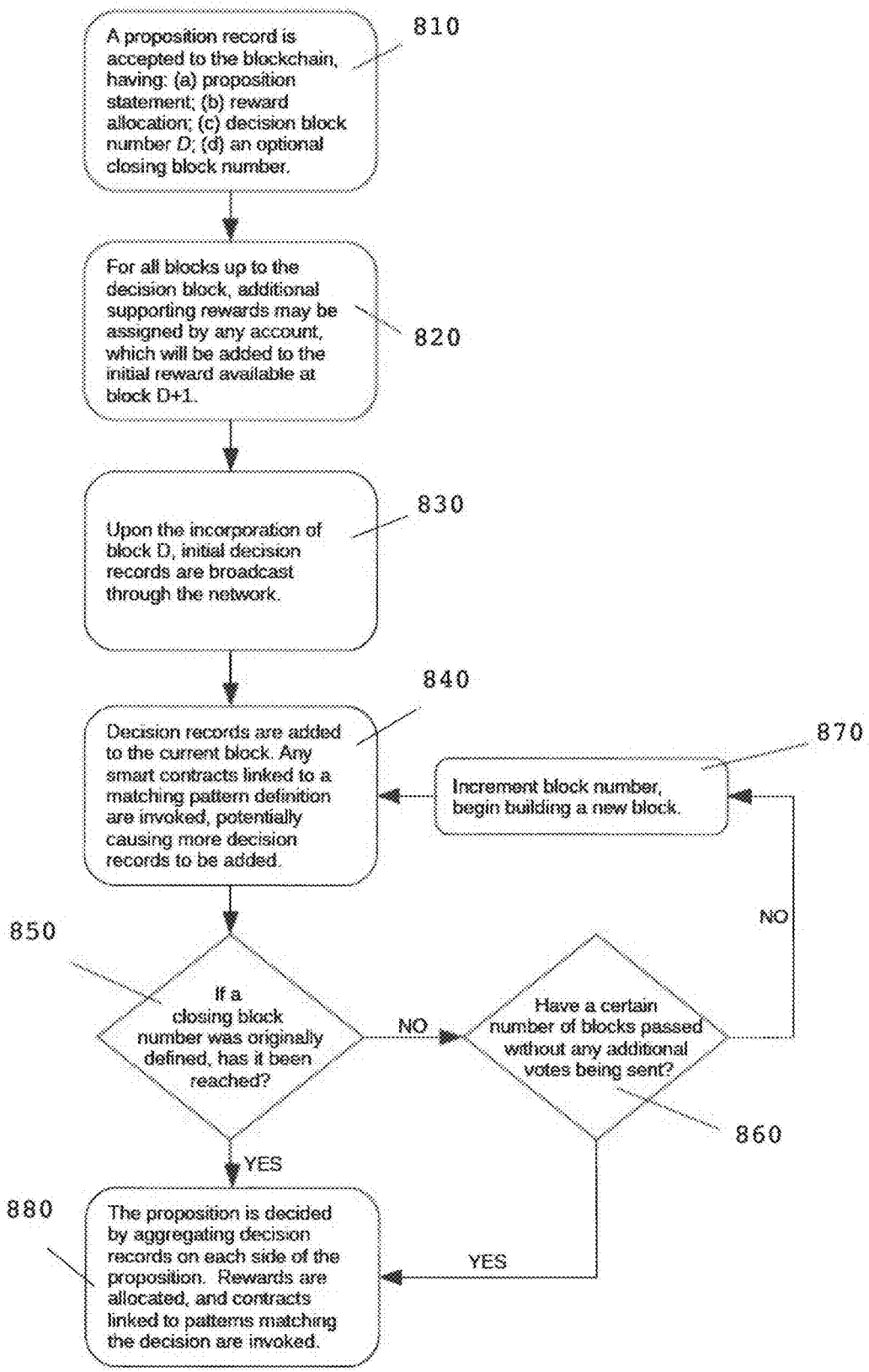
FIG. 8 illustrates proposition determination procedure in accordance with at least one embodiment.

A particular embodiment of the proposition determination procedure is described with reference to FIG. 8. At 810, a proposition record is accepted to the blockchain, having the following fields: (a) a proposition statement; (b) a reward allocation; (c) a decision block at height D; and (d) an optional closing block at height C. In at least one embodiment, a proposition statement may also contain a proposition expiration field, which is the block height beyond which the proposition statement cannot be regarded as true, regardless of the outcome of the proposition determination procedure.

At 820, for all blocks up to the decision block at block height D, additional supporting rewards may be assigned by any account, which rewards will be added to the initial aggregate reward available at block D+1. At 830, upon the incorporation of block D, initial decision records are broadcast through the network.

At 840, decision records are added to the new block being built. Any smart contracts linked to a matching pattern definition are invoked, potentially causing more decision records to be added. At 850, it is decided whether the closing block at height C has yet been reached, but only if a closing block height was specified in the original proposition record.

If the closing block height C has been reached (YES at step 850), then the proposition at 880 is decided by aggregating decision records on each side of the proposition. Rewards are allocated, and contracts linked to patterns matching the decision are invoked. Otherwise (NO at step 850), it is determined at 860 whether a certain number of blocks passed without any additional votes being sent. If so (YES at step 860), then the proposition is decided as described above for step 880. Otherwise (NO at step 860), then the block number is incremented and the process of building a new block is started at step 870. The process then returns to step 840, where more decision records are added to the new block. Any smart contracts linked to a matching pattern definition are invoked, potentially causing more decision records to be added.

In at least one embodiment, a proposition record may also specify whether the inclusion of decision records in reference to that proposition will be restricted to certain accounts or addresses, whether that restriction would apply to the whole of the decision process, or only the outset of the decision process (at or near block height D), and which accounts would be permitted to submit decision records.

In at least one embodiment, the system and procedure would have a proposition record include an optional list of specific accounts permitted (or required) to generate the initial set of decision records pertaining to that proposition record. Accounts not included in this list may only add decision records to subsequent blocks following the first decision records produced in proximity to the decision block.

In at least one other embodiment, this restriction would not only apply to the initial set of decision records, but would also apply to all decision records added for a given proposition. Only accounts in this list would be able to generate decision records that pertain to the proposition record in question, for the entire decision period. Alternately, the proposition record may specify that a minimum number of accounts in this list must generate decision records for the outcome of the process to be valid.

In at least one embodiment, a simplified decision process would be possible whereby a proposition record would list only one account as permitted to generate decision records, and whereby the proposition record would set a closing block at height C that is within a short distance from the decision block at height D, or is even the same block. Following this approach, a user may generate a proposition that is intended to be decided by a single account (but in any event an account separate from the account that generated the proposition in the first place).

In at least one embodiment, a proposition record may also be self-determined, such that the proposition is marked as already decided when the record is included in the blockchain. In order to enable this behavior, a field added to the proposition record would indicate that the proposition is self-decided. Such a proposition record would not be subject to the proposition determination process described herein, and its proposition would automatically be regarded as true. No proposition reward would need to be included as a result, beyond the standard fee that is used to incentivize its inclusion in a block.

Proposition Reward Allocation

Figure 9:
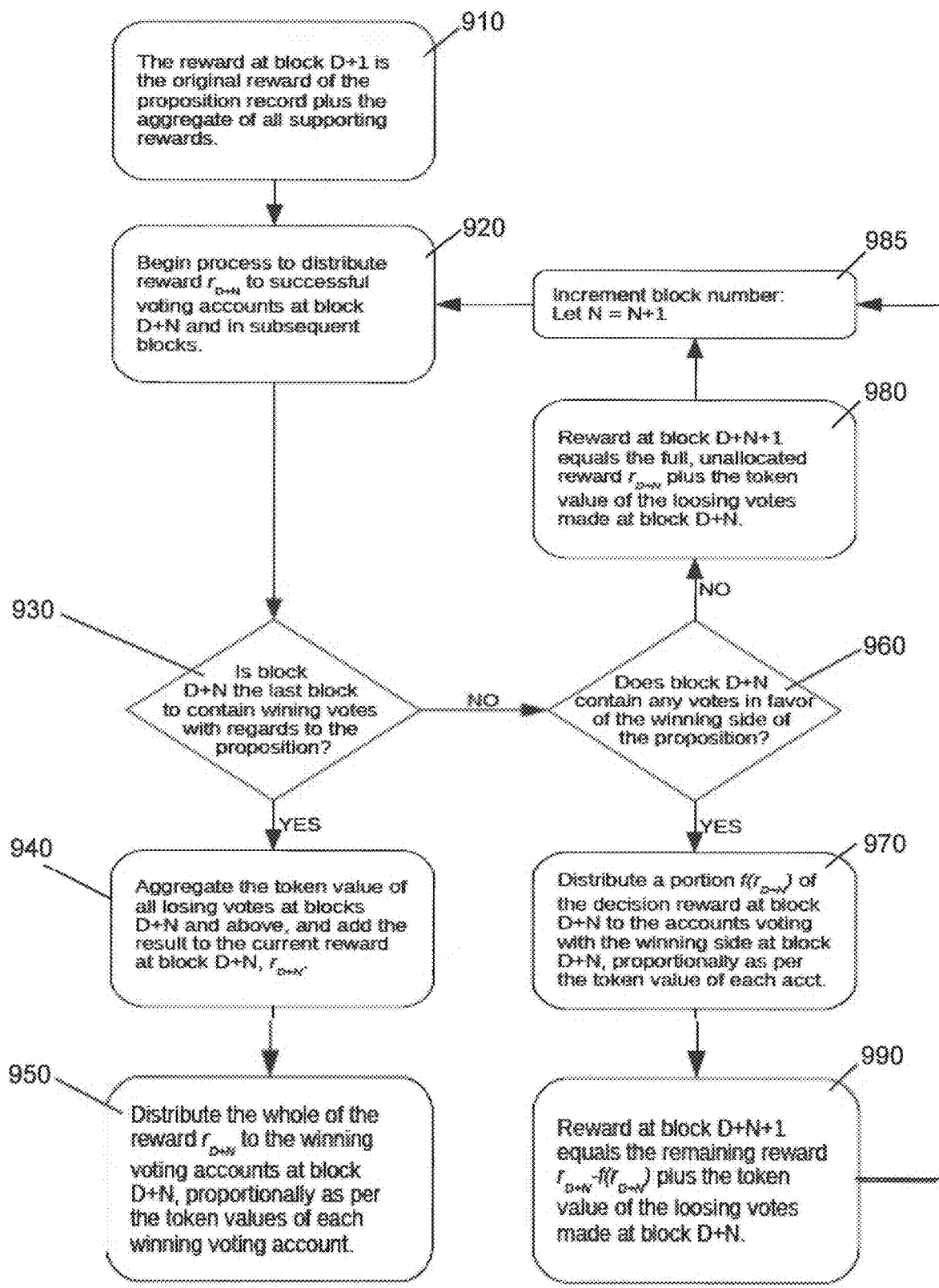
FIG. 9 illustrates the process of distribution of proposition rewards to successful voting accounts in accordance with at least one embodiment.

The process of distributing proposition rewards to successful voting accounts in accordance with at least one embodiment of the present invention is described with reference to FIG. 9.

To determine the winning side of the proposition (True of False) in accordance with at least one embodiment, the value of the tokens voting for each of the two sides is aggregated. The side with the highest aggregate value is then determined to be the "winning" side. The winning voters may receive a full rebate of their tokens, while the tokens of all losing voters are added to the reward pool allocated to the winning voters, as per at least one embodiment of the present invention.

At 910, the reward allocated for block D+1, $r_{D+1}$ is the original reward of the proposition record plus the aggregate of all supporting rewards. Beginning at 920, voting reward $r_{D+N}$ is distributed to successful voting accounts at block D+N, and in subsequent blocks. The initial voting reward for block D+N would be established in the prior block, with the reward where N=1 being $r_{D+1}$.

At 930, it is determined whether or not the block with height D+N is the last block to contain wining votes with regards to the proposition. If so (YES at step 930), the block-building node will, at step 940, aggregate the token value of all losing votes at blocks D+N and above and add the result to the current reward at block D+N, which value $r_{D+N}$ had been set previously at block D+N−1. Subsequently, in step 950, the whole of this combined reward will be distributed to the winning voting accounts at block D+N, proportionally as per the token values put at risk by each winning voting account, and the process will terminate.

Otherwise (NO at step 930), where the block D+N is not the last block to contain wining votes with regards to the proposition, the system proceeds to step 960, where it is determined whether block D+N contains any votes in favor of the winning side of the proposition. If it does, then at 970, it will distribute a portion $f(r_{D+N})$ of the decision reward at block D+N to the accounts voting with the winning side at block D+N, proportionally as per the token value of each account. Then, the remaining portion of the reward $r_{D+N}-f(r_{D+N})$ is placed in reserve, to be used to augment the reward available at the next block, block D+N+1. The reward available for distribution within this next block, $r_{D+N+1}$, will equal the remaining reward $r_{D+N}-f(r_{D+N})$ plus a portion of token value of the losing votes made at block D+N, as indicated in step 990. Then the block number is incremented (N=N+1) at 985 and the processing returns to step 920 for the next block.

If at step 960, it is determined that block D+N does not contain votes in favor of the winning side of the proposition (NO at step 960), then no rewards are allocated at block D+N, and the whole of the unused reward $r_{D+N}$ is placed in reserve, to be used to augment the reward available for the next block, block D+N+1. In this case, the reward $r_{D+N+1}$ available to be allocated at block D+N+1 equals the full, unallocated reward $r_{D+N}$, plus the token value of the losing votes made at block D+N, as indicated in step 980. Then the block number is incremented (N=N+1) at 985 and the processing proceeds to step 920 for the next block.

In at least one other embodiment (not illustrated) the ratio of tokens rewarded at each block may be a function of both the timeliness of the vote and the token amount placed at risk. An early but smaller amount placed at risk will receive more reward than a late, larger amount placed at risk.

Proposition Statements

When the proposition determination process terminates successfully with a resulting decision that a proposition is "true", then the proposition statement attached to the original proposition record is added to the global state as a data point that may be used throughout the blockchain system to guide the flow of logic or otherwise modify system behavior.

Proposition statements are structured logical statements that (a) may be attached to another object within the global state of the blockchain system; (b) may be attached to arbitrary strings representing real-world concepts; or (c) may stand alone without attaching to any particular object. In at least one embodiment, a proposition statement that attaches to an account would add additional fields to that account, which fields may be accessible via reference to that account. Similarly, in at least one embodiment, a proposition statement that attaches to a token type would add additional fields to that token type, which may be accessible via reference to that token type, or via reference to tokens of that type.

Proposition statements may add one or more fields to the objects they attach to, or they may make logical assertions. In at least one embodiment, proposition statements would incorporate one or more Boolean statements each having a value, a Boolean operator, and a variable, field or feature of the object the Boolean statement describes. Such Boolean statements may be queryable, they may be matched against a pattern definition, or they may be testable within the logic of a smart contract.

In at least one embodiment, in the case that a proposition statement does not attach to any specific object within the global state of the blockchain system, the proposition itself exists on its own in a queryable data structure along with other independent proposition statements.

In order to reduce system bloat, data complexity, or computational load, the way that proposition statement data is stored may depend upon the process by which the proposition is decided, and what accounts participate in the determination process. In at least one embodiment, if the account that generates and signs a proposition record is related to the object the proposition statement attaches to, then the proposition statement data will be stored with that object and will be retrievable with that object. Otherwise, the proposition statement data will be stored separately and will be retrievable separately from that object to which it is attached.

In at least one embodiment, if a proposition record is generated and signed by the account that its proposition statement attaches to, in that case proposition statement data will be stored together with that account in the global scope. In at least one other embodiment, if a proposition record is generated and signed by the home account or issuer account of a token type, then that record's proposition statement may be stored together with whatever separate account it attaches to, if that separate account holds tokens of that type. In other embodiments, a proposition statement attached to a token type would be stored together with that token type's definition and configuration, provided that the proposition record that introduces the statement is the home account or issuer account of the token type, or of the token type's base or ancestor token types.

In all three cases, an attempt to retrieve the attached object, be it an account or token type definition, will also retrieve the proposition statement data that attaches to the object. However, in at least one embodiment, a proposition statement that attaches to an account or transaction type will not be stored and retrievable with the account or transaction type, unless the proposition record that introduced that proposition statement was generated and signed by related accounts.

Pattern Linkage Records

In at least one embodiment of the present invention, pattern linkage records link executable smart contracts within a blockchain to "pattern definitions". Each such record may contain all or some of the following fields: an originating account or address, a token allocation used to supply fees and gas to compensate processing (either as one combined field, or as two separate fields), an expiration date or block height, an execution frequency, a starting block, a smart contract or a reference to a smart contract, and a pattern definition. Pattern definitions are intended to match (a) records that might be added to the blockchain in future blocks, (b) particular transformations of system state, or (c) events that occur within the course of a block being formed or validated. In at least one embodiment, pattern definitions are written using a declarative query language, such as XPath.

When such pattern definitions are assessed in relation to the records or events of a particular blockchain block, if they are found to match one or more such records, are found to match one or more transformations of system state effectuated by such records, or are found to match one or more such events, then the smart contracts linked to those patterns are invoked.

Such an assessment is carried out by the block-building node that is building the block in question, or the next block, depending on the embodiment. The block-building node will be aware of still-viable pattern linkage records that were added to the blockchain in some previous block. The node will iterate over that set of pattern linkage records, matching their patterns against the records, state transformations, and events that have been included with the current block, or the most-recently-created block. Upon finding a match, the node will execute the smart contract referenced by that linkage record.

For example, a particular pattern could be defined that matches transfer records that transfer amounts greater than some specified value, and that also send tokens to some specified account. A pattern linkage record containing such a pattern definition would cause whatever linked smart contract is specified in the linkage record to be executed in the event that a matching transfer record is added to the blockchain.

Alternately, a pattern linkage record may match with a change in state that occurs during the course of a block's evaluation. For instance, a linkage record's smart contract could be executed in the event that some specified account's balance surpasses some specified threshold.

By way of example, in at least one embodiment that utilizes an XPath-like syntax for pattern definitions, the pattern definition that matches a transfer record with a value greater than 100 tokens may be implemented as a string of the form '/transfers[value>100]', which pattern definition indicates that transfer objects having value greater than 100 within a block are selected. The pattern definition string '/transfers[value>100 and source_token_type="RUC"]' would indicate that transfer records transferring more than 100 RUC tokens would be matched. In a more complex case, a transfer sent by an account that has attached a "jurisdiction" proposition to itself might be matched with the pattern definition string '/transfers[account/jurisdiction!="USA.NY"]'. A state transition of an account balance falling below 200 RUC tokens might be matched with the pattern definition string '/accounts/07201969/tokens/RUC[value<200]', which would match if the new RUC balance of account 07201969 is less than 200 after the block has been processed, but was equal to or greater than 200 before the block was processed.

In at least one embodiment of this type of pattern definition implementation, the root object of the expression may refer to a record type, or it may refer to an object within the global state. It if it refers to a record type, then records within a block would be matched. If it refers to an object in the global state, then a state transition occurring as a result of processing a block would be matched. If a record matches the pattern definition, then that record is passed as an argument into the linked smart contract subroutine. If an object in the global state matches, then the record that embodies the change in global state (i.e. the state transition) occurring within that block is passed into the linked smart contract.

A pattern linkage record may need to include or assign native token fees in order to incentivize its inclusion in a new block, and/or to pay for the execution of the smart contract that it references. Because such a fee assignment would source those fees from a specific account, the pattern linkage record would need to be cryptographically signed by the private key of that account.

If fees are required to incentivize a block-building node to include a pattern linkage record in a block, then the viability of that linkage may be limited by the quantity of native token fees the linkage record includes. For instance, a pattern linkage record may specify that it is to be assessed by block-building nodes for G number of blocks, for which computational effort the record allocates X tokens in fees. Each block for which the pattern linkage record is assessed will claim some portion of these X fee tokens to be allocated to its own block reward.

The assignment of a portion of X fee tokens to the block reward for a given block is determined by some function f(X,G,N), where N is the current block. In a simple case, such that f(X,G,N)=X/G, each block in which the pattern is assessed would get an equal portion of the allocated fees. The block that first incorporates the pattern linkage record into the blockchain is incentivized to do so if the ratio X/G is high.

In addition to fee tokens, each pattern linkage record must also assign enough native tokens to pay for the execution of the linked contract—i.e. "gas" tokens. Due to the "halting problem" (as conceived of by Turing and others), it is not knowable how many computational steps will be required for a linked smart contract to complete its execution. Each step of execution must consume some quantity of native tokens—and the total number of computational steps taken by a smart contract dictates the overall cost of its invocation.

The execution of a long-running or otherwise computationally-heavy smart contract may exhaust the supply "gas" tokens assigned via the linkage record for this purpose. If the pattern linkage record spends all of its gas tokens before it has expired, such a linkage record will lose its viability before its scheduled expiration.

After a pattern linkage record is incorporated into the chain, it must be evaluated for each block until it expires, or until it runs out of native token fees to pay for the assessment of its pattern in relation to other block records, or "gas" tokens to pay for the execution of its linked smart contract. After a linked smart contract has been executed by a block-building node, the block-building node will add a linkage reward record to the block, which record causes the "gas" tokens that were spent through execution of the linked smart contract to be assigned to the total reward of the block.

In at least some embodiments, a pattern linkage record may specify separate native token allocations for "gas" and "fees". However, in other implementations, a single allocation of native tokens may account for all "gas" and "fees" in the aggregate. As fees and gas are consumed, both would draw on the same fungible amount. In some embodiments, a "max fee" and/or a "max gas" may be specified per pattern linkage record, which would set an upper limit for what portion of the tokens allocated to the pattern linkage record may be consumed for each block. A Dutch-style auction similar in method to that which is described below pertaining to on-chain trading may be followed in at least one embodiment to determine which pattern-linkage records to incorporate into the blockchain and to process for each block.

Figure 10:
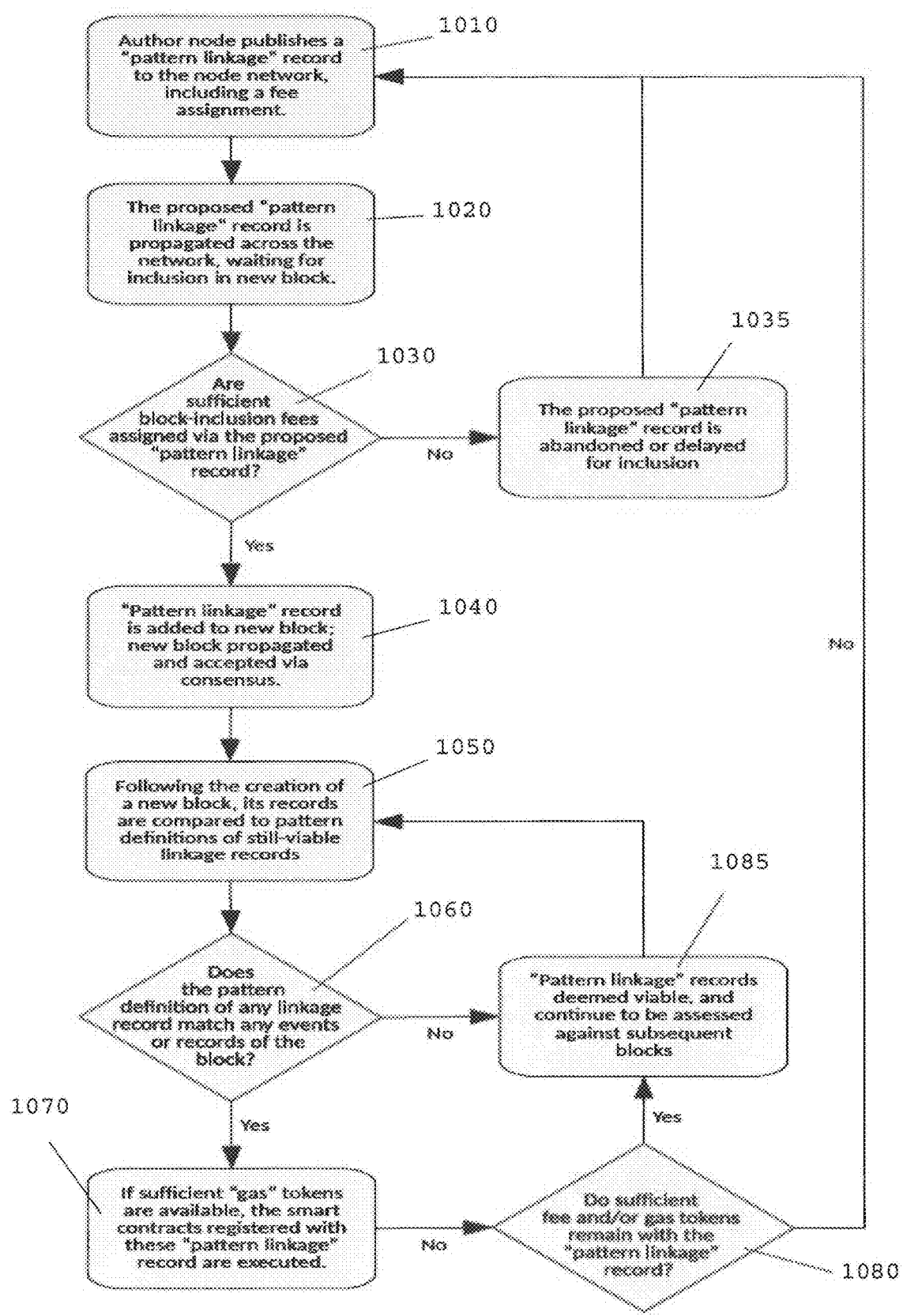
FIG. 10 illustrates processing of linkage records on a blockchain in accordance with at least one embodiment.

The processing of linkage records on a blockchain in accordance with at least one embodiment of the present invention is described with reference to FIG. 10.

At 1010, author node publishes a "pattern linkage" record to the node network, including a fee assignment. Then, at 1020, the proposed "pattern linkage" record is propagated across the network, and waits for inclusion in a new block on the blockchain.

At 1030, it is determined whether there are sufficient block-inclusion fees assigned to the record via the proposed "pattern linkage" record. If so, (YES at step 1030), then the "pattern linkage" record is added to new block, and the new block is propagated and accepted to the blockchain via consensus in step 1040.

Otherwise, (NO at step 1030), the proposed "pattern linkage record" is abandoned or delayed for inclusion in step 1035, and the processing goes back to step 1010.

In step, 1050, after inclusion of pattern linkage records into a new block and the acceptance of that new block in the blockchain, its records are compared to pattern definitions of still-viable linkage records (i.e. linkage records that have not expired and have not depleted their fee allocation). If it is determined at step 1060 that the pattern definition of any linkage record matches any events or records of the block (YES at step 1060), then at step 1070 the smart contracts associated with those linkage records are executed. A block fee is deducted from each linkage record's fee allocation, and each linked smart contract is processed until it terminates, or until the "gas" tokens allocated to its linkage record are exhausted.

In at least one embodiment, the results of these operations are incorporated into the next block that is added to the blockchain; some portion of these operations up to a certain threshold must be performed for that block to be considered valid. Alternately, in at least one other embodiment, these operations are performed as a new block is being built, such that the results are incorporated into the same block that includes the records, transformations or events being matched by the linkage records.

Following the execution of the smart contract associated with a particular pattern linkage record, an evaluation is made at step 1080 as to whether sufficient "gas" and fee tokens remain within that linkage record's token allocation, and whether or not the linkage record has otherwise expired. If the linkage record is unexpired and has sufficient tokens to continue (YES at step 1080), then that pattern linkage record is deemed viable and is added back into the pool of viable linkage records, to continue to be assessed against subsequent blocks at step 1085.

Otherwise, the pattern linkage record is removed from the pool (NO at 1080). Processing returns to step 1010 for the creation and inclusion of new pattern linkage records.

If it is determined at step 1060 that the pattern definition of any linkage record does not match any events or records of the block (NO at step 1060), then, at step 1085, the "pattern linkage" record is added back into the pool of viable pattern linkage records, and continues to be assessed against subsequent blocks. The process then goes back to step 1050 in order to repeat the comparison of block records, transformations and events to pattern definitions of still-viable linkage records, for the next block.

In at least one alternate embodiment, however, a block fee would nonetheless be deducted from the token allocation of each pattern linkage record being evaluated, for every block within which it is evaluated, regardless as to whether or not the linkage record matches with any records, transformations or events within the block. In such a case, the pattern linkage record will have to be evaluated for viability (i.e. whether it has sufficient tokens in its remaining fee allocation) regardless as to whether or not it finds a match, and may therefore be removed from the linkage record pool regardless as to whether or not it finds a match if it has run out of fee tokens.

Similarly, in at least one embodiment pattern linkage records will specify an expiration field, which may be specified as a block height at which the pattern linkage will expire. In such a case again, the pattern linkage record will have to be assessed as to whether or not it has expired regardless as to whether or not it finds a match, and may therefore be removed from the linkage record pool regardless as to whether or not it finds a match if it has expired.

In at least one embodiment, the frequency at which a pattern definition may be evaluated at step 1050 would be controlled by an execution frequency configuration specified with the pattern linkage record. A pattern linkage record may define a frequency such that it is evaluated at every block (the default), or it may specify an alternate frequency, up to a certain limit, such that it is taken from the pool and evaluated every five blocks, or every 100 blocks, or whatever. The first block in which the pattern definition would be evaluated would be set by a "starting block" field within the pattern linkage record, if such a field is specified.

In at least one embodiment, in the case of a pattern linkage record having an execution frequency that is less than once per block, the pattern definition will be compared to, and will work to filter, all records and all transformations of the global state that have occurred within the blocks created since the pattern definition was previously evaluated.

On-Chain Trading Process

Tokens of one type held by one account may be traded for tokens of another type held by another account, through a process that utilizes trade order records and settlement records added to a blockchain.

Figure 11:
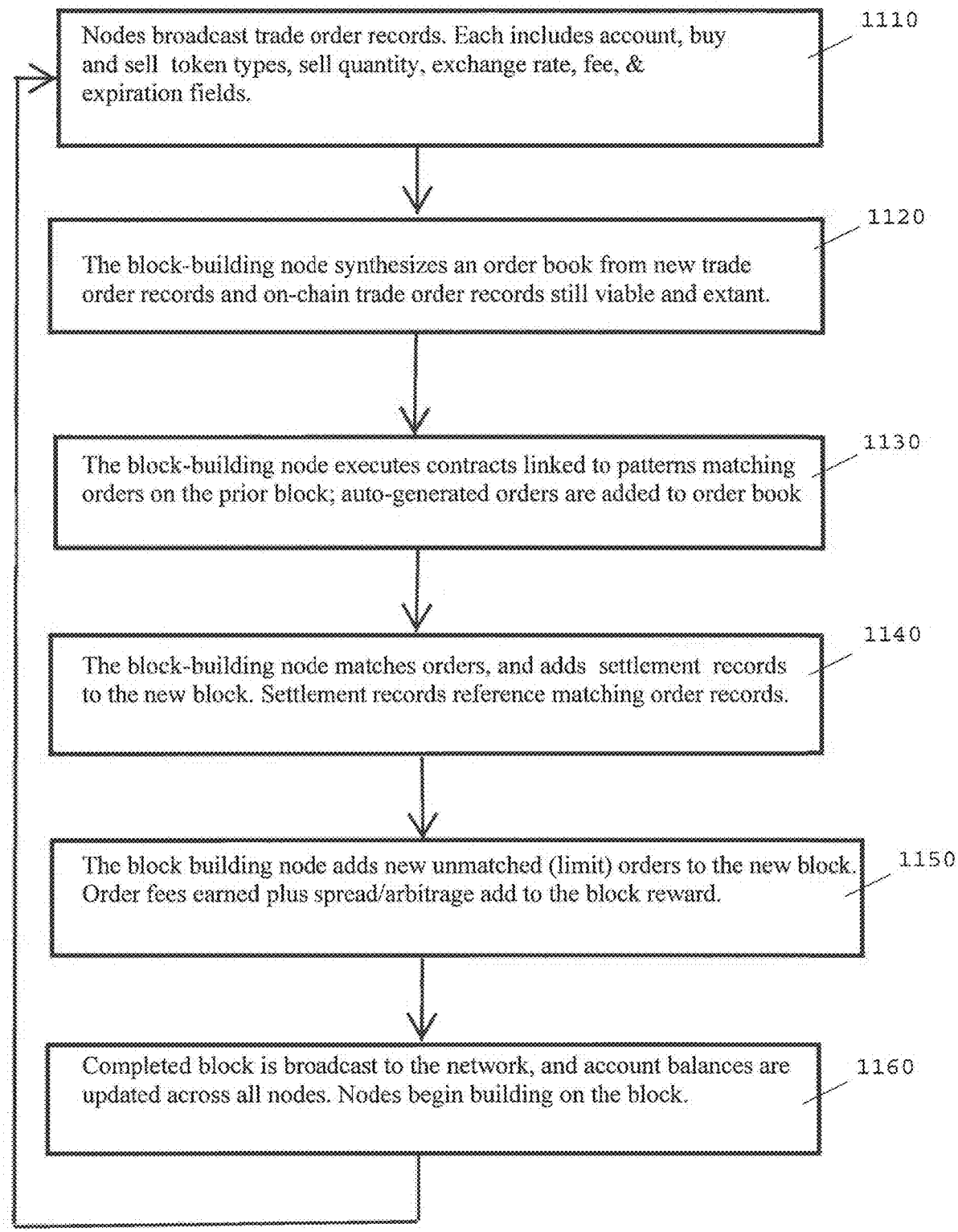
FIG. 11 illustrates processing of trading records on a blockchain in accordance with at least one embodiment.

The flow chart in FIG. 11 illustrates a process of at least one embodiment of the present invention by which token trading may be implemented within peer-to-peer networked blockchain software using trade order records and settlement records. Trade orders are broadcast through the network in the form of trade order records, they are incorporated into an online order book, and then they are matched by a block-building node within the network, with matched orders being simultaneously recorded and settled on the blockchain via settlement records.

The order book is described here as having been "synthesized" because it is built by assembling and prioritizing newly broadcast orders along with permanent on-chain orders that were incorporated into earlier blocks on the blockchain, that have not yet expired and that are still unmatched. After synthesis, the order book may reside in the node's local memory without being synced with the rest of the blockchain network. The synthesized order book differs from the blockchain system's permanent order book because it is local to the block-building node, reflects only the information currently available to that node, and has not been incorporated into the blockchain system's global state.

In at least one embodiment, it is the prerogative of the block-building node as to which newly-broadcast trade order records are added to the synthesized order book. The node may take into consideration all of the newly broadcast orders that it has become aware of (provided that they have not yet expired). There is no formal limit as to how many of these orders there may be.

The number of orders that are made permanent by being included in blocks added to the blockchain, however, may be subject to the size limitations of the permanent order book. In at least one embodiment, beyond a certain threshold number of permanent on-chain orders, new trade order records may not be added to the permanent order book unless older orders expire or are fully matched and are removed from the order book.

In at least one embodiment, a finite number of buy and sell orders may be added to the permanent on-chain order book at a time. New trade orders may only be added if old trade orders have expired to make room for new trade orders, or if old trade orders have been fully matched and removed from the order book, such that the size limitations of the permanent order book are not exceeded. Alternatively, in at least one other embodiment, permanent on-chain orders may be displaced from the permanent order book by new trade order records with higher bid amounts or lower ask amounts than are found within the permanent order book. A block is not valid if too many trade order records are added to it.

In any event, in at least one embodiment, any newly broadcast, non-permanent trade order may only be matched in a trade by the block-building node if such a trade yields a smaller spread than would be had by matching with a comparable permanent trade order already incorporated into a block on the blockchain. In any matched trade effectuated by a settlement record, the highest-bid or lowest-ask trade orders within the permanent order book must be used, unless a higher-bid or lower-ask trade order is available among the newly broadcast trade orders. Following this approach, a block-building-node is prevented from simply ignoring the order book and settling trade orders—potentially inferior trade orders—that are known only to that block-building node.

The block-building node is responsible for matching orders, which matches are memorialized via settlement records generated by the block-building node itself. The settlement record references all matched orders, all of which are removed from the synthesized order book, and from the permanent order book if also found there. Any newly-broadcast trade order that is matched via a settlement order must be added to the new block along with the settlement order.

The block-building node is incentivized to maximize its own token reward, and will likely try to create matches that maximize fees by choosing trades that have the highest fees, all else being equal. Additionally, the node will benefit from whatever spread is available between orders that are matched; the node will direct the spread to whatever account it is configured to use, which conventionally will be the account of its owner. To maximize the spread, the node will typically match trade orders having the most advantageous rates of exchange.

The node may also take advantage of arbitrage opportunities within the synthesized order book by matching chains of orders of different asset or types, and by redirecting profit to its own asset account. For instance, if offers to exchange A for B do not exist, an offer of B for A can be matched with offers for A for C and C for B. A node may make such chained matches in order to satisfy a trade order, or to enable a multi-token-type transfer order to be incorporated into a block.

In at least one embodiment, the block-building node may also match trade orders having a negative spread (meaning, pairs of trade orders where the bid is less than the ask), provided that the block-building node is able to cover the difference by using its own tokens, or tokens from the fee. A block-building node may be incentivized to do this if the potential fee for settling the trade is large enough to cover the difference, or if the match is one part of a larger arbitrage chain that is otherwise profitable.

The block-building node may choose which unfilled newly-broadcast trade orders are preserved in the new block—and are thereby added to the permanent order books—and which unfilled orders are not included. This choice is incentivized by fee tokens included with each trade order record. The amount of time that a trade order record is listed in the permanent order book is determined by its specified expiration, which may be expressed in terms of block height or in terms of a specific date and time. In addition, the record will have to provide sufficient fees to remain viable within the order book for the specified period.

In at least one embodiment, the on-chain trading process described here may be combined with the token authorization process of the present invention in one or more embodiments such that each trade order record is subject to whatever authorization requirement is configured in the genesis records of the user token types it references. In such an embodiment, trade order records would only be viable and would only be included in the permanent order book (or in any synthesized order book) if they pass the authorization subroutine and the authorization filters that are linked to the token types those trade orders reference. In at least one embodiment, a failure to pass the authorization subroutine associated with one of its token types would not prevent a trade order from being added to the blockchain, but it would prevent its inclusion in any order book, and would invalidate any settlement record that attempts to match that trade order record.

Trade order records as described herein function as limit orders, and are equivalent to limit orders in the conventional sense; unmatched permanent trade orders function as resting limit orders in the permanent order book. In at least one embodiment, transfer records as described elsewhere herein function as market orders, although for a single account or address to use a transaction to acquire a certain token type for itself, it would specify itself as both the sending account and destination account (alternately, in at least one embodiment, specifying a destination account within a transfer record may be optional, with the implication that the specified sending account would assumed to also be the destination account if the destination account is left unspecified). Such multi-token-type transfer records are only processed and executed if an arbitrage path is discoverable by the block-building node.

A stop-loss order may be implemented as a pattern linkage record that matches settlement records embodying a certain exchange rate, linked to a smart contract subroutine that itself executes a market order by generating a transfer record as described above. A stop-limit order may be implemented as a pattern linkage record linked to a smart contract subroutine that internally creates a trade order record.

Referring to FIG. 11, the on-chain trading may proceed as follows in at least one embodiment. At 1110, nodes, including wallets and block-building nodes, broadcast trade order records in accordance with at least one embodiment. Each order may include originating account, buy and sell token types, sell quantity, buy quantity (or, alternately, exchange rate), fee and expiration fields.

In at least one embodiment, other fields may also be specified, including an additional field that indicates whether the trade order may be partially matched, or whether it must be fully matched. At least one embodiment, would allow a trade order to be explicitly marked as "resting", so that the order is not be matched before being added to the permanent order book (i.e. before being added to the blockchain), and such that after it is added to the permanent order book, it may only be matched against transfers and newly broadcast trade orders, not against other permanent trade orders.

At 1120, the block-building node synthesizes an order book from newly broadcast trade order records and on-chain permanent trade order records that are still viable, not expired and are (at least partially) still unmatched. Then, at 1130, the block-building node executes smart contract subroutines linked to patterns that match trade order records, settlement records or other records or state transformations within the prior block. Auto-generated trade order records automatically generated within these smart contract subroutines are added to the order book.

The block-building node matches orders at 1140, and adds settlement records to the new block. Settlement records reference matching trade order records. The block-building node adds new unmatched trade order records to the new block at 1150. Order fees earned plus spread/arbitrage profits are added to the block reward.

In general, two trade orders will match if the token type being offered by one trade order is exactly the same token type being requested by the other trade order, and vice-versa. In at least one embodiment, however, a trade order may specify that it is requesting a particular token type, but that it will also accept any derived type of that token type. If trade order records use label strings to identify the token types being offered and requested, they may use wild-card characters to match with a broader class of tokens, not just single token types. For instance, FRP BankA may be offered in exchange for "FRP*", representing all token types that are prefixed by the "FRP" string, which would typically mean the FRP token type, and all its derived types.

In at least one embodiment, block-building nodes may create settlement records that reference any number of trade order records, and that reference order records offering to trade any number of different token types, provided that when taken together all trade order records are balanced and settle out with no conflict. This capability enables a block building node to assemble multiple matching trade orders to fulfill a large order.

This capability also enables a block-building node to assemble chains of trade orders to match a trade order that cannot otherwise be matched. For instance, when a trade order is added to the order book offering to trade token A for token B, but no matching order offering to trade token B for token A exists, the block-building node may match the original trade order with two orders, one which trades B for C, and another that trades C for A. This chaining of trade order records may also enable the block-building node to earn arbitrage profits, whereby a more advantageous exchange rate may be achieved by chaining trade orders than the exchange rate expressed by standalone trade orders.

In at least one embodiment, tokens earned via the spread or through arbitrage would be added to the block's reward pool denominated in native tokens. In such a case, these arbitrage or spread profits would need to be converted to the native token type by including with the block additional trade order and settlement records that effectuate that conversion. In at least one other embodiment, tokens acquired via the spread or via arbitrage are assigned only to the reward account of the block-building node, in their original denomination without being converted to native tokens.

Finally, at 1150, the completed block is broadcast to the network, and account balances are updated within the global state across all nodes of the blockchain system (provided that the block is accepted by all nodes). Nodes begin building on the block, and the process is repeated from step 1110 for the next trade order block.

On-Chain Trading Using Dutch Auction Rules to Specify Fees

In accordance with at least one embodiment, the on-chain trading of the present invention may be enhanced by a trade order prioritization process utilizing a Dutch-style auction to select viable trade orders before they are matched. The following steps, elements and features constitute a method of the present invention by which to implement such a trade order prioritization and matching scheme utilizing trade order records and settlement records within a blockchain system (although not all steps, elements and features are required in every embodiment).

To begin, the number of open trade orders that constitute the permanent order book is capped at some number X, and only the highest-bidding (with regards to native token fee) trade orders are included in the order book at any one time. "Highest-bidding" in this case refers to the native token "service" fee, not with regards to the trade itself in relation to the pair of tokens being traded. Membership in the order book is decided based on which trade orders offer the highest fees for inclusion, via a "Dutch-style" auction where either (a) the lowest bid that clears the bar (i.e. the Xth-highest bid) is applied to all parties; or (b) the next-highest bid is what is charged to the participant, in which case the Nth highest bidder will pay the (N−1)th highest price.

Each trade order record includes the following fields, in addition to other relevant fields that have already been specified above for trade orders:

(a) Expiration: timestamp or block number after which the trade order will fall off of the order book.

(b) Fee reserve: the aggregate fee in native tokens that are segregated and available to be applied to each block (c) Max fee bid: the maximum fee that any order would pay per block to be analyzed or considered for matching After initial configuration, for each blockchain block that is built by a block-building node, the following procedure is followed in order to determine which trade orders are included in the order book, which records are added to the blockchain, and how fees are allocated:

(1) The set of unexpired permanent trade orders already added to the blockchain in prior blocks is evaluated. The X number of these trade order records that specify the highest max fee bid—and which have a sufficient portion of their fee reserve balance available to cover the max fee—are added to the synthesized block. (Any ties are broken first by fee reserve, then by block number, and then by a hash of its contents)

(2) As per its own discretion, the block-building node then adds new trade orders (i.e. trade order records not yet incorporated into the blockchain) to the synthesized order book, and to the permanent order book preserved on the blockchain. The node may incorporate any number of new trade orders to the synthesized order book, even for no fee. However:

(a) Only those new trade orders that offer higher max fee bids than the unmatched trade orders already on the blockchain are added to the permanent order book (and are thereby added to the new block). New trade orders must specify a max fee bid higher than the smallest max fee bid of the X unmatched permanent trade orders already added to the synthesized order book in order to qualify for permanent inclusion.

(b) If a new trade order is included in the synthesized order book without meeting the max fee bid threshold, it may only be included if it offers better trade terms for the trading pair specified than the unmatched permanent trade orders in the permanent order book. Such trade orders only are added to the new block if they are matched; otherwise, they persist in an "ephemeral" state until they can be reconsidered for inclusion in the next block, or until they expire.

(3) Via a "Dutch-style" auction as described above, the actual fee amount for each trade order is calculated, and is deducted from the fee reserve balance of each trade order. The fees paid by all trade orders are added to the aggregate reward for the block.

Ephemeral new trade orders that are matched without having been included in the permanent order book do not have to comply with the fee requirements of the Dutch-style auction, and do not assign any fee to the block reward unless they are matched. If ephemeral new trade orders are matched, then the fee actually assigned to the block reward will be the lesser of the fee reserve and the fee amount as determined by the Dutch-style auction.

(4) Trade orders within the synthesized order book are matched, and settlement records are created. Trade orders are prioritized within each trading pair such that the highest bid orders will be matched to the lowest ask orders. As described elsewhere herein, however, settlement records may reference two trade orders, or more than two trade orders, and chains of trade orders may be used to match trade orders having otherwise incompatible trading pairs.

If trade orders cannot be matched because the ask price is higher than the bid price for that trading pair, then the block building node may utilize any portion of the fee reserve balance to cover the difference, or may contribute its own tokens to cover the difference. Otherwise, such trade orders will remain unmatched.

(5) Token balances within the account records of the blockchain system's global state are updated to reflect settled trades. Any remaining tokens within the fee reserve balances of the settled trade orders are returned to the originating accounts of those trade orders.

(6) Trade orders that are not matched are evaluated to assess whether or not their fee reserve balances still exceed their max fee bids. Those trade orders with insufficient fee reserve balances are removed from the permanent order book, and the remaining fee reserve balances are returned to the account that originated the trade order.

(7) Old trade orders that have expired are removed from the permanent order book. In addition, any old trade orders previously in the permanent order book that did not have a sufficiently high max fee bid to be included in the synthesized order book are also removed from the permanent order book. In both cases, the remaining fee reserve balance is returned to the accounts that originated the trade orders.

After each block has been processed, in at least one embodiment, an evaluation may be made as to the aggregate values of trade orders settled, added to and removed from the permanent order book, and remaining in the permanent order book, compared to the aggregate values of trade orders remaining in the permanent order book when the previous block was complete. By comparing these values, which should balance, the trading activities on the blockchain can be further confirmed as valid.

Record Inspection within Smart Contracts

The actual programming instructions for the logic and operation of smart contracts in at least one embodiment of the present invention execute within a virtual machine similar in kind to the Ethereum Virtual Machine, which was first introduced as a feature of the Ethereum blockchain. Such smart contact programming instructions are implemented using a Turing-complete virtual machine bytecode language similar in kind to Ethereum Virtual Machine bytecode. CPUs, processors, computers, or clustered computers resident within (or constituting) the nodes of the blockchain network instantiate this virtual machine and execute this virtual machine bytecode—which may be stored in computer memory or in any external memory devices or computer databases, including the blockchain—as part of the block-creation, block-verification and blockchain-segment-verification process in accordance with at least one embodiment.

In at least one embodiment, the virtual machine will accept a stack-based bytecode language, which consists of opcodes that work to instruct the virtual machine to read and write data onto a last-in-first-out stack, and to perform calculations and other operations by reading input from the top of the stack and writing output to the top of the stack. Opcodes within the bytecode map to particular operations, which may also write data to memory addresses separate and apart from the stack. Smart contract bytecode may comprise repeatable machine instructions that manipulate and update data resident within the smart contract, as well as data that is accessible globally on the blockchain.

In at least one embodiment, the present invention may implement a new bytecode virtual machine language, or utilize (or extend) an existing virtual machine bytecode language—such as the Ethereum virtual machine bytecode language—in order to incorporate certain new instructions or operations. In at least one embodiment, each instruction or operation would be mapped with a quantity of "gas" tokens that would be consumed when the operation is executed within a smart contract.

These instructions or operations may provide programmatic access to blockchain records and data, including the data of the global state, in order to examine and manipulate this data, and integrate it into the logic of the smart contract.

These instructions may also effectuate the creation of specialized data records that may be added to the same block within which the bytecode is invoked or otherwise executed. These data records would update the global state of the blockchain system via whatever data-sharing and consensus process is used by that blockchain network.

For example, bytecode instructions or operations could add to the blockchain such records as genesis records, transfer records, proposition declaration and decision records, trade order records, settlement records, pattern matching records, and transaction records as defined herein, or any other records.

In addition, in at least one embodiment, the bytecode virtual machine language instructions could also include logic and operations used to inspect data records and accounts that had previously been added to the blockchain, or used to inspect the blockchain system's global state. Such operations would permit such data to be retrieved, filtered, inspected, iterated over, collated, compared, combined, and manipulated within a smart contract that had been implemented using the bytecode language.

The bytecode instructions or operations could permit genesis records, transfer records, proposition declaration and decision records, trade order records, settlement records, pattern matching records, and transaction records to be retrieved, filtered, inspected, iterated over, collated, compared, combined, and manipulated within a smart contract.

For example:

(1) At least one embodiment would incorporate operations that permit the history of genesis records, transfer records, trade records and settlement records that together contribute to a specific token balance on an account to be retrieved. These records would be accessible and manipulatable via other language operations, permitting a program to inspect the source of tokens held by an account.

(2) At least one embodiment would incorporate operations that permit these historical genesis, transfer, trade and settlement records to be collated with the accounts originating the records (i.e. the accounts that originally signed the records and contributed the transferred tokens).

(3) At least one embodiment would incorporate operations that would permit proposition declaration records asserting facts in relation to specific accounts to also be retrieved and made accessible to the smart contract at runtime. For example, given a specified account address, and given some aspect of proposition declaration records by which to filter the records being retrieved, conforming proposition declaration records would be retrieved and written to the smart contract's runtime memory, available for manipulation by other bytecode instructions. Related proposition decision records could also be made available to the smart contract for analysis, which proposition decision records would also be filtered according to constraints specified by the smart contract.

In accordance with at least one embodiment, each proposition record may include amongst its fields a proposition statement, which would be expressed in a structured manner—such as JSON or WL, or as an in-memory list, struct or map—that lends itself to being indexed and queried. The proposition statement field of the proposition record would be inspectable, traversable, and subject to manipulation (but not modification) inside the logic of a smart contract subroutine. The proposition statement, if referencing an account, would establish an indexed reference or link between the proposition record and that account. The proposition statement would also be indexable and queryable with regards to its other contents.

(4) In at least one embodiment, shortcut operations that bring all this data into the runtime memory of the smart contract at once, without requiring separate data-retrieval operations for each data record type, would also be implemented.

At least one embodiment could include a history retrieval operation which would work to access the complete provenance of certain user tokens held by an account. Such an operation would retrieve all contributing transaction records, all originating accounts, and some portion of related proposition records, which proposition records would be filtered by some specific qualities of those records.

Utilizing this facility, a smart contract may be implemented to select and retrieve only those proposition records asserting a particular fact. This way, proposition records identifying the nature of the accounts that had contributed in some way to a particular account balance could be retrieved and inspected, enabling the smart contract to execute logic conditional upon that provenance data.

(5) At least one embodiment would incorporate operations that would permit the smart contract to iterate over, inspect and otherwise manipulate the data added to memory by the above-mentioned operations.

In accordance with at least one embodiment of the present invention, the Record Inspection functionality described above would be incorporated into a new high-level Turing-complete programming language—or would extend an existing high-level Turing-complete programming language such as Solidity—in order to specify high-level programming elements, including syntactic and semantic constructs, keywords, function calls, logic pathways, or natural language elements, that would be compiled down into the bytecode described above.

In at least one embodiment, the Record Inspection functionality described above could be incorporated into a new high-level programming language the elements of which are consistent with or resemble formal language used in natural-language writing (ex. common within the legal profession). This high-level language may provide sensible syntax for the creation of data records such as genesis records, transfer records, proposition declaration and decision records, trade order records, settlement records, pattern matching records, and transaction records as defined herein. It would also provide proper syntax for retrieving, filtering, inspecting, iterating over, collating, comparing, combining and manipulating those records.

Analogues within these high-level languages would exist for the implementation and operations of the bytecode language described above. A compiler would be used to translate these high-level language elements instructions into such bytecode or executable code, which would be executable within the blockchain's virtual machine, which would operate on the physical CPUs, processors or computers, MPUs or clustered computers resident within or constituting the nodes of the blockchain network.

Use Case 1: Event-Driven Contract Execution

The various record types discussed above and other features, in at least one embodiment of the present invention may be utilized in a number of systems and methods. One such system and method can utilize a combination of features of at least one embodiment for the implementation and automation of certain legal processes that are driven by real-world events.

For instance, it can be used to automate the functioning of a life insurance policy or a will, which both comprise documents that include or represent legal processes that are triggered by the death of an individual (the real-world event). Each of these processes can be implemented in an automated fashion using a combination of propositions, pattern linkage records, smart contracts and trade orders on the blockchain in accordance with at least one embodiment.

(1) A proposition record ("morbidity proposition") is added to the blockchain, asserting that a certain person is deceased. The decision block is defined to be three months in the future, and the closing block one week following the decision block. This proposition permits neutral third parties to offer support to the factual conclusion to be reached concurrent with the closing block. It also serves as a global expression of state that can be referenced and used in the logic of unrelated smart contracts.

In at least one alternative embodiment, the "morbidity proposition" may be added only in the event of the decedent's passing, and may be configured as a self-determined proposition record, issued by a single entity that is trusted by all parties to make such a determination (for instance, a government body). In such a case, because no decision records would be added in support of the proposition, the trustworthiness of the entity that issues the proposition, would determine whether such a proposition would be sufficient to trigger contract execution in this case.

(2) "Resolution" smart contracts may be defined and linked to the morbidity proposition via pattern linkage records. The pattern linkage records may contain pattern definitions that match against state transitions of the morbidity proposition.

(a) A "renewal" resolution contract could be invoked in the event that the proposition is resolved to be false (i.e., in the case that it is established that the person has not yet passed). This renewal contract would renew the proposition.

(b) One or more "execution" resolution contracts would be invoked in the event that the proposition is resolved to be true (i.e., in the case that it is established that the person has indeed passed away). This execution contract could contain specific process logic (for example, the execution of a life insurance smart contract, or a will smart contract), or it could act as a registrar of other subordinate smart contracts (a "registrar" contract) to be executed all at once in the event that the proposition is resolved to be true, via delegation from the registrar.

(c) A "registrar" contract could allow one "will" contract to be supplanted by an amended "will" contract, for instance, without requiring the modification of any pattern linkage records, because a "registrar" contract will store reference to its subordinate smart contracts, which reference may be replaced through operation of the "registrar" contract itself.

(3) Pattern linkage records could be used to link these "resolution" smart contracts to the closing of a proposition. Pattern definitions match to event patterns expressed in a formal syntax: so, the pattern of the mortality proposition resolving to true would cause "execution" contracts to be invoked, and the pattern of the morbidity proposition resolving to false would cause the "renewal" contract to be invoked.

(4) The process logic required to be executed in the event of death would be embodied in resolution smart contracts.

Life Insurance Contract

A life insurance contract would distribute a benefit to a set of beneficiaries, each represented as an account or address within the blockchain, drawing from some pool of tokens.

(a) Beneficiaries could be named or modified via a programmatic function invocation executed from an authorized account using proper account credentials (specifically, by signing the invocation instruction with the account's private key).

(b) The benefit could be defined as a token value of a particular token type. The contract's own account (i.e. the account controlled by the contract itself) would need to have access to sufficient value to be able to fulfill its commitment in the event of death.

(c) A single smart contract may combine obligations with regards to multiple insured individuals, and may therefore draw from a single shared value pool when making payments.

(d) Premiums may be paid to the insurance smart contract directly, thus contributing to the value pool available for benefit payment.

(e) Profit may be calculated algorithmically as a function of the size of the value pool and the total insured amount. Profit may be assigned to some third-party account (conceivably the author of the contract), or it may be distributed proportionally to the policy holders as a refund, or may be held in reserve and finally distributed to all beneficiaries after all benefits have been distributed first.

(f) Other routines may also be implemented as logic within the smart contract.

A "Will" Smart Contract

A "will" smart contract would distribute tokens to inheritors upon the death of an account's owner (the testator).

(a) This contract would distribute tokens that are held within the contract's own account. Only tokens stored in the same contract account would be distributable by the contract, so if tokens are held in different accounts, then different "will" contracts would be required. Each such contract may better be considered, therefore, as "payable upon death" instructions for the account to which it is attached, but with the possibility of complex logic.

(b) In the event that inheritors or allocations need to be changed, the "will" smart contract may provide some provision for modification via subroutines within the smart contract. Authorized parties (i.e. authorized accounts or addresses) may invoke such subroutines in order to modify allocations and inheritors; alternately, if a "will" smart contract is implemented as a "registrar", then the subordinate smart contract or smart contract it delegates token distribution responsibility to may be replaced.

(c) Estate tax obligations may be automated by having the contract add a trade order to the blockchain, which trade order would convert some portion of tokens to the token type required to be used to pay the tax. The proceeds of that trade would be directed to a separate smart contract that would forward all proceeds to an account maintained by the relevant government authority for that purpose.

Incentive Dynamics within Proposition Determination

In the above examples of possible implementations of the present invention, there would be some incentive for the various parties to influence the resolution of the proposition.

Inheritors may wish to cause the will to be executed before the testator has deceased, and might attempt to overwhelm the morbidity proposition by adding decision records in favor of the outcome they favor. Conversely, co-participants in a pooled life insurance smart contract may wish to prevent payout to a decedent's beneficiaries, to increase the size of the rebate that may accrue to themselves. They may attempt to overwhelm the proposition by adding decision records against the decedent actually being deceased.

Overriding and competing incentives within the proposition system would ensure that fraudulent outcomes are prevented, as discussed below.

(a) Every decision record must risk native tokens in order to support a particular outcome. In the event that the resolution of the proposition goes against a decision record, the entirety of its value is lost to the originator of that decision record.

(b) As described herein, decision records and proposition records may incorporate evidence, or reference to some external evidence, as to the truth that they are asserting, providing participants within the proposition determination process the opportunity to assess such evidence to make independent determinations as to the validity of the proposition.

In the specific case of a "morbidity proposition", in at least one embodiment, a decision record documenting the insured's death could conceivably contain a digital death certificate cryptographically signed by a government authority, plus cryptographically signed affidavits from high-reputation individuals (for instance, attorneys), and possibly even photographic and video evidence via reference to IPFS or some other distributed publicly-accessible storage.

(c) The internal mechanics of the proposition system incentivize unsubstantiated or verifiably false claims to be rapidly refuted by contradictory decision records—and similarly incentivize high-value decision records in alignment with objective reality to be contributed early, before erroneous decision records are even contributed.

The principle under which this mechanism operates is as follows: within a radically decentralized system, participants only have the ability to coordinate their choices and actions by reference to objective reality. Any participant who sees a proposition leaning towards a resolution that contradicts objective reality is likely to rush to contribute contradictory decision records in order to reap the benefit of the value assigned to those erroneous decision records. She will do so because she believes that uncoordinated third parties will simultaneously do the same, both reinforcing her claim and competing with her to lay claim to the tokens at risk.

In at least one embodiment of this process, the initial decision record may have a low token value—or only as high a value as may be incentivized by the proposition's own reward. Similarly, follow-on decision records that hope to claim a portion of the proposition's remaining reward by reinforcing the original decision record may themselves be of relatively low value, as they would only be incentivized by a fraction the proposition's own reward.

Initially, this low-value threshold may seem to be a poor disincentive against erroneous decision records being added to overwhelm a particular proposition. However, every decision record that contradicts the initial decision record (and its evidence) increases the incentive for decision records to be added in support of the initial decision record. Any tokens assigned to high-value decision records that contradict reliable evidence will attract decision records voting in favor of that evidence—and stand a good chance of being lost to those records. Conversely, tokens assigned to decision records that support the evidence will likely not be lost, because an assumption can be made that there will be more tokens placed at risk in support of reliable evidence than against it.

Every participant of the proposition determination process, both in this use case and in general, in accordance with at least one embodiment, must make an assessment as to whether or not the token value they risk will be returned or lost, based on the likelihood that the outcome of the proposition will be in their favor or not—in other words, whether or not the aggregate value assigned to their side of the question will be higher than the aggregate value assigned to the other side when the proposition is resolved. On average, if there are a large enough number of participants, the probability should be higher that any given proposition will be resolved to coincide with objective reality, rather than the opposite—which should incentivize a growing number of decision records to snowball in favor of the "objectively real" outcome once the objective reality is verifiably known.

Notwithstanding the above, from time-to-time, entities that provide reliable assessments of digital evidence—trusted participants in the process that vote decision records according to their assessment of the evidence—may disagree with the proposition outcome as determined via majority vote. Some system users may prefer to rely on determinations made by those entities, rather than rely on the decentralized determination process. In accordance with at least one embodiment, the author of a resolution smart contract may choose to include in that contract an inspection of the proposition's decision records, and cause the contract to disregard the majority-vote-determined outcome, if one or more trusted participants are found to have voted against the consensus. Or, in at least one other embodiment, a pattern linkage record may link a resolution contract not with a pattern matching the closure of a proposition, but instead with a pattern matching the addition of a decision record generated by one or more specific trusted participants.

Alternately, in at least one embodiment, a proposition record may specify a requirement that some or all decision records relating to the proposition only be submitted by certain specific trusted accounts, thereby enabling the person or entity that creates a proposition record to restrict the ability of untrusted entities to participate in and potentially undermine the proposition determination process.

In the most extreme case where trust in individual parties is higher than trust in the collective, self-determined proposition records may be used in lieu of the whole proposition determination process. Such proposition records are issued by a single entity that is trusted by relevant parties to make a determination on its own without external confirmation. Because no decision records would be added in support of the proposition, and because the proposition is closed and decided at the moment it is added to the blockchain, the trustworthiness of the entity that issues the proposition would determine whether such a proposition would be accepted as truth, and by what participants. Because there is no external verification, self-determined propositions are generally most useful to coordinate action among trusted parties.

Use Case 2: Identity Confirmation

The various record types discussed above and other features in at least one embodiment of the present invention may be utilized in a number of systems and methods that require confirmation of an entity or person's identity.

Specifically, aspects of an account owner's real-world identity may be made available on the blockchain via a proposition record that attaches to that object. Such a proposition record would be assessed and evaluated by one or more identity "verifiers", who act to affirm or reject the contents of the proposition record by generating decision records.

By using a standard data format within proposition statements, proposition determination outcomes may be used to establish complex facts that other elements of the blockchain system may consume. Complex functionality may then be built upon that layer of abstraction. For instance, the proposition determination process may be used to confirm the identity of a particular account owner, or to confirm the relationship between two account owners, and to then use that information to direct contract behavior.

In at least one embodiment, a proposition record ("identity proposition") may be added to the blockchain, asserting that a particular account is linked to a particular real-world identity. The structured identification information that comprises the identity proposition's proposition statement may be encoded in a standard format (for instance, JSON format) so it is easier to consume via a smart contract or wallet.

This proposition statement may contain certain fields representing not only name, but potentially other identifying data such as "birth date" and "address of residence". Data in such fields would be available for consumption and manipulation by smart contracts, as well as by wallets and other nodes on the network. However, under certain circumstances this information may need to be hidden because it is sensitive or confidential, potentially defeating the purpose of having the data be manipulated by a smart contract or other program.

In at least one embodiment, proposition statement data that needs to be hidden may be hashed using a cryptographic hashing algorithm, allowing the information to be widely distributed while at the same time preventing it from being read in the clear. Hashed data may nonetheless be used to guide computational logic, however, if the data it is being compared to is hashed using the same hash algorithm. In this manner, the proposition statement of an identity proposition may contain some data points in clear text, such as "country" or "legal jurisdiction" (which are not fine-grained and can be used in the open to guide logic), and might also contain some data points that are hashed, such as "name", "street address", or "email address" (which are only used to confirm details that are already known).

Optionally, in at least one embodiment, the identity proposition record may include evidence of the truth of the proposition, in the form of "self-sovereign identity" records (as per W3C specifications), references to independent third-party data sources, image data representing physical documents, or other relevant data that may be used by verifiers or other potential participants in the proposition determination process. This supporting evidence and documentation would be included in the proposition record separate and apart from the proposition statement.

In at least one embodiment, an account user may encrypt some or all of the supporting evidence and documentation which is attached to or referenced by the identity proposition, so that it is only accessible to trusted verifiers. Such supporting evidence and documentation would be encrypted using the public keys of these trusted verifiers, who would then decrypt those details privately without their being disclosed publicly. Alternately, account users may transmit supporting evidence and documentation directly to verifiers via direct out-of-band communication that does not involve the blockchain; or they may share the information publicly.

If a verifier involved in evaluating an identity proposition is sufficiently trusted, either having a large enough following that is able to automatically add supporting decision records, or being trusted without the involvement of supporting participants as described below, then an identity proposition that has been confirmed publicly on-chain can be trusted even without supporting documentation needing to be made public.

Identity Proposition Determination

In accordance with at least one embodiment, in conformance with the proposition confirmation procedure described elsewhere herein, an identity proposition may be verified through the following procedure.

(1) Among the participants voting on the proposition via decision records would be individuals or businesses who act conventionally as "verifiers", who through reputation are trusted by other participants in the network.

Outside of the blockchain network, these verifiers would use real-world information and processes to evaluate a proposition and its supporting evidence, in order to make an assessment as to the validity of the proposition. Depending on the conclusions and level of certainty reached with regards to the proposition—again, evaluated independently and separately from the blockchain network—verifiers may choose to generate a decision record against or in favor of the proposition.

Proposition rewards incentivize verifiers to evaluate identity propositions and generate decision records. These incentives are enhanced if a proposition record specifies that only certain verifiers may submit determination records (thereby increasing the probability that the reward will be earned). However, in certain circumstances, these incentives may be insufficient.

In at least one embodiment, a supplemental reward system may be implemented whereby a pattern linkage record is used to convey additional value to one or more specific verifiers. Under this scenario, a user with an interest in the resolution of a particular proposition may allocate tokens to a smart contract, which in turn would transfer those tokens to a particular validator upon execution. This smart contract would be linked to a pattern definition that corresponds to decision records yet-to-be-issued by trusted verifiers in favor of the proposition in question. In at least one embodiment, the pattern linkage record would have an expiration date or block height, after which the value allocation expires and is returned to the original account.

With this supplemental reward approach—implemented with standard pattern linkage records and smart contracts—trusted verifiers may be incentivized to participate in the process without themselves having to place tokens at risk. Without this supplemental reward, verifiers take a risk, however small, that the tokens they assign to decision records will be lost if enough tokens are assigned to opposing decision records. Because the reward associated with a proposition is proportional to tokens placed at risk, trusted verifiers may otherwise have to place substantial tokens at risk in order to access the reward, in addition to needing to do the real-world work of verification. Although not required, a guaranteed supplemental reward would counteract these disincentives.

(2) Other participants in the network ("supporting participants") may monitor the activity of these trusted verifiers. Upon detecting the creation of a proposition record by an account known to be associated with a trusted verifier, these supporting participants may generate additional decision records voting in the same direction.

Among these supporting participants, some may actively monitor blockchain activity via an outside mechanism or process, while others may instead create pattern linkage records that match the decision records of these trusted verifier accounts. These pattern definitions would be linked to contracts programmed to automatically generate additional decision records, which contracts would be invoked following the creation of a decision record by any of the specified verifier accounts.

In at least one embodiment, certain supporting participants may only wish to create supporting decision records if more than one trusted verifier has already verified the identity proposition. The simple fact that a pattern definition had matched would, on its own, be an insufficient indicator as to whether a linked contract should generate supporting decision records. In this case, a linked smart contract would programmatically examine all of the decision records added to the proposition—via the proposition query/retrieval/traversal API—in order to determine whether or not other trusted verifiers had already voted in favor of the proposition. Only in that case would the smart contract add supporting decision records.

Supporting participants are motivated by the prospect of receiving some portion of the proposition decision reward that is reserved for supporting participants (i.e., the value $r_{D+N}-f(r_{D+N})$ as described herein regarding the proposition determination process). Supporting participants face the risk of losing their tokens if other participants commit a greater number of tokens in favor of the idea that the trusted verifier is wrong. Due to their trust in the verifier, however, supporting participants believe that this risk is comparatively small in relation to the expected value of their reward.

Participants who see a benefit by voting in opposition to a particular verifier may also set up mechanisms, processes or pattern-linked smart contracts to automatically add decision records that vote in the opposite direction as the verifier.

(3) In the end, any verifier that commands a following of supporting participants able to overwhelm the opposition should be considered "trusted" by the network. These verifiers perform an essential service by syncing real-world knowledge to the chain and allowing this information to be used by other blockchain network participants to guide the course of automated contracts (and to invoke pattern-linked contracts upon the conclusion of the proposition determination process). In the case of identity propositions, the conclusion of the determination process can be used by participants in the blockchain network to assist in guiding any number of processes and decisions.

Note, however, that supporting participants are optional, and primarily serve to reinforce the decision made by the verifier. If no supporting participants contribute decision records, or if the original proposition record is configured to exclude supporting participants (by specifying that only trusted verifiers may contribute decision records), the identity verification procedure would proceed without them. Ultimately, it is up to the users of the blockchain system to determine what information added to the blockchain is useful, and how to use it. Self-decided proposition records, and proposition records that are decided by only one trusted verifier might be sufficient for some users; other users may prefer the added security provided by supporting participants' "crowd wisdom".

Accessing Identity Records Via API

If a proposition record's core assertion is represented as structured data, a blockchain implementation may choose to make that data available to executable smart contracts and to records added to the blockchain. In at least one embodiment, propositions may be retrieved through a standard query language or API available within the smart contract language of the blockchain implementation, so that conditionals inspecting proposition state may guide automatic activity within the smart contract virtual machine.

(1) A life insurance contract may depend on the beneficiary being related to the insured in some way. In at least one embodiment, a life insurance smart contract may query the proposition records for a proposition that asserts certain facts that pertain to that particular beneficiary account. If a confirmed proposition is found that reflects the required assertion (specifically, that the beneficiary account holder is related to the insured) without somehow otherwise being invalid (for instance, being expired or contradicted by another proposition), then the smart contract can continue in its execution.

(2) A particular asset sale or transfer may depend on one or more parties having their identities explicitly confirmed, for instance to satisfy "know your customer" requirements. In at least one embodiment, an on-chain executable smart contract may be set up to mediate this occurrence, only allowing the sale or transfer to proceed if the participating account or accounts are linked to identifiable individuals matching certain criteria, such as age or nationality. Such a contract may be implemented in a generalized way, so as to function as a reusable mediator for these types of transactions, or it may be implemented as a custom single-use implementation for onetime utilization.

(3) Certain high-risk banking transactions may be mediated in this fashion. In at least one embodiment, prior to permitting on-chain currency-denominated tokens to be exchanged for cash, a bank may require that such tokens satisfy the requirements of a contract that verifies the provenance of those tokens. This contract would retrieve and manipulate data pertaining to the history of accounts that may have contributed in the past to the value of tokens being exchanged, and then retrieve identity propositions pertaining to those accounts. Only if a sufficient proportion of those identities are able to satisfy certain requirements would the contract permit the transaction to proceed.

Identity Sharing Process

From time to time, an account holder may wish to share their identity with another account holder privately, without sharing those details with the entire blockchain. However, the account holder receiving this information may not trust this information coming directly from the first account holder, and may wish to receive independent confirmation that the identity information is accurate. In at least one embodiment of the present invention, the following process and method serves to satisfy both requirements:

(1) The first account holder generates an identity proposition that declares some information publicly (government jurisdiction), hashes other information (name, street address, telephone number, etc.), and provides reference to supporting evidence (photo of the government ID together with the blockchain account number, full unhashed identity data) by pointing to an encrypted package uploaded to IPFS or another cloud storage system.

(2) The first account holder authorizes only a single trusted verifier to submit decision records, encrypts the supporting evidence with the public key of that verifier, and adds an incentive fee to entice that verifier to review the proposition.

(3) The trusted verifier reads the identity proposition, and then retrieves the supporting evidence from IPFS and decrypts it. The verifier then hashes the unhashed identity data taken from the supporting evidence, and compares that hash to the hash found in the identity proposition. Finally, the verifier reviews the rest of the supporting evidence (government ID), compares it to the identity data, and compares it to any government or public databases it has available in order to evaluate the veracity of the identity data.

(4) If the trusted verifier believes the identity data to be accurate, it adds a decision record to the blockchain in the affirmative. Otherwise, it adds a negative decision record. If the trusted verifier is able to affirm the identity proposition, then the process can move forward.

(5) The first account holder's wallet constructs a message that contains the account information and all identity information, in the clear. The first account holder then shares this message with a second account holder. This message may be in binary format, encoded as a URL, encoded as a QR code, or encoded in any other manner, and the message may be shared via a network socket connection, via an SMS or email message, via a wireless radio transmission, or via an image captured with a camera.

(6) The second account holder, in receipt of this message, will then use her wallet to decode it. Her wallet retrieves the account details from the blockchain, including the confirmed identity proposition. Because the second account holder trusts the same verifier that the first account holder used to verify his identity, the second account holder is able to compare the message shared by the first account holder with the information on the blockchain.

(7) The second account holder hashes the identity information that the first account holder had shared in his message, and compares this information to the identity proposition data retrieved from the blockchain. If the two hashes match, the second account holder knows that the message shared by the first account holder contains the same information that was verified by the trusted verifier.

If the second account holder in this case requires further confirmation of the first account holder's identity, or if the second account holder needs more information about the first account holder, for instance in order to perform "know your customer" due diligence, the second account holder can request that information directly from the trusted verifier. In at least one embodiment, the first account holder may include with the message he sends to the second account holder a cryptographically-signed instruction authorizing the trusted verifier to share supporting evidence and other information with the second account holder. If the second account holder shares this with the trusted verifier, the trusted verifier will share the evidence directly with the second account holder, unencrypted and out-of-band, separate and apart from the blockchain.

Use Case 3: Asset Title and Tracking

The various record types discussed above, and other features, in at least one embodiment of the present invention, may be utilized in a number of systems and methods that record, track and mediate ownership of assets.

Title to an asset may be encoded as a token on a blockchain and may be tracked and transferred via blockchain operations and smart contracts. However, a blockchain alone does not provide sufficient infrastructure and functionality to allow for the implementation of a comprehensive asset title and tracking system.

A blockchain does solve two key problems: first, it removes dependency on a centralized system, allowing for information and tracking to be distributed among many participants; second, it ensures that all records, including transfer records, are immutable and potentially permanent, reducing or eliminating the possibility of data loss, record destruction, or disputes arising from questions regarding the legitimacy of key documentation. That being said, even when using a prototypical blockchain to implement a tracking system, other problems still persist that must be solved through processes and practices that typically require trust in off-chain institutions and off-chain centralized computer systems.

Those persistent challenges include: how to recognize a given token or smart contract as having real-world authority to record or memorialize a given asset; how to link possession of a token or smart contract representing an asset to real-world ownership rights; how to properly mediate the transfer of ownership of an asset within a complex transaction that may involve multiple steps, including "fiat" currency payments; how to account for and represent the ownership history or provenance of an asset that predates the recording of that asset on-chain (for instance, title history). These challenges are mitigated or solved by the functionalities introduced by the invention.

Real-world asset tracking using blockchains most likely dates back to the introduction of the concept of a "colored coin". Various specific and mutually-exclusive approaches have been proposed with regards to colored coins, and the concept has been implemented in different ways on the Bitcoin blockchain as well as other blockchains, most notably the Omni Layer protocol. These approaches are distinct from the concept of the "user token type" of the present invention in important ways, although all relate to token issuance on the blockchain. With the introduction of the Solidity language (used by Ethereum and other blockchains), yet another distinct approach to asset tracking was introduced; most notable is the ERC-20 protocol and its decedents and derivatives.

The present invention, in at least one embodiment, differs from both approaches in several notable ways:

(1) Smart contracts implemented using the Solidity language (such as ERC-20 contracts) are able to store token and ownership information as key/value data that is retained by the contract. An individual contract must be written in such a way as to encapsulate the creation and management of an asset/token within the boundaries of the contract and its specific implementation.

A drawback of this approach is that all operations on that asset/token are implemented within the encapsulating smart contract's own code. Any individual holding such tokens must rely on the correctness of the correct implementation, and the competence of its creator, to ensure that the tokens tracked by that contract function properly and are indeed secure. Significant funds have been lost due to the faulty or defective implementation of such smart contracts. Furthermore, 11 asset/token ownership assignments must be tracked within the data of the contract, so any asset with a very large number of owners runs the risk of overwhelming the computational resources that may be allocated to a single contract. Similarly, because the operations are all implemented in Solidity—which is executed through interpreted bytecode, is limited as to efficient data structures available, and is unlikely to be well-optimized—these operations are slower than if the same operations were implemented as integral functionality of the block-building node.

Most significantly, it is expensive, and difficult, for assets tracked within smart contracts to be properly validated. Some validation may not even be possible—for instance, validation pertaining to regulatory compliance.

By integrating asset creation, transfer and tracking into primitives of the blockchain itself, those operations are validated as part of block validation during block creation and acceptance processes.

(2) Colored coins have been largely supplanted by Solidity-based tokens. Implementations such as Omni Layer are still used for certain applications, however, and it is worthwhile to note the limitations and features that distinguish colored coins from the "user tokens" described in accordance with at least one embodiment of the present invention.

Colored coin implementations like Omni Layer rely on the ability of custom wallet implementations to add custom metadata to blockchain transfers, and to trace the ownership of custom "token" values created and transferred via that transfer metadata. Typically, a record is created that transfers a de minimis value of coin and simultaneously adds some unique metadata to that transfer record or transaction. Coin values already on the blockchain are somehow flagged as representing particular assets; alternately, the metadata stores all data relevant to the token, including token values, and the native coins on the blockchain are disregarded.

Colored coins rely on the fact that a blockchain's entire history is available for inspection. In order to determine whether a particular "coin" is associated with a particular asset, all transfer records contributing to the balance of coins at that address must be tracked back to the original "coloring" step. This tracking and tracing is performed by custom wallet software, and happens outside of the validation process performed by block-building nodes.

This approach has a number drawbacks, most notably that it relies entirely on wallet implementations. The meaning of the metadata, the tracing of the history of a coin, and the overall management of the scheme is implemented within a client, or "wallet" that is connecting to the blockchain, and is not resident within the blockchain itself.

The practical effect of this is that all participants must use the same client software. Furthermore, any bugs in the client (or hacks) can have the effect of undermining the integrity of the scheme. There is nothing preventing two competing coin-coloring systems from using the same metadata to encode the same or different assets. This is especially problematic if one such competing system has fraudulent intentions, and is able to take advantage of this confusion for nefarious purposes. There is nothing on-chain preventing colored coins from being transferred to an address that contains non-colored coins, or coins that were intended to represent distinct assets. Nor is there any way to prevent corrupted metadata that interferes with the operation of compliant client software from being propagated across the network.

None of these issues exist when tokens are moved out of metadata and into the actual blockchain data managed by block-building nodes. Wallets having divergent implementations may continue to accrete conflicting data to the blockchain. Block-building nodes with divergent implementations, however, fork the blockchain, such that any malicious actor or defective system naturally isolates itself without interfering with the operation of the blockchain more broadly. Invalid data, by definition, cannot ever be incorporated into the blockchain.

(3) In at least one embodiment of the present invention, "user tokens" are not a layer added on top of other functionality (i.e. token tracing in the case of "colored coins" and contract data in the case of assets implemented using Solidity). Instead, user tokens are a first-class primitives within the blockchain.

It is not mandatory to include a token-type field with every record, but not including the field implies that the token type is "native", which is a token type represented by the empty string (all token types are represented by a distinct character string). So, even when absent, the concept of "token type" exists across the entire system.

As opposed to Solidity contracts, the invention's user tokens and user token types are not contract data, but are integral account data that are accounted for and managed by the operation of the block-building node. Depending on the embodiment, either each account will have a token type, or accounts will hold values for multiple tokens; but this will be information integral to the account. Tokens will be passible from account to account, and any account or contract may hold any token type.

The determination as to status and correctness for any user token value is made and verified by operation of the native blockchain, as it is validated and revalidated by all block-building nodes across the network. As opposed to "colored coins", a "user token" under this invention is not dependent upon metadata that is tracked and verified by external factors; instead, it is verified as part of the integral operation of the blockchain itself. As opposed to Solidity tokens, user tokens here are not constrained by the limitations of the contract that encapsulates it.

In combination with block-level verification performed by the nodes (which ensures global compliance), restrictions on the re-use of particular label strings for tokens minimizes or eliminates the possibility that tokens with confusing or competing names will be added to the blockchain, reducing the risk of fraud.

(4) In at least one embodiment, by introducing the concept of a "derived token", the present invention implements a means by which (a) controlling authorities (i.e. human organizations) can make a real-world determination as to what assets may be listed under what names on the blockchain, and prevent misleading or fraudulent assets from being listed by performing a gatekeeping function; (b) such controlling authorities can delegate that gatekeeping function to subordinate, subsidiary, or third-party organizations for some sub-set of their authority, via a "chain of authority" emanating from the root account; and (c) there exists a clear linkage between on-chain records and activities and controlling authorities' legal authority embodied by to bind those records and activities to real-world assets.

(5) In at least one embodiment, by introducing the concept of a "proposition record" and a "decision record", the present system and method introduces a process by which real-world information—including the history/provenance of a real-world asset—may be linked to an asset token in a trusted and verifiable way, and in a way whereby the information may be consumed by smart-contract code.

(6) In at least one embodiment, by introducing on-chain trade order records and settlement records, the present system and method permits the interfacing, combination and interchangeability of different asset tokens—including asset tokens that are not designed or intended to interface at all—without the individuals responsible for their issuance needing to collaborate in any way.

Examples of Specific Asset-Backed Token Types

The following is a specific example of how the tools and features of the invention, in at least one embodiment, can be used to manage a specific class of real-world assets, in this case real property (although not all steps, elements and features are required in every embodiment).

(1) A state or regional government, governing authority or association would issue some user tokens to itself, or would be issued tokens by a separate authorized entity, thereby obtaining the authority to define asset classes within its jurisdiction. These tokens wouldn't have any independent value, but would provide a basis of authority for the issuance of derived tokens representing real-world assets.

The "new issuance" setting would be set to "home", allowing derived tokens to be declared. The "supply" setting would be set to "unlimited", allowing an unbounded maximum value to be issued for the token type. Imagining that the state government is New Jersey, USA, a string of "US-NJ" could be used as a label for the token, for instance. All tokens issued having a string representation beginning "US-NJ" would be identifiable as being issued under the authority of the New Jersey state government. The blockchain account to which "US-NJ" tokens have been issued— and the organization in possession of the private key that controls it—would be empowered to create such tokens.

(2) The state government may delegate to individual municipalities the ability to issue their own tokens.

In this case "new issuance" setting would be set to "home", allowing derived token types to be issued by the municipality account. The "supply" setting would be set to "original issuer", limiting the total number of tokens that the municipality may issue, including the total number of new token subtypes, unless the number of tokens is incremented by the state or regional government. If the municipality is Paterson, N.J., then the string representation for the municipality's tokens may be "US-NJ.Pa\terson". If the intention of the token delegation is to enable the municipality to issue asset tokens in support of real estate lots, and if the municipality is permitted by the state to issue up to 200 tokens, then the token value issued will equal 200. If that number needs to be augmented in the future, the account controlled by the state may issue more tokens to the account controlled by the municipality ("new issuance" being set to "original issuer").

The municipality may then issue tokens representing indivisible lots that may be owned by individual legal entities. For instance, a token type may be issued under the label "US-NJ.Patterson.Lot-100" representing the property at "Lot 100" within the city. Such a token would be issued with "new issuance" set to "original issuer" and "supply" also set to "original issuer", with a token value of 1 being transferred at creation, which together mean that the recipient of the token would not be able to issue any derived tokens.

Alternately, the municipality may choose to delegate to a condominium developer the ability to issue tokens representing individual units in a building built upon a particular lot. In this case, the token would be issued with "new issuance" set to "home", "supply" set to "original issuer", and with a token value equal to the expected number of units. A token issued by the condominium developer may have a name such as "US-NJ.Patterson.Lot-100.Unit-1A"

Each delegation step described above is carried out through the creation of a transfer record on-chain, transferring authority and control from the source account holding the base token to the destination account receiving the derived token. As such, each transfer record requires the cryptographic signature of the source account at each step. This chain of cryptographic signatures establishes a verifiable trust-chain linking the holder of an asset representing Unit-1A to the State of New jersey.

Due to the trust-chain represented by this chain of cryptographically-signed genesis records, it may be sufficient for blockchain participants to simply rely on the delegation path leading to the creation of such an asset token in order to trust its real-world applicability. In other words, for a participant to trust that a token of type "US-NJ.Patterson.Lot-100.Unit-1A" actually represents ownership of a particular unit in a particular building in Patterson, N.J., it may be sufficient for that participant to know that "US-NJ" tokens are issued under the authority of the State of New Jersey, and that all tokens are authorized tokens. This is especially true for those embodiments of the present invention that enforce restrictions on token labels, such that the label of a base token type must be a substring conforming to the beginning portion of the derived token type's label. However, should these elements prove to be insufficient to establish trust, "proposition" and "decision" records being added to the blockchain may resolve any issues.

A proposition record may be created that asserts that the token "US-NJ" is actually issued by the State of New Jersey. Metadata incorporated into the original genesis record for "US-NJ" may include some evidence supporting this fact, and off-chain real-world records could evidence this relationship. However, a proposition record making such an assertion, referencing such evidence, and a successful proposition determination in favor of that assertion, along with well-known trusted verifiers voting in support, would increase the trustworthiness of the association.

In at least one embodiment, a proposition record may be created asserting that the asset backing a particular token is free and clear of all leans and is otherwise clean as of the issuance date of that token. Trusted verifiers voting in favor of such a proposition might be entities capable of performing a lean search within the applicable jurisdiction, for instance title insurance companies paid by asset owners to insure the title when the token is issued. Such a proposition record would attach to the token type, and would include a proposition statement that the underlying asset has a "verified title". This would augment the state of the token type, which augmented state may be retrieved inside a smart contract via the proposition query/retrieval API.

Other features of the invention would enable the transfer of assets on-chain without external mediation or documentation being required. Trade order records and settlement records, for example, may be used to create an open trading market for assets associated with asset tokens.

In at least one embodiment, self-executing contingent sales contracts could be implemented using smart contracts. For instance, asset-backed tokens may be temporarily held within an "escrow" smart contract, awaiting loan funds; when loan funds are transferred into the smart contract, this would satisfy the contingency, potentially completing the transfer of ownership automatically by transferring the loan funds to the seller and the asset-backed tokens to the buyer. In at least one other embodiment, a pattern linkage record may link a pattern matching the sale or transfer of one asset token (which might represent certain real property, for instance) with a subroutine within an "escrow" smart contract to indicating that a "property sale" contingency has been met.

Self-executing auctions may be implemented in using smart contracts in at least one other embodiment. An "auction" smart contract may hold an asset pending the completion of the auction, and mediate the handling of bids and payment funds. While the auction is open, bids in the form of currency-backed tokens may be forwarded to the contract, which would keep track of the number of bid tokens contributed by each participating account. When the auction is finalized, the winning bid tokens would be forwarded to the original asset token owner's account, the asset token would be forwarded to the winning bidder's originating account, and the loosing bidder's bids would be returned to their accounts.

The fact that user tokens are not implemented within contracts in some embodiments, but are instead simple data primitives that may be associated with any account or contract on-chain, means that new and novel smart contracts may be created for special purposes, and assets may be submitted to such smart contracts on an ad-hoc basis as per need. The asset tokens are not "smart assets" because they do not carry implementation with them; instead, they may be passed between smart contracts that each performs different function(s) and operation(s) on those tokens.

Use Case 4: Currency-Backed Asset Tokens, Foreign Exchange Trading and Remittances In another embodiment, the present system and method may be utilized for currency-backed asset tokens, foreign exchange trading and financial remittances.

In at least one embodiment of the present invention, currency-backed asset tokens may be created by trusted institutions issuing "user tokens". Two methods that such trusted institutions may follow to do so are described below: an "open" method, and an "authorized" method. (Note, however, that not all steps, elements and features may be required in every embodiment.)

Open Method for Issuing Currency-Backed Tokens

Suppose that two banks exist that wish to participate in the blockchain by issuing currency-backed asset tokens: Bank A and Bank B. Both banks operate in a country named Freedonia, and both banks use Freedonian Pounds (FRP) as their primary currency.

In accordance with at least one embodiment of the present invention, Bank A and Bank B each directly issue their own currency-backed tokens, FRP BankA and FRP_BankB, respectively. There would not be any explicit limitations to the number of such tokens that banks might issue.

Bank A adds a trade order to the blockchain offering FRP BankA in exchange for FRP_BankB on a one-to-one basis, or a near-one-to-one basis (say, one-to-0.999). Likewise, Bank B adds a trade order to the blockchain offering FRP_BankB in exchange for FRP_BankA on a one-to-one basis, or a near-one-to-one basis. This permits FRP_BankB and FRP_BankA to be interchangeable for most blockchain operations. These trade orders do not match to each other or settle automatically because they would be prohibited from doing so by some mechanism—potentially because there would be a small spread between these offers (making the trade orders incapable of matching), or because they would both be marked as "resting", or because the token's authorization contract would return false, or because of a blacklist specified with the trade order, or some other mechanism depending on the specific implementation or embodiment.

Bank A and Bank B would also add smart contracts to the blockchain, each implementing a "redeem" sub-routine that exchanges FRP_BankB for FRP_BankA on a one-to-one basis, and vice-versa. For instance, the "redeem" sub-routine of Bank A's smart contract would accept some quantity of FRP_BankA and return the same quantity of FRP_BankB from the balance held by the contract. In at least one embodiment, this sub-routine would only accept redemptions from Bank A's correspondents (i.e. Bank B), and vice versa.

Both Bank A and Bank B would be expected to offer real-world currency off-chain in exchange for issued tokens being transferred back to their accounts. Because of the reciprocal trade orders listed above, each Bank may "cash-out" the tokens of the other, and tokens of each bank may be used interchangeably in commercial settings.

Other organizations or individuals are also able to also issue tokens with labels containing the "FRP" prefix. For instance, a business cooperative named Coop A could combine its resources to issue FRP_CoopA tokens, and could also distribute them via transfer records (in exchange for real-world goods and/or services or hard currency) or via trade orders (offering FRP_CoopA tokens in exchange for FRP_BankB or FRP_BankA tokens). If Coop A is able to maintain its own reserve of FRP_BankB or FRP_BankA tokens, locking a portion of those tokens in trade orders offering to trade such tokens in exchange for FRP_CoopA tokens, then, FRP_CoopA tokens can effectively be used interchangeably for FRP_BankA and FRP_BankB.

At the completion of this process, a set of FRP-backed tokens ("token network") would be in circulation, capable of acting as a stand-in for the Freedonian Pounds in all blockchain activities.

The benefit of the above approach is that it can emerge organically from the voluntary self-association of independent participants. By extending credit to each other via reciprocal trade orders and redemption sub-routines, participating entities substantiate their assessment as to the riskiness of their counter-parties; risky issuers will have trouble seeing their tokens accepted in exchange for other tokens, or will face de facto limits to how many tokens they may issue, and can be cut-off entirely from the system if their riskiness is too great. So, new issuers can join voluntarily on an ad hoc basis, but must effectively be sponsored by other participants, and risky issuers can see their participation limited or terminated if they loose counter-party support.

That being said, the above approach does have limitations; primarily in that it may not easily conform to the regulatory requirements operating in some jurisdictions. In addition, there are areas of risk found in the above approach that may result in lost assets or other problems for participants, such as follows.

(1) As described above, the supervising authority or self-regulatory body overseeing these banks and/or managing Freedonian monetary policy is not participating in the blockchain, so there is no umbrella FRP token. As a result, the market for FRP-based tokens under this scheme is conceivably at greater risk of institutional failure than a more regulated approach.

If any entity issuing FRP tokens is unable to redeem its tokens for real-world assets (as in a bank run), tokens issued by that entity may become worthless. Correspondents would have to act quickly to terminate trades and eliminate redemption contracts or their tokens would be affected.

Even in the case that an issuer's participation is limited by correspondents to a fraction of the overall value issued, unredeemed tokens held by correspondents may undermine their financial health. The value of all tokens of the class may potentially be decoupled from the value of the underlying currency, if they are perceived to be more risky than other currency equivalents.

A systemic risk represented by these circumstances is that the value of all tokens of the class may be decoupled from the underlying currency, having ripple effects throughout the blockchain.

(2) Because there are no technical restrictions placed on what entities may participate in the FRP token network, it is conceivable that poorly qualified entities may join. Participation in the token network is not wide-open—participants choose their correspondents, and correspondents of ill-repute can be rejected or eliminated from the network if there is a consensus to do so among the participants. However, an issuer will not have any ability to directly influence the risk that another issuer represents to the network if the two issuers are not direct correspondents. Participants are not only accepting the risk represented by their direct correspondents and counterparties, but also the risk represented by their counterparties' counterparties.

(3) Because no entity has a claim to the base "FRP" string that is used as a prefix in the labels for these tokens, it is possible for tokens that are have not been accepted into the token network to use labels that are be misleading. For instance, if Company A is not accepted as credit-worthy by other issuers and is not able to form correspondent relationships, it may still issue its own token FRP_CompanyA. This may be misleading to users.

Trade order records can use wild-card characters to match with a broad class of tokens, not just single token types. For instance, FRP_CoopA may be offered in exchange for "FRP*", representing all token types that are prefixed by the "FRP" string. This reduces the number of trade order records that must be listed. However, without being able to trust that the issuance of tokens using the "FRP" prefix is somehow controlled, use of the wildcard in this instance would be impossible.

(4) Under the described scenario, other regulatory and governmental requirements may not be met or easily enforced, such as KYC, AML, and bank secrecy requirements, or well-defined safety and soundness requirements, without voluntary compliance by token issuers. For instance, can high-volume or high-value users of tokens (i.e. high-risk users) be identified? Are tokens being issued with sufficient hard assets being held by the issuer? Following the "open" method of issuing currency-backed tokens, few regulatory controls are imposed via the blockchain itself. Organizations that are unsanctioned by regulatory authorities could issue tokens that may appear to ordinary users to be sound, but are not.

Authorized Method for Issuing Currency-Backed Tokens

Certain specific features of the invention may mitigate or eliminate these risks and concerns.

Assume the existence a different country, Ruritania, the currency of which is called the Crown (abbreviated RUC). In contrast with Freedonia, the Ruritanian Central Bank ("RCB") plays an active role in not just supervising the blockchain activities of participating entities, but also by exerting direct control over token issuance using features of the invention such as "derived" token types in combination with smart contracts and trade order records. In another jurisdiction, a similar role might be played by different sort of government entity, by a non-governmental organization, by an industry association or self-regulatory body, or by a private corporation.

(1) RCB declares and defines a new token type, with the label "RUC", in a genesis record having "supply" set to "unlimited" and "new issuance" set to "home". The home account address of the genesis record is a smart contract written by RCB to control and manage the issuance of RUC-backed tokens. [why this smart contract?]

(2) This executable smart contract, of the type that may be implemented in a language like Solidity, implements key operations pertaining to RUC tokens.

(a) A contract sub-routine named "create" (or similar), callable only from another account controlled by RCB and verified within the contract implementation:

This sub-routine is responsible for declaring and assigning value to token types derived from RCB. The token type label would be passed in as an argument to the sub-routine, along with the token value (meaning, the quantity of tokens to be issued) and the home account to which the new tokens would be issued.

The "create" subroutine would add a genesis record to the blockchain with the specified token type label, value, and home account, with issuance set to "home" and supply to "original issuer" or "fixed". This genesis record would also designate an authorization subroutine that would enforce certain KYC or other compliance constraints on use of the token, for instance by prohibiting the transfer of tokens to accounts that have not had their identity confirmed via a proposition, or by specifying an account blacklist.

The "create" subroutine would also add a trade order record offering RUC tokens in exchange for the new derived currency type, whatever it may be, with the contract itself being the destination account for the trade order record. The value of the trade order would equal the total value declared for the new token type. The home account of the new token is preserved as contract data, stored along with the new token's label, so that it can be used by other sub-routines to validate the account that is invoking the sub-routine. Because RUC was created with "supply" set to "unlimited", the smart contract is able to issue as many new tokens and token types as it may require.

(b) A contract subroutine named "redeem" (or similar) that will allow the destination account of a derived token type (and only that account) to turn in any RUC* token in exchange for the account's derived token:

Through the use of this subroutine, derived tokens that are accumulated by the RCB via trade orders can be distributed back to the issuer. It is possible that derived tokens returned by the "redeem" subroutine would not be returned on a one-to-one basis in exchange for RUC* tokens. RCB can, for instance, apply an effective interest rate and return more or fewer tokens depending on the duration of time the tokens are held by the contract. The ratio of how many derived tokens would be returned in exchange for RUC* tokens would be determined by RCB based on its policy objectives: a negative interest rate would incentivize quicker redemption, increasing the supply of tokens in circulation, whereas a positive interest rate would slow redemption, decreasing the global supply of tokens.

(c) A pair of subroutines (named "accept" and "issue", or similar) that allow certain authorized accounts (i.e. accounts that have been issued custom user tokens—banks) to obtain RUC tokens directly in exchange for hard currency, or to receive hard currency in exchange for RUC:

These subroutines would allow a bank or other entity to issue or release more RUC tokens than the total value of their individual derived tokens.

(3) The RCB declares and defines a two new token types, RCB.BankA and RCB.BankB, corresponding to two banks operating under its supervision, Bank A and Bank B, respectively. These token types would be created and issued via the contract's "create" subroutine, and in each case would have as home account a smart contract defined and controlled by the recipient bank. (Token types may also be declared or defined for another type of organization, not just banks; for instance, credit unions, broker-dealers, and other corporate entities may also receive this authorization.)

A total token value V would also be issued for bank. This value V would represent the limit of a bank's authority to lend or issue credit via the issuance of tokens (whether to itself or to other parties) and would most likely be backed on a fractional basis by some separate off-chain deposit provided to the RCB. If the same token type is issued by the bank in exchange for currency deposits, then the value V would also constrain the amount of deposits that may be issued by the bank. Another token, however, could alternately be issued in exchange for deposits, for example a second derived token specifically issued to the bank, or RUC tokens lent or otherwise provided by RCB for the purpose of accepting deposits.

By regulatory requirement, these banks would be required to redeem any RUC* token presented by consumers, businesses or other banks in exchange for cash or equivalent.

By issuing different derived token types to each bank, the systemic risk represented by a given issuer is immediately identifiable: it is the value of their token type in circulation.

If a given bank is at risk of being intervened, the RCB can attempt to isolate this risk by blocking conversion of the derived token into the base token via trade orders. Alternately, it could alter the authorization subroutine so that it blocks trades, potentially by adding the token label to a blacklist maintained by that contract. If RCB decides to halt trading of a particular derived token type (by terminating or not renewing trade order records or blocking trades via the authorization subroutine), then anyone holding those tokens will no longer be able to transact business with those tokens. There would be no way to use the RCB* token of such a bank to make a payment. And RCB can then manage an orderly wind-down including potential deposit-insurance payments to individuals still holding the affected RCB* token holders.

(4) The banks' own smart contracts (which would be the same or similar for all banks) would encapsulate certain operations required to control the usage of RUC* tokens. For instance, the contract managed by Bank A would contain the following functionality.

A smart contract subroutine named "redeem", open to all or nearly all accounts, would permit accounts to receive RUC in exchange for RUC.BankA tokens on a one-to-one basis.

In at least one embodiment, an inspection of token provenance by this subroutine may limit which accounts invoke it successfully, given that the usage and contribution history of the tokens would be traceable up to some minimum requirement. (For instance, if the RUC passed through the account of a known bad actor recorded in a list within the smart contract, then the redemption would be blocked).

A contract subroutine named "withdraw", callable only from a single, separate Bank A controlled account, would permit Bank A to replenish its holdings of RUC.BankA by withdrawing them from the RCB via the "redeem" subroutine implemented by RCB on its contract, in exchange for RUC or RUC* tokens held by the bank.

A contract subroutine named "deposit", callable only from a single, separate Bank A controlled account, would permit Bank A to deposit its holdings of RUC.BankA (and potentially other RUC* tokens) with RCB via the "accept" sub-routine of the RCB's smart contract.

A contract subroutine named "issue" would permit Bank A to move RUC.BankA tokens to another account—for instance, in exchange for an off-chain deposit of cash, or to fund a loan.

A contract subroutine named "accept" would permit Bank A to receive RUC.BankA tokens (or possibly any RUC* tokens)—for instance as re-payment for a loan, or in exchange for a cash withdrawal.

In at least one embodiment, an inspection of token provenance within the smart contract may restrict the number of transfers made by tokens, or the types of accounts contributing to the token balance (for instance, whether or not the owner of the account had been verified). Token provenance would be accessible via elements of the Turing-complete language used to implement the smart contract. The contract would be able to traverse the graph of records and accounts contributing to the source account's balance, and also inspect proposition and decision records related to these accounts.

Payments Mechanism

The mechanism by which these records and smart contracts would enable payments and commerce, in at least one embodiment of the present invention, is as follows:

(1) A bank, wishing to issue currency-backed tokens, would solicit from a central authority, the RCB in this case, the authority to issue tokens derived from the RUC token issued by the RCB. The number of tokens issued to the bank would depend, in part, on reserve deposits that the bank makes with the RCB. In this case, the RCB would invoke the "create" subroutine of its smart contract in order to authorize Bank A to issue RUC.BankA tokens.

(2) A consumer would exchange cash (either physical cash or cash in a bank account) for an equivalent number of tokens issued by a bank. For instance, the consumer might exchange 10 physical RUC for 10 RUC.BankA tokens. Bank A invokes the "issue" subroutine on its smart contract, in favor of the consumer's blockchain account.

(3) A merchant may offer a widget for sale at a price of 10 RUC. Because the merchant wishes to accept tokens for payment, the merchant sets the price of the widget equal to 10 RUC tokens.

(4) The consumer would purchase this widget by transferring 10 RUC.BankA tokens to the merchant with a destination token type of RUC. When the transfer is processed, an automatic trade is settled such that the 10 RUC.BankA tokens are converted to 10 RUC tokens, which are added to the merchant's blockchain account. The 10 RUC.BankA tokens are added to the blockchain account of the RCB.

(5) The merchant may spend these RUC tokens for additional purchases, or the merchant may deposit the amount into a bank account. Because she banks at Bank B, the merchant transfers the tokens to Bank B in an invocation of the "accept" subroutine of the bank's smart contract. The bank then credits the merchant's bank account.

(5) The bank may then invoke the "withdraw" subroutine on its own smart contract, which results in the smart contract sending the 10 RUC tokens to the "redeem" subroutine on the RCB smart contract. The RCB then returns to the bank an equivalent number of RUC.BankB tokens. Alternately, especially in the case that the RCB does not have any RUC.BankB tokens in its possession, the bank may send the 10 RUC tokens to the "accept" subroutine on the RCB smart contract, which would in turn increase the number of tokens that the bank is authorized by RCB to issue.

(6) Alternately, in the event that Bank B does not redeem its RUC tokens in exchange for RUC.BankB tokens at a quick enough pace, the RCB may send its RUC.BankB tokens to the "redeem" subroutine on the bank's smart contract. If the bank is unable to redeem these tokens, this would may trigger a more detailed review of the bank by the RCB.

In at least one additional embodiment, each bank would generate reciprocal trade order records offering to exchange the tokens they themselves issued in exchange for RUC. In this instance, for example, Bank A would generate a trade order offering RUC.BankA tokens in exchange for RUC tokens, on a one-to-one or near-one-to-one basis, and Bank B would generate a trade order offering RUC.BankB tokens in exchange for RUC tokens, on a one-to-one or near-one-to-one basis. Under this scenario, the merchant may price her widget in terms of her preferred bank's own token type, in this instance RUC.BankB, rather than in RUC. A payment from a customer holding RUC.BankA tokens to a merchant requesting RUC.BankB tokens would be accomplished through a chain of trade order records linked to the transfer record using a settlement record, in the method described elsewhere herein.

Additional Compliance Controls

Further compliance controls may be implemented by providing analysis tools to bank employees and other individuals managing interactions with customers that use these blockchain products. For instance, the same API that is available to smart contracts in order to explore account history, chains of transfers, token provenance, and proposition and decision records would be available to wallets and other client GUI applications built to interact with the blockchain. Compliance personnel at a bank or other organization would be given a tool to explore this history.

Additionally, identity documents provided to whatever trusted verifiers confirmed an account's identity via the proposition determination process could be made available to bank personnel so as to confirm the identity of a person seeking to redeem or obtain tokens, or perform some other activity requiring identity confirmation.

What is known to a smart contract on the chain is the outcome of the public determination consensus, and exactly which trusted verifiers may have contributed decision records to the blockchain. A token type's authorization subroutine (or other restrictive subroutine) can be implemented so as to require a proposition determination process to find in favor of an identity proposition, and/or that certain trusted verifiers contributed decision records in favor. It will not, however, have access to confidential proof materials.

Any action that requires off-chain activity—for instance any attempt to redeem or obtain tokens for hard currency—can incorporate human review that interfaces with the blockchain data to retrieve account details (proposition history associated with the account, token history). Bank customer can provide name, address via state-issued-id, and that can be confirmed as part of proposition by hashing physical id info and comparing to the proposition.

If deep-dive is required to review the original proof documentation used to confirm identity, out-of-band communication between the bank and the verifier (subject to NDA and other commercial terms) can have the verifier reveal un-encrypted data to the bank via an encrypted or otherwise secure network connection. Trusted verifiers would be able to respond to data requests from multiple banks—subject to contract terms agreed to both by the banks and by bank customers—and would help make identity of individuals portable across multiple institutions.

This approach would decouple some aspect of the KYC process from a particular institution, and would permit important compliance information to be shared between institutions that are linked together by the same customer or the same transaction. A similar process could be performed to share source-of-funds information between institutions.

International Remittances

Given the existence of currency-backed tokens as described above, individuals would be enabled to send money internationally. An individual remitter in Ruritania, for example, could send money to an individual beneficiary in Freedonia, effectively without intermediaries.

In at least one embodiment, a method of the present invention to facilitate international remittances may implement the following steps, elements and features (although not all steps, elements and features are required in every embodiment). In this description, and throughout this section, the example of Ruritanian and Fredonian currencies, banks, and persons are used for illustrative purposes only; the process described would be the same if these elements were replaced.

(1) As a prerequisite, an active market must be established for the exchange of FRP and RUC tokens on-chain using trade order records and settlement records. Token buyers and sellers would conceivably be pursuing such exchanges in support of trade between the countries.

(2) The Ruritanian remitter would purchase RUC tokens in the amount she wants to send. Payment may be in physical cash or through bank transfer, and it may be purchased at a bank, from a licensed remittance company, from a currency exchange, from an individual, or through some other entity. Tokens purchased are transferred to an account controlled by the remitter.

In certain regulated environments, the remitter would only be permitted to purchase tokens from a legally authorized dealer, and would have to provide documentation to satisfy KYC and Bank Secrecy requirements. Proposition records and decision records may be required in order to definitively establish identity on-chain.

(3) The remitter enquires from their Freedonian beneficiary as to the beneficiary's account address. If the beneficiary doesn't yet have an account, the beneficiary must create one.

(4) Remitter adds a trade order record to the blockchain offering the value of her purchased RUC tokens in exchange for a particular number/fraction of tokens denominated in FRP tokens (beneficiary currency).

Due to Freedonia's laissez-faire approach, fraudulent FRP tokens may be introduced to the blockchain at any time, making the use of the wildcard "*" for matching impossible (this is mentioned above). The remitter would have to pick only one of the FRP tokens in the token network (say, FRP_BankA) to name in the trade order. If there are no matching trades for that particular token, however, the block-building node may combine a third or fourth trade order in order to traverse the token "graph" and settle the trade.

The ratio of remitter-currency-denominated tokens to beneficiary-currency-denominated tokens represented by this trade order record would need to resemble the ratio of other similar transactions if it is to be matched and settled—in other words, the offered price would need to be competitive for the block-building-node to be incentivized to incorporate the order. It would be the responsibility of the remitter or the remitter's software (for instance, a wallet mobile app) to ensure that the ratio on offer is advantageous for block-building nodes to incentivize them to find a match.

The settlement/destination account included in the trade order record (and subsequently the settlement record, perhaps) would be the beneficiary's account.

(5) Alternately, instead of generating such a trade order, the remitter may make a transfer directly to the beneficiary without creating any trade order record. The remitter would generate a transfer record with the destination account set to be the beneficiary's account and the destination currency set to be the beneficiary currency.

In this event, if the remitter does not specify a destination token value, the block-building node would determine the specific number of beneficiary-currency-denominated tokens the beneficiary would receive based on the best-priced trade order available, under some constraint imposed by the block-building and verification algorithm. If the remitter does specify a destination token value, the transfer would be matched with an appropriately-priced transfer order from the order book, or it would not be completed.

(6) If the beneficiary desires to convert the beneficiary-currency-denominated tokens to actual hard currency, the beneficiary would sell those tokens for hard currency, either at a bank branch, or at some other location. For instance, the beneficiary could redeem the token at the institution that originally issued the token.

Before redeeming tokens in exchange for currency, the issuing institution could inspect the provenance of the tokens being redeemed, in order to confirm that they do not have a suspicious source, and that they did not pass through any accounts that are known bad actors. This ability to inspect is a unique benefit of blockchains, due to the fact that every node has access to the blockchain's full transaction history.

The invention augments this ability by putting more activity on-chain (trades) and by the addition of proposition and decision records, which put verified and verifiable metadata about an account or transaction also on the chain.

Facilitating Licensed Remittance Company Operations

The above describes the process by which an individual remitter from the country of Ruritania is able to send money to an individual beneficiary in the country of Freedonia. It works because both individuals are able to obtain blockchain accounts. However, if an individual is not able to obtain and maintain a blockchain account (perhaps due to security concerns, or access to technology), the individuals sending and receiving money can work through standard licensed-remittance-company processes that are enhanced through the use of blockchain tokens enabled by the invention. Specifically, these currency-backed tokens improve the settlement process taking place behind the scene.

In at least one embodiment, a method of the present invention to facilitate the settlement operations of licensed remittance companies may implement the following steps, elements and features (although not all steps, elements and features are required in every embodiment). In this description, again, the example of Ruritanian and Fredonian currencies, banks, and persons are used for illustrative purposes only; the process described would be the same if these elements were replaced.

(1) The Ruritanian remitter visits the physical or online location of a licensed remittance company (LRC) with the intention to send money. The individual remitter fills out an electronic or physical form detailing sender and beneficiary information and remittance amount, and submits that form to the LRC. The beneficiary again is an individual residing in Freedonia, receiving Freedonian Pounds.

(2) The LRC, via some program or sub-routine inspects the state of trade order records and settlement records matching ROC* and FRP* tokens in order to determine a likely exchange rate. Via some other program or sub-routine, the LRC examines recent blockchain history to determine the token fees currently being charged in order to calculate the likely token cost of creating necessary records on the blockchain. By some algorithm, the LRC marks up the exchange rate (to prevent losses and lock-in some profit) and quotes a fee and exchange rate to transmit ROC to the beneficiary, payable as FRP.

(3) The individual remitter tenders to the LRC the requisite amount in hard currency, along with whatever identification information and documentation that LRC determines will be necessary (for instance, government id). The LRC, already in possession of ROC* tokens, creates an order record to exchange ROC* tokens for FRP* tokens, seeking to acquire as many FRP* tokens as need to pay the individual beneficiary identified by the remitter. This is to ensure they lock in profit and exchange rate.

(4) The LRC would already be in possession of ROC* tokens because it either (a) would have purchased those tokens in exchange for hard currency; or (b) would have received some derived ROC* tokens from a bank (like ROC.BankA tokens) in the form of a loan.

(5) The LRC generates a unique claim number that the remitter would provide to their Freedonian beneficiary.

(6) The LRC would have a prior arrangement with either or both of Freedonian Bank A or Freedonian Bank B, according to which the bank would be obligated to redeem the beneficiary's unique claim number and pay remittance funds in cash to the individual beneficiary after confirming beneficiary identity. The individual beneficiary would visit Freedonian Bank A or Bank B and present the claim number and identifying information. The bank would look up the claim number in a networked database system maintained by LRC, to confirm the amount and the identity of the recipient. After paying the beneficiary the remittance amount in cash (FRP), the bank will register the remittance as paid in the LRC database, simultaneously making a reimbursement claim.

(7) LRC would then forward the amount of FRP currency owed to the bank in FRP* tokens via the blockchain.

(8) LRC would use cash collected from remitter to purchase more ROC* tokens, replenishing its supply.

If the LRC is operating through third-party agents rather than operating its own locations or via online, it may require its agents acquire and hold a certain number of ROC* tokens themselves.

Immediately upon generating a remittance transaction, the agent would be required by the LRC to forward ROC* tokens as reimbursement. If tokens are not sent to the LRC, the agent's ability to generate remittance transactions would be limited.

If it were not to require that the agent forward tokens immediately upon creation of a remittance transaction, the LRC would then have to extend the agent credit. The LRC would risk the agent not depositing or otherwise not forwarding the currency owed to LRC by the agent.

Having the agent use ROC* tokens to reimburse LRC creates an opportunity for the agent to receive credit from unrelated third-parties, or to use remitter cash to acquire tokens from third-party sources. For instance, an agent that is operating an ATM could load cash into the machine, and receive ROC* tokens as reimbursement from the ATM network whenever withdrawals are made. Or, an agent that cashes checks could receive ROC* tokens as reimbursement for checks submitted electronically to the bank or other clearing entity.

Use Case 5: Securities Compliance

Securities regulators have broad authority and power to register, regulate and oversee the issuance, sale, marketing, transfer and clearing of securities within their various jurisdictions. Depending on the jurisdiction within which they operate, the requirements enforced by various regulators differ. In addition, within a specific jurisdiction, requirements may differ for different types of securities, or different quantities of securities, or for securities that are issued to or held by different types of investors or different numbers of investors.

Blockchains and distributed-ledger systems have been used to issue tokens that resemble securities or that may be characterized as securities under securities law in certain circumstances. However, due to an inability within those systems to provide the fine-grain controls required to ensure compliance with securities laws and regulations, these tokens have fallen under increasing regulatory scrutiny. In addition, given the global, Internet-wide nature of blockchains and other distributed-ledger systems, it has proven difficult for token issuers to ensure that jurisdictional boundaries are respected.

In at least one embodiment, the present invention solves a number of regulatory challenges faced by blockchains and other distributed ledger systems when it comes to the issuance, sale, transfer and trading of tokens that resemble or may be characterized as securities, or may otherwise fall under a regulatory scheme that asserts comprehensive control over the issuance, sale, transfer, assignment, use or trading of such tokens. The following steps, elements and features comprise a method of the present invention by which to facilitate the compliant issuance of security tokens on a blockchain (although not all steps, elements and features are required in every embodiment).

(1) In order to ensure that the proper rules are applied to the operation of any token issued via a distributed-ledger system where the token may potentially be characterized as a security, in at least one embodiment, the jurisdiction of participating accounts may be established through the use of proposition and determination records.

A user wanting to hold such tokens would establish their jurisdiction (or the jurisdiction of their account) by issuing a proposition record that asserts that their account is held in a specific jurisdiction. This proposition record may be comprised of an entire identity proposition (as described in the identity verification use case specified herein), or it could simply be targeted to the question of jurisdiction.

The procedure described as part of the identity verification use case would be followed to determine the veracity of the proposition record. Smart contract subroutines may thereafter inspect the proposition record in order to determine whether or not a jurisdiction has been determined for a particular account.

In at least one embodiment, the authorization subroutine specified for a token may be written so as to stop or prevent the transfer, assignment or trading of a token in the event that a recipient or beneficiary account is not verified as belonging to jurisdictions authorized to hold the token. Similarly, the authorization subroutine may enforce different rules and restrictions pertaining to token transfer, assignment or trading depending on which jurisdictions the accounts participating in the transaction belong to.

Alternately, in at least one embodiment, the same restrictions may be implemented using authorization filters in lieu of authorization subroutines, at least in part. Such filters would describe patterns that would only match accounts that have been confirmed to belong to certain jurisdiction, or that do not belong to certain jurisdictions. Only accounts having a jurisdiction-affirming proposition statement attached would not be matched by the filter, and would thereby be permitted to hold the tokens in question.

(2) In certain jurisdictions, the rules regarding the issuance, sale, transfer, assignment or trading of securities are relaxed in the case that the number of individuals holding a security is limited. In at least one embodiment, a token qualifying as a security could take advantage of such a relaxed standard if the number of individuals holding a security were capped via the authorization subroutine implemented for that token. The authorization subroutine specified for that token would perform a query against blockchain data to determine the number of accounts that currently hold a positive value for that token.

Alternately, the authorization subroutine would act to retrieve the data of all identity-asserting proposition records referencing the accounts that currently hold a positive value for that token. This identity information would then be analyzed to determine the number of individual holders of that token, where the holders would be counted as per the rules laid out for the jurisdiction in question.

The authorization subroutine specified for the token would then block or disallow the creation of any records that may cause the number of individuals or the number of accounts holding the token to exceed the minimum number permitted by the jurisdictions within which the token is permitted to be held. The authorization subroutine would thereby ensure that the token never exceeds the operational boundaries that permit the token to be evaluated by regulatory authorities under a relaxed standard.

In at least one embodiment, authorization filters may implement these restrictions in lieu of authorization subroutines. Such authorization filters would provide a means to filter by the count or number of accounts that hold tokens of a particular type, and would provide a means to filter by whether or not a particular account already held those tokens. The transfer of tokens would be permitted only if the number of account holders were less than a certain threshold, or if the receiving account already held the tokens.

(3) In certain jurisdictions, less restrictive rules are imposed on the issuance, transfer, assignment or trading of securities that are held by persons having some minimum annual income or financial net worth, or who are otherwise able to demonstrate or assert some minimum level of financial sophistication or acumen. These individuals or entities are often termed "accredited investors". Provided that the assignment, transfer or trading of a token could be restricted to accounts held only by such "accredited investors", then that token, even if characterized as a security, may be subject to these less restrictive rules.

In accordance with at least one embodiment, any account wishing to acquire or trade in such tokens would generate a proposition record (including a reward) asserting that such account is held by accredited investors. Some qualified entity or group of entities ("accreditation verifiers"), upon becoming aware of the proposition record, assess whether such an account is held by one or more accredited investors. The accreditation verifiers thus serve a similar purpose as identity verifiers do in the identity verification process.

Incentivized by the reward, accreditation verifiers add determination records to the distributed ledger. Additional determination records may be added as well by other participants, resulting in the proposition being confirmed or denied. Rewards are thus allocated as per the proposition reward distribution procedure.

In accordance with at least one embodiment, if an account is determined to be held by accredited investors—meaning, if the account is linked to a proposition successfully asserting that the account is held by accredited investors—it is deemed an "accredited account". If no proposition exists successfully asserting that the account is held by accredited investors, then it is deemed a "non-accredited account."

A restriction on the assignment, transfer or trading of a token can be enforced by implementing that restriction within the authorization subroutine of the token, so that the token will only be permitted to be held by accredited accounts. The authorization subroutine would have reference to the data record (or, in the case of a transaction record, the set of records bound to that transaction) that it is intended to authorize or reject, and would therefore have reference to the token type, the source account, the recipient account, and the token value specified by that record, as well as other relevant data.

The subroutine performs a query against block chain data to retrieve any proposition and determination records related to the recipient account(s) specified in the data records. The authorization subroutine then blocks or disallows the creation of any new records that result in a non-accredited account (meaning, any account that is not linked to any proposition successfully asserting that the account is an accredited account) holding the token in question.

For instance, before a transfer record, a trade order record, a settlement record or a transaction record may be accepted as valid, if the user token being transferred or traded is restricted by an authorization subroutine, then that authorization subroutine is used to authorize the record before it can be added to the blockchain/ledger. The subroutine uses the opportunity to determine whether or not the recipient account(s) specified in the transfer record(s), trade order record(s), or settlement record(s) are accredited accounts. If it is determined that they are not, the subroutine would disallow the inclusion of those records.

Alternately, in at least one embodiment, the same restriction may be implemented using authorization filters in lieu of an authorization subroutine. Such filters would describe patterns that would only match accounts to which an accreditation proposition statement has been attached. Any accounts that do not have the accreditation proposition statement attached would not be matched by the filter, and would be rejected.

Automating the Issuance of Restricted Tokens

In at least one embodiment, a smart contract may be constructed that automatically issues new tokens of the above restricted types—restricted by jurisdiction, or by number or by type of account holder, or by other qualification—taking advantage of the "authorized token" issuance process detailed above.

This smart contract would be the "home account" for a token type that represents the whole of this particular family of tokens. The genesis record that originates this token type would have its "new issuance" field set to "home", permitting the smart contract to issue subordinate derived tokens. The genesis record would also have its "supply" field set to "unlimited", meaning that this smart contract would be permitted to automatically issue as many new tokens as may be required.

The smart contract would implement a subroutine named "authorize" (or similar), which subroutine would act as the authorization subroutine for any user tokens created by the smart contract. This subroutine in its arguments would be passed the proposed record (or, in the case of a transaction, set of records) that it is intended to authorize or reject, and would therefore have reference to the token type, the source account, the recipient account, the token value specified by the record, and other relevant data.

As described above, this authorization subroutine would retrieve and inspect distributed ledger data records to determine the number of persons or type of persons that would hold the token if the proposed record or set of records were added to the blockchain (or other qualifying data), and based on the nature of that data would block or disallow the creation of any records that may exceed the constraints imposed by the jurisdictions within which the token is permitted to be held. For instance, the subroutine may disallow the inclusion of transfer, trade order, settlement or transaction records if following their inclusion the token would be held by non-accredited individuals, or too many individuals, or individuals in the wrong jurisdiction, etc., depending on the restriction being imposed.

In at least one embodiment, the smart contract would also implement a subroutine named "issue" (or similar), which sub-routine would accept as arguments a label, value (i.e. count), fractionality, and a character string representing a jurisdiction or a list of character strings representing multiple jurisdictions (such strings could be ISO 3166 country codes, for example). Upon first being invoked, this subroutine would generate and add to the ledger a new genesis record, with the following features:

"Label" as specified within the arguments
"Value" as specified within the arguments
"Fractional" as specified within the arguments
"Supply" set to "original issuer"
"New issuance" set to "original issuer"
"Authorization Subroutine" set to the "authorize" subroutine implemented by the same smart contract.
"Home Account" to whatever account (or smart contract) has invoked the subroutine (i.e. the account that signed the invocation instruction with its public key). As a result, the new tokens, upon creation, will be added to the account (or smart contract) that has invoked the subroutine.

Alternately, in at least one embodiment, in addition to or in lieu of the authorization subroutine specified as part of the genesis record, the "issue" subroutine would add authorization filters to the genesis record. These authorization filters, for example, may define patterns that filter out and exclude, for example, records that send tokens to accounts that do not have a compliant jurisdiction proposition statement attached, or to accounts that do not have a compliant accreditation proposition statement attached, or to accounts that do not already hold tokens of the same type when too many accounts already hold tokens of the same type.

In at least one embodiment, when it is first invoked, the "issue" subroutine would record the account that invoked the subroutine (i.e. the account that signed the invocation instruction with its public key), which account would be used to initialize a list of accounts permitted to expand the issuance of the token type in question (by issuing additional tokens) and to destroy tokens (by removing them from circulation); this authorized accounts list would be maintained internally by the smart contract itself within its private data.

The "issue" subroutine, upon second invocation for a given token, would expand the issuance of the token type in question by issuing additional tokens. It would do so via a genesis record that assigns those tokens to the same account that is invoking the subroutine, but only if that account is included in the list of accounts permitted to affect the quantity outstanding of the token in question (i.e. the supply of that token). Alternately, if the smart contract is holding a balance of the token (for instance, due to a quantity of the token having previously been destroyed), it may issue some portion of the tokens via a transfer transaction from its own account.

Similarly, the smart contract would implement a subroutine named "destroy" (or similar), which would reduce the issuance of the token type in question by removing from circulation the tokens paid into the subroutine. It would do so by assigning those tokens to its own account. But it would only do so if the account that is invoking the subroutine is included in the list of accounts permitted to affect the quantity outstanding of the token.

The smart contract would also implement a subroutine named "update_accounts" (or similar), which subroutine would update the list of accounts permitted to issue additional tokens or to destroy tokens.

A variation of this smart contract, in at least one embodiment, would implement a restrictive "authorize" subroutine and an "issue" subroutine as described above, but would not manage the creation or destruction of tokens following original issuance. Instead, this primary smart contract would be extended by whatever smart contract is acting as the home account for the new token issuance.

The primary smart contract in this case would inspect the home account to ensure that it is a smart contract that does not override the "authorize" subroutine implementation with a different implementation. Such an approach would require one smart contract to problematically inspect the implementation of another smart contract (specifically, whether one smart contract is extending another, and whether it is overriding or re-using the same subroutines implemented in the primary smart contract).

In order to ensure that the correct authorization subroutine stays in effect, in at least one embodiment, secondary genesis records (i.e. genesis records issued to increase the supply following the initial issuance) may be restricted by the system such that they are not able to name an alternate authorization subroutine, and are not able to loosen the restrictions imposed by authorization filters. All tokens issued of a given type would be subject to the same authorization subroutine and filters as that which is specified in the original genesis record for that type.

The "supply" field of the original genesis record used to issue the new token would be set to "unlimited" instead of "original issuer".

Public Offerings

In many jurisdictions, the issuance, transfer, assignment, use and trading of securities are highly regulated in situations where those securities are available to the general public. Securities regulators in certain such jurisdictions often rely on industry self-regulatory organizations, exchanges or other private entities to oversee the issuance of securities within these jurisdictions, and to ensure that rules regarding the issuance, transfer, assignment and trading of securities within the jurisdiction in question.

A token qualifying as a security, if it is offered to the general public, may have to be controlled in a manner that allows securities regulators, self-regulatory organizations, exchanges, or other deputized entities (together, "rules-enforcing organizations") to monitor compliance with and enforce rules pertaining to securities. The issuance of such tokens in at least one embodiment of the present invention may be restricted via the "authorized token type" method specified elsewhere herein, and controlled by an official rules-enforcing organization in a manner described in some detail below. Upon issuance, the transfer, assignment, use and trading of such tokens would be controlled via inter-operating smart contracts, which smart contracts may implement authorization subroutines that act to restrict such activity. Such tokens may also be controlled through the use of the "authorization filter" feature of the present invention, described herein.

In at least one embodiment of the present invention, a rules-enforcing organization would be granted authority over the issuance of new tokens via a genesis record created by a higher-authority account. This genesis record would provide the rules-enforcing organization with control over a base token type, from which it would derive key privileges with regards to how new tokens are issued and used. Only rules-enforcing organizations with official authority would be issued such tokens.

In at least one embodiment, genesis records granting authority to rules-enforcing organizations may configure some or all of its fields as follows:

"Label"—the prefix that will be added to the label of all new token types, indicating the rules-enforcing organization responsible for all such token types (for instance, "REO").

"Value"—any suitable number, most likely 1; value is effectively irrelevant, due to the fact that these tokens exist only to convey authority to the rules-enforcing organization, and will not be distributed.

"Home Account"—the smart contract used by the rules-enforcing organization to issue new derived tokens under the organization's mandate.

"Issuer Account"—the higher-authority account that grants the rules-enforcing organization its authority to issue authorized tokens on the distributed ledger.

"Supply"—"unlimited".

"New Issuance"—"home", which value will permit the rules-enforcing organization authority to issue.

"Authorization Subroutine"—may be used as a control to enable/disable issuance, transfer, use and trading of tokens issued by the rules-enforcing organization, whatever they may be.

"Authorization Filters"—an alternate means that may be used in lieu of "Authorization Subroutine" to enable/disable issuance, transfer, use and trading of tokens issued by the rules-enforcing organization, whatever they may be.

"Authorization Cascade"—"true"

The above initial genesis record would provide the rules-enforcing organization in turn to generate additional genesis records, which would be used to authorize entities operating under its jurisdiction to issue their own security tokens. The derived token types declared and defined in this manner by the rules-enforcing organization would be created via genesis records having all or some of the following features, in at least one embodiment:

"Label"—the name under which the new token type would be traded (for instance, "REO.TOKEN")

"Value"—the number of tokens that will be created in the first issuance

"Home Account"—the smart contract to which tokens will first be issued, and from which tokens will be distributed following initial issuance "Issuer Account"—The account or smart contract controlled by the REO, which account or smart contract was authorized by the original genesis record to issue new tokens.

"Supply"—"original issuer"

"New Issuance"—"original issuer"

"Authorization Subroutine"—may be used as a control to enable/disable the transfer, use and trading of the new derived token in question. May also reference the base token's authorization subroutine, so that a global suspension of the rules-enforcing organization's activity would also suspend the activity of all derived tokens it has authorized.

"Authorization Filters"—may be used as an alternative to Authorization Subroutine as a control to enable/disable the transfer, use and trading of the new derived token in question.

"Authorization Cascade"—"true"

In at least one embodiment, the rules-enforcing organization would issue derived tokens only to smart contracts that are implemented in compliance with standards set by the rules-enforcing organization. The rules-enforcing organization may enact real-world governance policies regarding the issuance of new tokens, which policies may be translated to code and implemented within "issue" subroutines implemented by all smart contracts acting as home accounts for newly issued derived tokens. If these smart contracts are immutable, then a manual or computer-aided inspection made by the rules-enforcing organization before derived tokens are authorized would ensure that the smart contract is in compliance with those policies. In addition, the controls that the rules-enforcing organization may require to be implemented in the authorization subroutine could be verified through manual inspection.

In order to facilitate the enforcement of its governance policies, the rules-enforcing organization, in at least one embodiment of the present invention, may generate genesis records that require that both (a) the authorization subroutine of all base tokens pass, and (b) the authorization subroutine of each specific derived token pass, before a record may be incorporated into the blockchain. This may be accomplished on one hand through the use of an "authorization cascade" configuration within genesis records as described herein, or on the other hand by having the authorization subroutines of derived token types invoke the authorization subroutines of base token types.

In this manner as described above, in at least one embodiment, the behavior and usage of securities tokens issued under the authority of a rules-enforcing organization may be regulated, and the governance policies enacted by a rules-enforcing organization may be enforced. Derived tokens issued by a rules-enforcing organization are constrained in their use by authorization subroutines and authorization filters specified in the genesis records that authorize these derived tokens. These authorization subroutines and authorization filters would enforce trading and transfer rules, as well as other governance policies imposed by the rules-enforcing organization.

The specific regulations and rules that may be enforced using these tools are varied and limitless, and may be left up to the specific organizations that use the tools described herein. However, it is nonetheless possible to provide examples as to specific mechanisms that may be employed to implement specific policies.

(1) By inspecting the resident jurisdiction of accounts attempting to trade in the derived token, authorization subroutines and filters may limit trading to accounts resident only in officially sanctioned jurisdictions. Jurisdictions prohibited by the rules-enforcing organization may be excluded from trading activity for authorized tokens.

(2) The behavior and activities of all derived tokens issued under the authority of the rules-enforcing organization can be controlled in a centralized manner by giving a single master authorization subroutine implemented by the rules-enforcing organization the authority to control the trading activity of all derived tokens issued under its remit, all at once. Derived tokens' individual authorization subroutines would supplement their own logic by invoking this global authorization subroutine, rejecting any new records that run afoul of this master subroutine. Or, this master subroutine could be added as the authorization subroutine of the original genesis block granting authority to the rules-enforcing organization, with authorization cascade turned on.

A global trading suspension for all tokens authorized by a particular rules-enforcing organization could be implemented through the use of a Boolean flag stored within this master smart contract's data. By flipping the value stored in this flag, the master authorization subroutine would alternately return true and false, controlling whether global trading activity is enabled or disabled across the whole node network for derived tokens.

A targeted suspension of the transfer, use or trading of a particular derived token—halting all circulation of the token—is possible by adding that token to a list of "suspended" tokens maintained by the smart contract that contains the authorization subroutine. Any transfer, trade order, or settlement records referencing such a token would be rejected due to the fact of the token appearing in said list.

Alternately, such suspensions may be accomplished using proposition records in combination with authorization filters included with the original genesis block granting authority to the rules-enforcing organization. In order to suspend trading for all its derived tokens, for instance, the rules-enforcing organization may issue a self-decided proposition record the proposition statement of which attaches to the organizations own base token type, declaring trading suspended. An authorization filter associated with that base token type would block activity until that proposition had expired. A similar, proposition statement that attaches to individual derived token types may be used to trigger a halt to trading of those individual derived tokens.

(3) Explicit re-authorization of a token—for instance, pending full compliance with periodic reporting requirements—may be accomplished in accordance with at least one embodiment through the use of an expiration date for each token type (where expiration date is implemented as a particular block number or block height). When compliance requirements are satisfied for a given time period, the expiration date is updated by the rules-enforcing organization.

Such an expiration date may be attached to a derived token through the use of a self-defined proposition record created by the rules-enforcing organization. If the expiration date or block height is not updated before that date passes, then the authorization subroutine or filter would return a "false" value, causing trading and transfer activity of that token to automatically stop. Alternately, the date could be a datapoint stored within a smart contract that may be updated via a subroutine call.

(4) Changing rules and shifting regulatory requirements can be accommodated by having this global smart contract be swappable via a pivot contract or registrar contract. The authorization subroutines controlling each of the derived token types would reference the pivot or registrar contract, which would in turn reference the global smart contract and global authorization subroutine via the global smart contract's address.

When authorization is required, the individual authorization subroutine would invoke the authorization subroutine implemented in the referenced pivot contract, which in turn would invoke the authorization subroutine implemented in the referenced global smart contract. The pivot contract would maintain a list of accounts permitted to re-route its reference to the global smart contract, such that the global smart contract can be switched out for an alternate implementation. Subroutines would be implemented within the pivot contract permitting this contract swap, and permitting an update to the list of accounts permitted to make such a change.

(5) Any other limitation, rule or requirement may be imposed on the issuance, transfer, assignment, use and trading of any other type or category of security token through a comparable process that accounts for the unique nature of that particular limitation, rule or requirement. Token issuance can be restricted to the subroutine of a contract that has been explicitly authorized to issue authorized tokens via a chain of genesis records. The nature and qualities of persons that control participating accounts can be verified via the proposition determination process, and can be taken into account by a smart contract via inspection of proposition records and determination records. Any specific rule regarding the issuance, transfer, assignment, use and trading a token type can be encoded in the implementation of smart contracts and authorization subroutines and filters.

It is understood that the above-described arrangements are merely illustrative of the many possible specific embodiments, which represent applications of the present invention. Numerous and varied other arrangements can be readily devised in accordance with the principles of the present invention without departing from the spirit and the scope of the invention.

I claim:

1. An electronic system comprising:
   an interconnected network of a plurality of computers, each including a processor executing computer instructions stored in an electronic memory of each computer for implementing and maintaining a distributed electronic ledger system implemented as a backward-linked blockchain of multiple interconnected blockchain blocks;
   a first node on said interconnected network of computers, wherein a processor of the first node executes peer-to-peer software to create a first competing block or blockchain segment to be added to the blockchain;
   a second node on said interconnected network of computers, wherein a processor of the second node executes peer-to-peer software to create a second competing block or blockchain segment to be added to the blockchain;
   at least one node on the interconnected network of computers executing computer instructions that apply a consensus algorithm to calculate and assign a fitness value among the competing first and second blocks or blockchain segments;
   wherein the consensus algorithm calculates the assigned fitness value that is based on a Hash Distance formula where block i represents the competing first and second blocks or blockchain segments:

$$\sum_{i=g}^{n} c \frac{V_i^y}{k + j \cdot H_i}$$

where $V_i$ is an aggregate value of certain qualified tokens within the block i, $H_i$ is a hash distance for that block, and each of c, k, j and y are constants, for all blocks with heights g through n within a blockchain segment; and
   a plurality of nodes on said interconnected network of computers determining which of the first or second blocks or blockchain segments will be the next block or blockchain segment incorporated into said blockchain; and incorporating the next block or blockchain segment into the blockchain after such determination has been made.

2. The system of claim 1, wherein the highest fitness calculation between the competing blocks or blockchain segments is a function of a numerical distance between a hash of each block on the chain, and a target hash of each block, and wherein said numerical distance is determined algorithmically by a software evaluation of one or more blocks of the blockchain.

3. The system of claim 2, wherein the target hash is determined at least partially by a plurality of nodes sending tokens to one or more buckets, and a highest fitness is determined at least partially by minimizing a ratio of aggregate tokens sent to the one or more buckets, per hash distance.

4. The system of claim 1, wherein V includes tokens assigned to one or more buckets via at least one bucket assignment record, and the hash distance H is determined by using a specified value with a certain bucket as a target hash, wherein a bucket refers to a set of contiguous numerical ranges that overlaps with an output range of a cryptographic hash function of the blockchain.

5. The system of claim 1, wherein the evaluation process avoids a proof-of-work computational problem calculation for an authorization to create a next block or blockchain segment on the blockchain, or for determining which block or blockchain segment among the competing first and second blocks or blockchain segments is added to the blockchain.

6. The system of claim 1, wherein the consensus algorithm implements a trust-but-verify procedure, wherein the first node or second node begin working to create one or more new blocks before each of the first node or second node has completed verifying a correctness of a preceding block to which the new block is linked.

7. The system of claim 1, wherein each blockchain block contains a Bloom filter that stores information regarding which addresses or user accounts within the system have had their state modified by one or more data records associated with the block.

8. The system of claim 7, wherein the Bloom filter of at least one preceding block is used by the first or the second nodes on the network to determine which data records may be included in a new block that links to that preceding block, by excluding from the new block any data records that reference a same addresses or user accounts recorded in the Bloom filter of the preceding block.

9. The system of claim 1, further utilizing at least one genesis record, which record declares and defines a new user-specified token type, wherein transfers of one or more tokens sent from one address or user account to another is tracked using at least one transfer record.

10. The system of claim 9, wherein the genesis record that declares and defines at least one new user-specified token type is valid within the blockchain when it is cryptographically signed by an account or an address that has previously been authorized to declare and define at least one new user-specified token type.

11. The system of claim 10, wherein the account or address is authorized to declare and define at least one new user-specified token type via a chain of signed genesis records added to the blockchain, wherein each genesis record in said chain is cryptographically signed by an account that has been authorized to do so by a genesis record signed by a higher-authority account, extending back to a single root account.

12. The system of claim 1, further utilizing at least one trade order record that offers to exchange tokens of one type for tokens of another type, and said offer expiring when it is not matched before a deadline specified within the trade order record.

13. The system of claim 1, further utilizing at least one settlement record that matches two or more trade orders, resulting in the traded tokens being automatically transferred to the accounts or addresses specified by the trade orders.

14. The system of claim 1, further utilizing at least one proposition record associating or including a truth-state proposition and a token reward that is distributed to one or more accounts specified by a plurality of nodes that have voted in a majority when the truth-state proposition of the proposition record is decided at a point in time defined by the at least one proposition record.

15. The system of claim 14, further utilizing at least one decision record including information about a certain number of tokens that are risked by a node when voting in favor of or against a proposition included or associated with the proposition record, and further forfeiting the risked tokens in favor of the nodes that voted in the majority.

16. The system of claim 1, further utilizing at least one transaction record that contains or references at least one of an ordered collection of individual data records or smart contracts, that must all be added to the blockchain together, or otherwise must all be discarded, and must all be processed successfully in sequence without interruption, or otherwise must all be disregarded in case of a modifications made to a system state.

17. The system of claim 1, wherein the competing nodes lock a plurality of associated tokens for a period of time in exchange for a portion of a reward, wherein the number of tokens locked increases the fitness value calculated for the block or blockchain segment within which those tokens were initially locked.

18. The system of claim 1, further utilizing at least one pattern-linkage record that links a smart contract computer instructions with a pattern definition, wherein the pattern definition may match the occurrence of one or more data records added to the blockchain, and wherein the smart contract computer instructions are invoked when at least one of the data record matching the pattern definition is incorporated into the blockchain.

19. In a computerized network of a plurality of computers, executing computer instructions stored in electronic memory for implementing and maintaining a distributed electronic ledger system, a consensus determination method comprising:
   creating and maintaining in the electronic memory of at least one of the plurality of networked computers the distributed electronic ledger, implemented as a backward-linked blockchain of a plurality of interconnected blockchain blocks;
   utilizing a consensus process for determining which node is permitted to add a next block on said blockchain and which node is allowed to share a reward for the next block added to the blockchain;
   executing by a processor of a first node on the network a peer-to-peer software to create a first competing block or a block chain segment to be added to the blockchain;
   executing by a processor of a second node on the network a peer-to-peer software to create a second competing block or a block chain segment to be added to the blockchain;
   executing by one or more computer processors of a network-connected nodes computer instructions that apply a consensus algorithm to calculate and assign a fitness value among the competing first and second blocks or blockchain segments utilizing a hardware acceleration operation, wherein the fitness value calculation is based on a Hash Distance formula:

$$\sum_{i=g}^{n} c \frac{V_i^y}{k + j \cdot H_i}$$

where V is a unique token value for the competing first block or second block or blockchain segments i, determined as within a sub-chain being evaluated; H is a hash distance for block i; c, k, j and y are constants; g is a first block within the sub-chain being evaluated; and n is the last block within the sub-chain being evaluated;
   determining by a plurality of the network-connected nodes which of the first or second blocks or blockchain segments will be a next block or blockchain segment incorporated into said blockchain; and
   incorporating the next block or blockchain segment into the blockchain after the determination.

\* \* \* \* \*